(12) United States Patent
Klatt

(10) Patent No.: US 7,884,562 B2
(45) Date of Patent: Feb. 8, 2011

(54) BRUSHLESS MULTIPHASE SELF-COMMUTATION CONTROLLER

(76) Inventor: Frederick William Klatt, 30 Fox Run Rd., Bedford, MA (US) 01730

( * ) Notice: Subject to any disclaimer, the term of this patent is extended or adjusted under 35 U.S.C. 154(b) by 434 days.

(21) Appl. No.: 11/924,659

(22) Filed: Oct. 26, 2007

(65) Prior Publication Data
US 2009/0108782 A1  Apr. 30, 2009

(51) Int. Cl.
*H02P 6/00* (2006.01)
(52) U.S. Cl. .............................. 318/400.01; 318/400.21
(58) Field of Classification Search ............ 318/400.01, 318/400.05, 400.21, 400.37
See application file for complete search history.

(56) References Cited
U.S. PATENT DOCUMENTS 5,189,357 A * 2/1993 Woodson et al. ............ 318/737
5,565,753 A * 10/1996 Chen et al. .................. 318/809
6,864,648 B1 * 3/2005 Stedman ..................... 318/148

* cited by examiner

*Primary Examiner*—Rina I Duda

(57) ABSTRACT

The Brushless Multiphase Self-Commutation Controller or BMSCC is an adjustable speed drive for reliable, contact-less and stable self-commutation control of electric apparatus, including electric motors and generators. BMSCC transforms multiphase electrical excitation from one frequency to variable frequency that is automatically synchronized to the movement of the electric apparatus without traditional estimation methods of commutation and frequency synthesis using derivatives of electronic, electro-mechanical, and field-oriented-control. Instead, BMSCC comprises an analog electromagnetic computer with synchronous modulation techniques to first establish magnetic energy and then dynamically share packets of magnetic energy between phase windings of a multiphase, position dependent flux, high frequency transformer by direct AC-to-AC conversion without an intermediate DC conversion stage.

37 Claims, 14 Drawing Sheets

BRUSHLESS MULTIPHASE SELF-COMMUTATION CONTROLLER

TECHNICAL FIELD

Electric Motors and Generators, commonly referred to as electric machines, are familiar members of electric apparatus that must be electrically excited with frequency synchronized to movement for useful operation. For practical synchronization of frequency with speed, called commutation, electric motors and generators are routinely complemented with electronic control. To distinguish the Brushless Multiphase Self-Commutation Controller from today's state-of-the-art electronic controllers of electric apparatus, called adjustable speed drives, and to avoid confusion with industry's frivolous use of terminology or practice, a quick study will establish common guidelines for the operation and control of the electric machine, which is a subset of electric apparatus.

Electric machines are electromechanical converters that convert electric power to mechanical power or vice-versa. All electric machines have one mutually independent port for "mechanical" power, which experiences rotation or linear movement at a given speed and torque (or force), and at least one port for "electrical" power (i.e., Singly-Fed) or at most two mutually independent ports (i.e., Doubly-Fed) for "electrical" power. More than three mutually independent power ports is a duplication of the Singly-Fed or Doubly-Fed categories of electric machines. By pumping an average mechanical power into the mechanical port, the electrical port(s) will output an average electrical power (or generate). By pumping an average electrical power into the electrical port(s), the mechanical port will output an average mechanical power (or motor).

The basic electromagnetic core structure of any electric machine consists of the rotor (or moving) assembly and the stator (or stationary) assembly that are separated by a single air gap to allow relative movement. Electric machine operation requires two synchronized rotating (or moving) magnetic fields that are on the rotor (or moving body) assembly and the stator (or stationary body) assembly, respectively. Essentially one moving magnetic field drags the other magnetic field (and its associated carrier body) along by magnetic attraction (or repulsion) to create work. Without synchronization between the rotating (or moving) magnetic fields on each side of the air gap, torque (or force) pulsation would result and no useful average power could be produced. Since Ampere's Circular Law implies Magnetic Flux and current are interchangeable terms, rotating (or moving) current sheets show the same analogy as rotating (or moving) magnetic fields. Ampere's Circular Law simply states the Magnetic Flux Intensity along a circular path at a given radius from a current carrying conductor is equal to the Magneto-Motive-Force on the conductor divided by the circumference of the circular path. Magneto-Motive-Force (or MMF) is the product of the number of wraps of current carrying conductors (i.e., winding-turns) and the current in the conductors. Flux Density is the product of the magnetic permeability and the Flux Intensity.

Linear (or moving) and rotating electric machines follow the same electromagnetic principles of operation. As used herein, "torque" will be used interchangeably with "force" and "rotating" will be used interchangeably with "moving", where "torque and rotating" are terms applied to rotating electric machines and "force and moving" are terms applied to linear electric machines.

There are two basic relations that simultaneously govern all electric machine design and operation, Faraday's Law and Lorentz Relation. Faraday's Law simply states that the port voltage of any electric machine is equal to the change in flux, $\psi$, over time that cuts through a given number of winding-turns, N. Lorentz Relation simply states that the force on a current carrying conductor with a given length is the cross-product between the total current in the conductors and the Magnetic Flux Density, $\beta$, which is a direct derivative of Magnetic Flux Intensity, H, and the MMF on the conductor. Lorentz Relation stipulates the direction of force follows the Right-Hand-Rule convention, which shows the force to be perpendicular to the plane of the current and flux axis, and the phase angle between the two synchronized rotating (and moving) magnetic fields (or current) must be greater than zero degrees for force to occur with the greatest force occurring at any odd multiple of 90 degrees or $\pi/2$ radians. Since current and flux are interchangeable terms, the terms of Lorentz Relation can be purely magnetic or purely current.

Any deviation from the basic electromagnetic core structure or the principle of operation as just described, which is synchronized rotating magnetic fields (or current sheets) on each side of an air gap, is simply a duplication of the basic core structure of the electric machine as describe. For instance, the so-called Dual Mechanical Port Electric Machine (DMP) has two air gaps within the same body and accordingly, it is two basic electric machines in the same body.

A rotating (or moving) magnetic field can be realized by a rotating (or moving) Permanent Magnet Assembly, by a rotating (or moving) "Passive" Winding Set Assembly, or by a stationary or rotating (or moving) "Active" Winding Set Assembly. The "Passive" Winding Set and the Permanent Magnet Assembly have no electrical or mechanical gateway for "real" power production or consumption other than dissipative power or electrical loss while producing the magnetic field. Consequently, the Permanent Magnet Assembly and the Passive Winding Set Assembly passively participate in the energy conversion process for the sole purpose of satisfying the magnetic field condition of Lorentz Relation and as a result, assemblies of Permanent Magnets and Passive Winding Sets are commonly interchangeable. Examples of Passive Winding Sets are the AC (i.e., Alternating Current) Squirrel Cage Winding Assembly found in Asynchronous (i.e., Induction) Electric Machines and either the conventional or Superconductor DC (i.e., Direct Current) Winding Assembly (or Electromagnet) found in Synchronous Electric Machines. In contrast, "Active" Winding Sets experience real (or active) power other than dissipative power or electrical loss and as a result, actively participates in the energy conversion process. An Active Winding Set has to be a multiphase AC winding arrangement that is independently excited with a multiphase AC electrical source (i.e., 3-Phase AC, 6-Phase AC, etc.) through its own electrical terminals. Since only a multiphase (AC) winding set with an independent means of excitation (i.e., active winding set) functions as an electrical power gateway and only a multiphase AC winding set produces its own rotating (or moving) magnetic field while generally situated on a stationary body, all electric machines must incorporate at least one multiphase AC winding set or Active Winding Set, the sum of which determines the power capacity of the electric machine. The frequency of electrical excitation of the Active Winding Set must be synchronized to the mechanical speed of the electric machine by the following Synchronous Speed Relation:

$$fm = \frac{\pm fs \pm fr}{P} \qquad \text{Synchronous Speed Relation}$$

Where:
- fs Electrical frequency of the AC excitation on the stator (or primary) winding set (e.g., 60 Hz), which is related to the speed of the magnetic field in the air-gap;
- fr Electrical frequency of the AC excitation on the rotor (or moving body) (or secondary) winding set, which is virtually zero for Singly-Fed or Permanent Magnet Electric Machines;
- fm Mechanical speed (revolutions per second) of the rotor;
- P Number of magnetic "pole-pairs";

If an electric machine incorporates a winding on each side of the air gap without any permanent magnets, it is fully electromagnetic and shows two components of similar MMF to satisfy the magnetic coupling (i.e., induction) or transformer action between the winding sets; otherwise Faraday's Law would be violated. One component of MMF, which this disclosure calls Magnetizing MMF, produces the air gap flux density according to Ampere's Circular Law. Magnetizing MMF produces reactive (or imaginary) power and does not contribute to mechanical power. The other component of MMF, which this disclosure calls Torque MMF, produces force, produces active (or real) power, and does not contributes to air gap flux density. To satisfy the laws of electric machines, the Magnetizing MMF and the Torque MMF must be ninety degrees out of phase.

The Winding Set (or the Permanent Magnet assembly) on each side of the air gap of an electric machine must have similar magnetizing Magneto-Motive-Force (or Permanent Magnet Coercivity) to satisfy the induction principles of a transformer or to avoid permanent magnet demagnetization, which is exasperated by temperature. Magnetizing MMF produces core Flux Intensity (and core Flux Density) depending on the permeability (or magnetic resistance) of the magnetic path. Coercivity has a similar relationship with Permanent Magnets as MMF does with electromagnets. Electromagnets are also referred to as a field-winding or a wound-field set but never an active winding set.

With today's energy consciousness, it is becoming customary to complement any electric machine with electronic excitation control for optimum performance. There are only two basic categories of electronic control, Self-Commutation and derivatives of Field Oriented Control (or FOC). Further, today's most efficient electric machines require electronic excitation control for functional operation. Some electric machine systems, such as superconductor electric machine systems, require additional support equipment beyond electronic excitation control for functional operation, such as cryogenic refrigeration, etc. Although rarely the case, the contributing effects associated with the cost, efficiency, reliability, and power density of the electronic excitation controller or ancillary equipment for functional operation of the system should always be included when evaluating the overall performance of the electric machine "system".

All electric machines or electric machine systems can be categorized as either Doubly-Fed or Singly-Fed Electric Machine Systems, which indicate the number of "active winding sets" contained within the basic electromagnetic core structure. Whether Doubly-fed or Singly-fed, all electric machines can be further categorized as Asynchronous or Synchronous electric machines, which indicate how the synchronized rotating magnetic fields (or current sheets) on each side of the air gap are maintained. Asynchronous Electric Machines "dependently" maintain the two rotating magnetic fields by speed based induction, which is the mutual induction of current (i.e., the rotating transformer principles) do to a difference in rotational (or moving) speed (i.e., slip) between the Passive AC Winding Set and the rotating field in the air gap. Speed based induction is low frequency induction close to the excitation frequency. The slip should be kept small for best performance. In contrast, Synchronous Electric Machines "independently" maintain each of the two rotating magnetic fields with the rotor maintaining a rotating field by mechanical rotation of the constant magnetic field of a permanent magnet assembly or a field winding assembly. Asynchronous Electric Machines are inherently stable, exhibit startup torque, and can operate standalone on multiphase AC power because the mutually inclusive maintenance of the two rotating magnetic fields by speed based induction or slip holds synchronism between the two moving magnetic fields regardless of speed. Note: this is not self-commutation because the slip must be continuously maintained by some commutation control means for continuous acceleration without regard to speed. Synchronous electric machines are inherently unstable, do not exhibit startup torque, and cannot operate standalone, because the mutually exclusive maintenance of the two rotating magnetic fields is prone to loss of synchronism with potentially devastating results.

Any electric machine that independently maintains the synchronized rotating magnetic fields on each side of the air gap without the need to maintain slip for speed based induction even while potentially experiencing slip is considered a Synchronous Electric Machine. Common examples of synchronous electric machines are the so-called brushless DC Electric Machines (i.e., permanent magnet), Field Excited Synchronous Electric Machines (i.e., electromagnet), Synchronous Reluctance Electric Machines, and Wound-Rotor [Synchronous] Doubly-Fed Electric Machines. Examples of Asynchronous Electric Machines are the Singly-fed Induction Electric Machines (i.e., squirrel cage rotor, wound-rotor, and slip-energy recovery) and the Doubly-Fed Induction Electric Machines (or so-called Brushless Doubly-Fed Electric Machines) with the two active winding sets having unlike pole-pairs and as a result, always rely on rotational speed based (i.e., slip) induction for excitation.

True Wound-Rotor Doubly-Fed Electric Machines have two independently excited active winding sets for the independent production of the two synchronized rotating (or moving) magnetic fields without speed based induction and are therefore synchronous electric machines. At least one active winding set must be excited with bi-directional electrical power. As the only electric machine with an "active" winding set situated on the rotor, the rotor core assembly of the Wound-Rotor Doubly-Fed Electric Machine becomes an "active" participant in the energy conversion process and adds real power to the system. In all other electric machines, the real estate of the rotor core assembly (or in some cases the stator core assembly) is considered underutilized because the rotor is only a passive participant in the energy conversion process and does not add real power to the system. With this consideration, the Wound-Rotor [Synchronous] Doubly-Fed Electric Machine has the most ideal electromagnetic core structure of any electric machine with a given air gap flux density. However, the traditional Wound-Rotor Doubly-Fed Electric Machine incorporates sliding contacts (i.e., multiphase slip ring assembly) for an independent electrical connection to the rotating active winding set and is acutely unstable because torque is an unstable function of rotor position and at synchronous speed where induction ceases to exist, the frequency and voltage of the rotor excitation is difficult to measure or synthesize by any derivative of FOC electronic control. Together, the multiphase slip ring assembly and the instability impose a formidable "Achilles' heel" for the Wound-Rotor Doubly-Fed Electric Machine, which has kept this electric machine in virtual oblivion except as the classic study of electric machines.

Two facts are indisputable among electric machine experts with ample evidence emerging from technical periodicals and research projects, the Wound-Rotor [Synchronous] Doubly-Fed Electric Machine shows twice the constant torque speed range for a given frequency and voltage of operation (7200 rpm @ 60 Hz, 1 pole-pair) and its electronic excitation controller conditions only the power of the rotor active winding set, which is a fraction (half or less) of the total power of the electric machine. While disregarding its Achilles' heel, in theory these facts give the Wound-Rotor [Synchronous] Doubly-Fed Electric Machine significant attributes compared to all other electric machines with similar air gap flux densities and power rating. Since the two active winding sets conveniently occupy the same physical volume by utilizing the otherwise passive rotor space, the Wound-Rotor [Synchronous] Doubly-Fed Electric Machine shows twice the power density as singly-fed electric machines, assuming all active winding sets have similar ratings. Since the total current is shared between the two active winding sets, the Wound-Rotor [Synchronous] Doubly-Fed Electric Machine shows the same electrical loss (i.e., $I^2R$ loss) as the most efficient electric machine available, which is the singly-fed synchronous electric machine with a lossless permanent magnet assembly (i.e., brushless DC electric machine), assuming the permanent magnet assembly can produce the same Flux Density as the active winding sets. Likewise, the Wound-Rotor [Synchronous] Doubly-Fed Electric Machine shows nearly half the electrical loss as a similarly rated asynchronous (i.e., induction) electric machine, which must include the additional electrical loss of the "passive" winding set on the rotating body. After legitimately including the significant cost, efficiency, and power density advantages of its electronic controller and disregarding its Achilles' heel, nothing approaches the Wound-Rotor [Synchronous] Doubly-fed Electric Machine system (including today's superconductor electric machines), if cost, efficiency, and power density were the principal considerations.

The Wound-Rotor [Synchronous] Doubly-fed Electric Machine, which by extraordinary brushless control means is a doubly-fed synchronous electric machine with two "active" winding sets situated on the stator and rotor, respectively, should never be confused with the "Wound Field" electric machine or the "Wound Rotor" induction electric machine, which by design incorporates only one active winding set but are commonly referred to as doubly-fed. The Wound-Rotor [Synchronous] Doubly-fed Electric Machine and the Wound-Rotor Induction Electric Machine are respective examples of synchronous doubly-fed and asynchronous singly-fed electric machines.

Chief reason for using permanent magnets in electric machines is to replace brushes or slip rings with purely electronic commutation control, since the moving permanent magnets do not require electrical power. Another reason for using permanent magnets is for improving efficiency, since permanent magnets do not participate in the energy conversion process and do not require or dissipate electrical power. Since permanent magnets do occupy core real estate but passively participate in the energy conversion process, the core real estate of the permanent synchronous electric machine is not optimally utilized as is the core real estate of only the Wound-Rotor Synchronous Doubly-Fed Electric Machine.

Non-Permanent Magnet Electric Machines achieve higher air-gap Flux Density and torque producing current density than a Permanent Magnet Synchronous Electric Machine, if properly designed while disregarding any electrical loss or electrical anomalies associated with achieving the air-gap Flux Density or current density.

Electric machines incorporate a core of magnetic steel to localize the entire length of the magnetic path through the core to the air gap depth and as a result, the magnetic steel core significantly reduces the MMF requirement of the electric machine. Lower MMF is tantamount to lower electrical loss and higher performance electric machines. Any Flux Density production beyond the core saturation limit requires additional MMF that is based on the low permeability of air, rather than the high permeability of magnetic steel, which is hundreds of times better than air.

The steel magnetic core has its own deficiencies, such as Eddy Current loss and a finite Flux Density saturation limit. To reduce magnetic losses and improve flux density saturation, so-called low loss magnetic steel is traditionally used, which is always improving through constant research on the molecular level, such as nanotechnology and amorphous metals. The core of the electric machine is powdered metal or assembled in layers of magnetic steel (i.e., ribbon, laminations, etc.) to increase the resistance to eddy currents.

Electric machines are further categorized by the direction of the flux through the air-gap. If the flux travels parallel to the shaft, the electric machine is referred to as an axial flux electric machine and has a pancake or hockey puck form-factor. If the flux travels perpendicular to the shaft, the electric machine is referred to as a radial flux electric machine and has a classical cylinder in cylinder form-factor. Sort of a misnomer, a Transverse Flux and Longitudinal Flux electric machine indicates the direction of "current" (not the flux) in relation to movement. The current flow in the longitudinal flux electric machine (the classic electric machine) is perpendicular to the magnetic field while the current flow in the transverse flux electric machines is in the same direction of movement. In Transverse flux electric machines the current term in Lorentz relation for force production, which all electric machines must satisfy, is focused by the core into an additional Flux Density term (i.e., current and flux intensity are interchangeable terms).

The efficiency principle behind Synchronous Singly-fed Electric Machines with a Superconductor Field-Winding is the result of achieving ultra high air-gap Flux Density, which reduces the number of winding-turns and associated electrical loss of the "conventional" active winding set, and is not the result of the low electrical loss associated with the superconductor electromagnet as sometimes assumed; otherwise, Permanent Magnets, which have no electrical loss, could easily replace the Superconductor Field-Winding (i.e., electromagnet) with the same result, as is commonly done for conventional passive winding sets (i.e., Field-Windings, electromagnets, etc.).

For a given voltage and frequency of excitation, the power rating of any electric machine is the sum of the power rating of its "active" winding set(s). Likewise, the electrical loss of any electric machine is the sum of the electrical loss of all winding sets associated with the electric machine, including any "passive" winding sets. Electrical Loss has no comparable meaning unless proportionally associated with the power rating of the electric machine. Electrical loss is based on the product of the current squared and the resistance in the winding set (i.e., I²R) with resistance proportional to number of winding-turns or MMF. The synchronous singly-fed electric machine with a single winding set (i.e., the active winding set) shows nearly half the electrical loss as a similarly rated asynchronous singly-fed electric machine, which must include the additional electrical loss associated with the extra "passive" winding set (i.e., the squirrel cage winding) with a similar MMF as the "active" winding set to satisfy the transformer principles of induction. If all active winding sets in any comparison have similar ratings, a wound-rotor [synchronous] doubly-fed electric machine with two active winding sets (and no passive winding set) would show twice the power output and twice the electrical loss as a synchronous singly-fed electric machine with only one winding set and a given air-gap flux density, frequency, voltage of operation, which is tantamount to the same electrical loss factor as the synchronous singly-fed electric machine and half the electrical loss factor as the asynchronous (i.e., induction) singly-fed electric machine. Furthermore, the sum of Torque and Magnetizing MMF, which are orthogonal vectors, is not cumulative and has less impact on overall electrical loss or efficiency.

HFT. The symmetry of the REG synchronous modem circuits allow electronic modulation or demodulation to occur on either side of the PDF-HFT of the REG.

By simple vector arithmetic and assuming the normalized amplitudes, each leg of the three phases of the reference signals will be:

$$Leg\_1 = Sin(W_x t + \varphi_{x1});$$

$$Leg\_2 = Sin\left(W_x t + \varphi_{x2} + \frac{2\pi}{3}\right);$$

$$Leg\_3 = Sin\left(W_x t + \varphi_{x3} + \frac{4\pi}{3}\right);$$

Where:
$W_x$ Electrical Frequency;
$\varphi_{x1}, \varphi_{x2}, \varphi_{x3}$ Angle of Electrical Frequency for each phase with the difference between phase 1, 2, & 3 depicting balanced or unbalanced phases.

The compensated modulation on each phase are:
Modulation for Leg_1:

$$A\,Cos((W_x \pm W_y)t + \varphi_x \pm \varphi_{y1});$$

Modulation for Leg_2:

$$ACos\left((W_x \pm W_y)t + \varphi_x \pm \varphi_{y2} + \frac{2\pi}{3}\right);$$

Modulation for Leg_3:

Since all singly-fed electric machines must incorporate one active winding set with similar physical defining constraints, such as slots, pole-pairs, etc., which determines the power capacity and physical size of the electric machine, all singly-fed electric machines are approximately the same physical size for a given voltage, current and magnetic flux of operation. Form factor, construction techniques, etc., which can improve power density, should not be used entirely as a power density metric because virtually all of these techniques can be migrated equally to any electric machine type.

Electric machine experts agree, "wound field", "field wound" or "field winding" are qualifying terms that refer to a specific type of electric machine winding (i.e., a DC electromagnet) that does not actively participate in the energy conversion process but sets up a constant magnetic field in the air gap, which appears rotating (moving) only by the physical action of rotation or movement. Otherwise, there would be no qualifying reason for using the terms "wound field", "field wound" or "field winding" to distinguish these windings types from the other winding type that all electric machines must incorporate at least one, which is the multiphase AC winding set or "active" winding set.

Higher speed electric machines always show higher power density. However, high speed machines require high excitation frequency, which leads to high core loss and higher material cost to mitigate the higher core loss. Consequently, all manufacturers of high speed electric machines have incorporated low loss materials in their machine design, such as thinner laminations, amorphous magnetic metals, etc., as fast as they become feasibly available. With a given frequency of excitation, the wound-rotor doubly-fed shows twice the constant torque speed range (i.e., 7200 rpm with 2 poles and 60 Hz excitation) as singly-fed electric machines (i.e., 3200 rpm with 2 poles and 60 Hz excitation) and as a result, the wound-rotor doubly-fed electric machine has a higher power density core than a singly-fed electric machine.

Electronic controllers or electronic drives of electric machines synthesize the frequency and amplitude of the excitation waveforms with high frequency common mode modulations, such as Pulse Width Modulation or Space Vector Modulation. Common mode modulation requires impedance for filtering and signal replication. As a result, high frequency modulation exposes the windings and power source of the electric machine to high frequency harmonics, which are detrimental to bearing and winding insulation life. High frequency harmonics also cause high core and electrical loss.

For practical electric machine control and operation, an electric drive, adjustable speed drive, or electronic controller must synchronize the frequency of electric machine excitation to the speed of the machine, which is referred to as speed-synchronized excitation. There are two basic methods for synchronizing the frequency of excitation to speed or speed-synchronized excitation for variable speed control of electric machines, which are Self-Commutation and derivatives of Flux Oriented Control (or FOC), such as Flux Vector Control (or FVC). As it names implies, Self-Commutation is an inherent means of instantaneously and automatically commutating the frequency of the electrical excitation signals of the windings to the speed of the shaft movement for continuous functional operation and acceleration of the electric machine without the unnatural process intervention by an electronic computer. As a result, Self-Commutation is considered an "emulation" means of electric machine speed-synchronization.

Self-Commutation has three traits that distinguish itself from the other speed-synchronizing means for electrically exciting electric machines, such as derivatives of Field Oriented Control (FOC). Trait 1, Self-Commutation will naturally accelerate the electric machine to its mechanical limits "without" the need for continuous intervention by an artificial means of speed detection and feedback control, such as an electronic processor means. Trait 2, Self-Commutation can directly operate on any frequency of Alternating Current (AC), including Direct Current (DC), because the speed-synchronized frequency of excitation is automatically produced (i.e., self-commutation). Trait 3, as its name implies Self-Commutation produces speed-synchronized electrical excitation signals naturally and without electronic synthesis.

The other means of speed-synchronizing the electrical excitation of electric machines is any derivative of FOC, which is Commutation but not Self-Commutation. Invented in the early 1970's, FOC could only become what is considered today's most state-of-art electronic excitation control because enormous advances in electronic processing performance and density to satisfied the formidable processing complexity of FOC in some situations. FOC always has four "basic" steps in its control process. Step one, the time and speed "variant" system parameters of the electro-mechanical converter (i.e., the torque producing electric machine) are measured. Step two, the multiphase time and speed "variant" system parameters, as referenced to the low frequency magnetic energy of the actual torque producing electric machine, are transformed into a two co-ordinate time and speed "invariant" counterpart by estimation algorithms running on powerful electronic computers. The two "speed invariant" co-ordinates are respectively referred to as the "d" co-ordinate, which is the flux component, and the "q" co-ordinate, which is the torque component. Step three, the d and q co-ordinate values are re-calculated again by electronic computers to achieve the desired response, such as torque. Step four, the electronic computers use the recalculated d and q co-ordinates to "synthesize" the phase and frequency of the variable, speed-synchronized excitation waveform by an electronic switching inverter under Pulse Width Modulation or Space Vector Modulation. The four basic steps must be "continuously" performed (or re-iterated) for shaft acceleration and stable electric machine operation. As a result, FOC is considered a "simulation" or "artificial" means of control, because the computations are not instantaneous and the estimation algorithm always deviates from the actual electromagnetic process of the electric machine being controlled.

FOC has three distinguishing traits. Trait 1, the resolution of control is asymptotically limited, is closely determined by the power and speed of the electronic computers, and is inherently unstable; particularly, at low excitation frequencies, where measurement and estimation become elusive. Trait 2, without constant reiterative intervention of the process to recalculate the "speed variant" to "speed invariant" transformation and to re-synthesize the excitation waveform by powerful electronic computers, FOC cannot continuously accelerate (or even maintain) the speed of the shaft. Trait 3, FOC must convert input electrical power to an intermediate frequency, such as DC, to support variable frequency synthesis. Further, the high frequency synthesized excitation waveform is directly applied to the low frequency designed active winding set or the multiphase AC power source with detrimental consequences, if not properly compensated for.

Because of the enhanced performance associated with true Self-Commutation, electric machines controlled by any derivative of Field Oriented Control (FOC) are often (and incorrectly) advertised as "self" commutated electric machines by marketing gimmickry.

Prior to the U.S. Pat. Nos. 4,459,540; 4,634,950; 5,237,255 and 5,243,268 or the "Electric Rotating Apparatus and Electric Machine" patents of Klatt, "Self-Commutation" was only available with the venerable DC (or Universal AC) electric machines that incorporated an "electromechanical" commutator. The electromechanical commutator of the so-called DC (or Universal AC) electric machine strategically arranges electro-mechanical switches about the circumference of the rotor shaft that make electrical contact with sliding brushes. As the shaft rotates, the electro-mechanical switches are sequentially activated to discretely direct the flow of a "single phase" of current through the rotor active winding sets in accordance with the speed and position of the rotating shaft. Since current flow changes instantaneously and automatically without electronic processing intervention, the process is electromechanical self-commutation. The resolution of control is real estate dependent on the number of switches that can occupy the contact space while supporting current and multiphase electromechanical commution is impractical.

BACKGROUND ART

U.S. Pat. Nos. 4,459,540; 4,634,950; 5,237,255 and 5,243,268 of Frederick W. Klatt disclosed the "Electric Rotating Apparatus and Electric Machine" system, which potentially realized the only embodiment of a brushless Wound-Rotor [Synchronous] Doubly-Fed or Singly-fed Electric Machine entity. The "Electric Rotating Apparatus and Electric Machine" system is not commercially available because many years of continued research, development, and prototyping solely by Klatt have shown new inventions are crucial for practical control and reliable operation.

Since the Klatt patents, Klatt has defined several new terms to better describe the principles of operation for the Electric Rotating Apparatus and Electric Machine, such as electromagnetic self-commutation or rotor excitation generation. Unlike "electro-mechanical" self-commutation, "electromagnetic" self-commutation as described in the Klatt patents uses a separate modulator and demodulator, respectively, on each side of a High Frequency Rotating Transformer (HFRT). The electromagnetic process of the HFRT directs the flow of current through the winding sets of the HFRT in accordance with the position and speed of the rotating shaft, which are available as speed-synchronized excitation for the rotor active winding sets of the PGM. If practical control was available, the resolution of control would be significantly better than electromechanical self-commutation and power is propagated without mechanical contact (i.e., brushless).

Although electromagnetic self-commutation in the embodiment of a force generating wound-rotor doubly-fed electric machine is inventive, the Klatt Patents incorporated traditional phase, amplitude, and frequency modulation techniques, which were known at the time to be viable common mode modulation techniques for adjustable speed drives. Also considered was the traditional technique of synchronous modulation followed by synchronous demodulation, which are used in today's high frequency, for direct AC-to-AC multiphase conversion with a single node intermediate stage. Only after years of research, Klatt learned these traditional common mode and synchronous modulation techniques were not compatible with practical operation of the Klatt patents that incorporates an intermediate HFRT stage with multiply shared nodes. For instance, Klatt did not entirely understand the initial setup and control of the magnetizing current in the shared phases of an HFRT nor did Klatt understand the modulation techniques for energy packet transfer between the shared nodes or phases. In addition, Klatt did not understand the peculiar environmental stress placed on the electrical and electronic equipment of the Klatt Patents because the Klatt patents disclose the only electric machine that closely couples high frequency electrical, magnetic, and electronic components to the moving shaft of the electric machine being controlled, which directly expose components to the harsh environment of the electric machine installation. Consequently, the Klatt Patents did not disclose the new art of compensated modulation for setup, control, and sharing magnetic energy with the environmental stress requirements for the sensitive electrical and electronic equipment, which would be essential for practical control of the electric machine found in the Klatt patents.

OBJECTS OF THE INVENTION

After years of proprietary and solitary research, development, and prototyping by Klatt, who is the sole keeper of the knowledge base that is not obvious to electric machine experts or engineers, and without similar art in concept, research, or development, it became evident that the self-commutation means of the Klatt Patents required other important inventions for practical reality of the control of the electric machine system and to heighten the performance provided by the system. Brushless Multiphase Self-Commutation Control (or BMSCC) or Real Time Emulation Control (or RTEC) are terms conceived by Klatt to conveniently describe the culmination of important inventions for practical brushless, self-commutation excitation control of electric apparatus, including electric machines, and to avoid confusion with the traditional means of excitation control, such as any derivative of Field Oriented Control (FOC).

One object of the present invention is to provide a Brushless Multiphase Self-Commutation Controller (BMSCC) that comprises a Position Dependent Flux High Frequency Transformer (or PDF-HFT), which changes the flux path with relative position or movement between the primary and secondary windings, with integral synchronous modulators-demodulators or MODEM(s) on the primary and secondary sides of the PDF-HFT, but in the embodiment of BMSCC with new synchronous modulation or gating control means, referred to as compensated modulation, and other new synergistic art to condition or re-fabricate the waveforms on each side of the PDF-HFT for reliably adjusting the brushless transfer of speed-synchronized excitation power to any electric apparatus.

Another object of the present invention is to provide BMSCC embodiment with a PDF-HFT in conjunction with a Position Independent Flux High Frequency Transformer (or PIF-HFT) that does not change the flux path with relative position or movement between the primary and secondary windings for BMSCC compatibility with stationary or rotating (or moving) active winding sets of any type of singly-fed or doubly-fed electric machine, including Reluctance electric machines, Asynchronous electric machines, and Synchronous electric machines. Together, the PDF-HFT in conjunction with the PIF-HFT is referred to as the PDF-HFT+PIF-HFT Combination.

A further object of the present invention is to provide Magnetizing Current Generator means (MCG) for first establishing an oscillating magnetic field (or fields) in the core of the PDF-HFT (or PDF-HFT+PIF-HFT Combination) by gating the flow of magnetizing current in the winding or windings of the PDF-HFT (or PDF-HFT+PIF-HFT Combination) at a frequency that is within the design criteria of the PDF-HFT (or PDF-HFT+PIF-HFT Combination), which may be varied during operation at any time. By first establishing and then managing the oscillating magnetic fielding in the core of a PDF-HFT combination, the MCG provides the basis for the new art of compensated modulation called compensated gating. By synchronizing to the symmetrical bipolar transitions of the oscillating magnetic field (or fields) or derivatives, such as the oscillating magnetizing currents or voltages in the PDF-HFT (or PDF-HFT+PIF-HFT Combination), regardless of any change of the frequency of oscillations, compensated gating universally implies a synchronous reference for gating the Synchronous Modems.

Still another object of the present invention is to gate (or modulate) the Synchronous Modems on the primary and secondary sides of the PDF-HFT (or PDF-HFT+PIF-HFT Combination) in time offset relationship to compensated gating called compensated time offset modulation or CTOM. The time offset relationship can be varied between any Synchronous Modem for electronic adjustment or re-fabrication of the modulation envelop of the waveform for conditioning the power transfer while the PDF-HFT (or PDF-HFT+PIF-HFT Combination) is with or without movement.

Still another object of the present invention is to gate (or modulate) the Synchronous Modems on the primary and secondary sides of the PDF-HFT (or PDF-HFT+PIF-HFT Combination) in cycle burst density relationship to compensated gating at predefined intervals for electronic adjustment or re-fabrication of the modulation envelop of the waveform called compensated pulse density modulation or CTOM. The intervals (i.e., frames) or density of the cycle burst lengths (i.e., strings) can be varied between any Synchronous Modem for conditioning the power transfer while the PDF-HFT (or PDF-HFT+PIF-HFT Combination) is with or without movement.

Still another object of the present invention is to share the oscillating magnetic field energy in the core of the PDF-HFT between phase windings of the PDF-HFT by dynamically gating (or modulating) the synchronous modems with any combination of time offset relationship or cycle burst density relationship for electronic adjustment or re-fabrication of the modulation envelop of the waveform or for parametric control.

Still another object of the present invention is to provide a derivative of BMSCC with the physical relationship between the primary and secondary bodies of the PDF-HFT in a fixed state regardless of the movement of the electrical apparatus being excited while sharing the oscillating magnetic energy between phases as provided with the PDF-HFT for traditional means of electric apparatus control.

Still another object of the present invention is to provide a mechanical adjustment means between the primary and secondary bodies of the PDF-HFT for simultaneously enhancing the electronic adjustment and re-fabrication control means.

Still another object of the present invention is to provide environmental stress immunity to sensitive electrical and electronic components because the BMSCC is the only electronic control means for electric apparatus that requires placement of sensitive components near the movement of the moving body of the electric apparatus and into the same hostile environment experienced by the electric machine.

Still another object of the present invention is to provide core design and material that appropriately support the peculiar high frequency magnetic flux requirements of the PDF-HFT (or PDF-HFT+PIF-HFT Combination) that impacts performance.

Still another object of the present invention is to complement BMSCC with any of the following synergistic art: resonant switching (sometimes called soft switching) means, including means to predict the zero crossing by extrapolating out indeterminate delays, wireless communication means between moving and stator bodies, Speed-Position Resolving means inherent in the multiphase PDF-HFT winding arrangement, Capture, Control, Command, and Communication (CCCC) means, and Process Control Means.

Still another object of the present invention is to provide a rotary phase converter or rotary frequency converter while rotating or moving the moving body of the PDF-HFT (or PDF-HFT+PIF-HFT Combination).

Still another object of the present invention is to provide a stationary phase or frequency conversion by sharing the oscillating magnetic energy between phase windings situated within the core of the PDF-HFT (or PDF-HFT+PIF-HFT Combination).

Still another object of the present invention is to provide any type of singly-fed or doubly-fed electric machine that incorporates BMSCC, such as asynchronous, synchronous, and reluctance electric machines, which includes linear, rotating, axial flux, radial flux, transverse flux, induction, permanent magnet, and superconductor electric machines.

Still another object of the present invention is to provide a doubly-fed electric machine that incorporates BMSCC with a series winding connection arrangement where each phase winding set of the stator of the electric machine is connected in series with the electrical terminals of a phase port of the BMSCC.

Still another object of the present invention is to provide a doubly-fed electric machine that incorporates BMSCC with a parallel winding connection arrangement where each phase winding set of the stator of the electric machine is connected in parallel with the electrical terminals of a phase port of the BMSCC.

Still another object of the present invention is to provide any fixed or variable speed constant frequency (VSCF) Wind Turbine (or Windmill) that incorporates BMSCC electric machine means, which is very different from VSCF Wind Turbines with FOC electric machine means.

Still another object of the present invention is to provide any fixed or variable speed constant frequency (VSCF) renewable prime mover, such as tidal, wave, or active solar, that incorporates BMSCC electric machine means.

Still another object of the present invention is to provide an Enhance Transmission Means (ETM) for connecting multiple electric machines to a prime mover, such as the propeller shaft of any Wind Turbine, that can drive one or more electric machines of any kind for converting the speed of the prime mover to a compatible speed expected of the electric machine shaft and for distributing the power and torque strain across multiple electric machines.

Still another object of the present invention is to provide an ETM for Wind Turbines that incorporate BMSCC electric machine means.

Still another object of the present invention is to provide an Electric Vehicle (EV) power train system that incorporates BMSCC electric machine means for electric motoring and generating (during braking).

Still another object of the present invention is to provide a high frequency single or multiphase AC electric power distribution means, such as for electrically powering the power train of any electric vehicle (EV) with any electric machine.

Still another object of the present invention is to provide an electric vehicle (EV) power steering means by controlling (or differentiating) the torque of any two electric machines, where each electric machine independently powers one of the two wheels that steer.

Obviously, numerous variations and modifications can be made without departing from the spirit of the present inventions. Therefore, it should be clearly understood that the form of the present invention described above and shown in the figures of the accompanying drawings is illustrative only and is not intended to limit the scope of the present inventions.

BRIEF DESCRIPTION OF THE DRAWINGS

Numerous other objects, features, and advantages of the invention should now become apparent upon reading of the following detailed description taken in conjunction with the accompanying drawings in which.

DETAILED DESCRIPTION OF THE INVENTION

Figure 1:
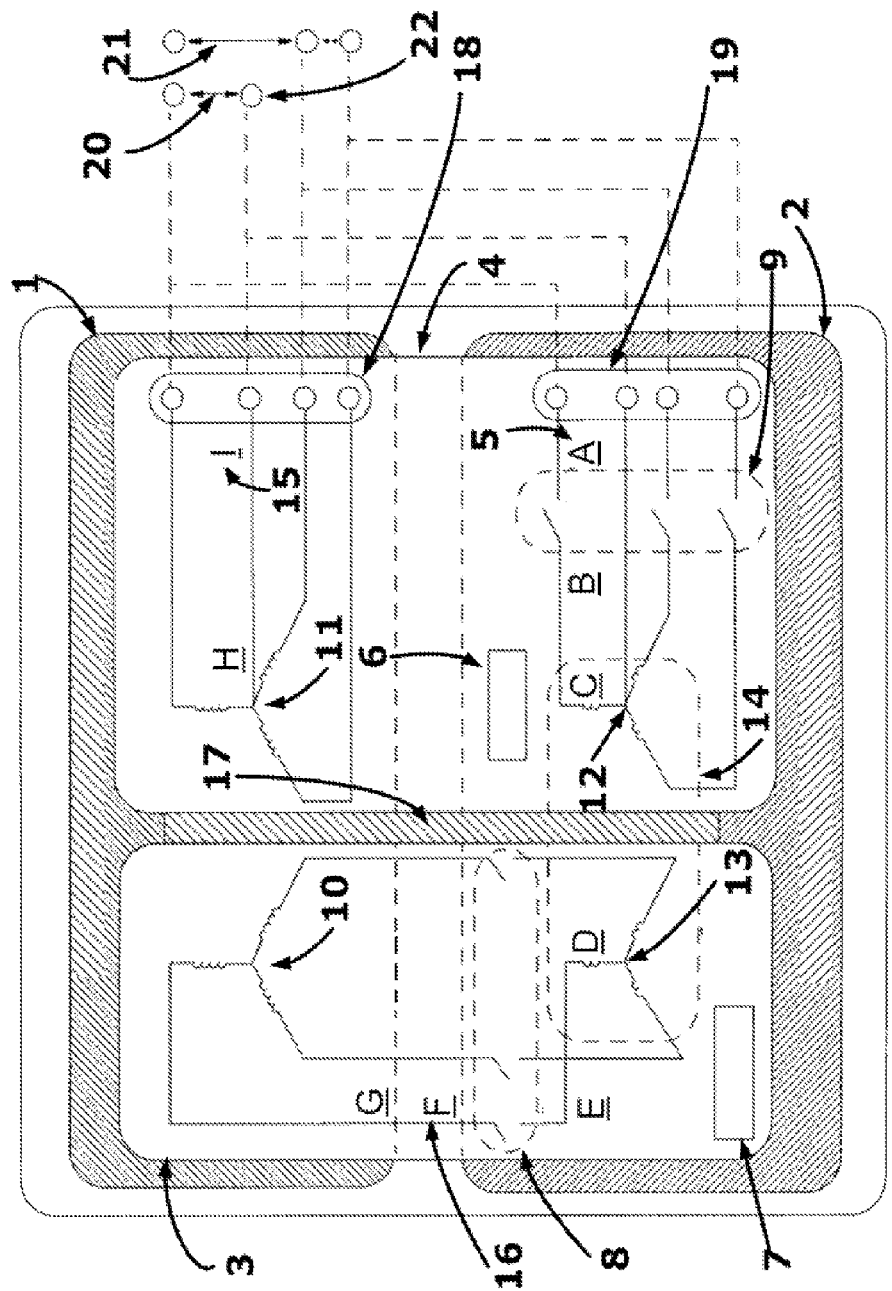
FIG. 1 schematically illustrates a Rotor Excitation Generator (REG) exciting a Power Generator Motor (PGM), which is a Wound-Rotor Doubly-Fed Electric Machine of the Klatt patents with subtle details of new art that resulted from years of research never publicly disclosed. It will be used with FIG. 2 and FIG. 3 for conceptually demonstrating the prior art of brushless multiphase Self-Commutation.

The Brushless Multiphase Self-Commutation Controller (BMSCC) or Real Time Emulation Controller (RTEC) is a contact-less means of reliable propagating conditioned or re-fabricated electrical power between relatively isolated moving bodies while naturally inducing any potential mechanical speed or positional movement between the bodies as frequency and phase components onto the original electrical waveform by means of an Electro-magnetic Self-Commutator (i.e., electromagnetic computer or rotor excitation generator). The Brushless Multiphase Self-Commutation Controller (BMSCC) or RTEC is a new embodiment of a Rotor Excitation Generator (REG), which is a component associated with the Electric Rotating Apparatus and Electric Machine System patents of Klatt. As an electromagnetic self-commutator, the REG operates in principle to the only other example of true self-commutation, which is the "electro-mechanical" self-commutator of the venerable DC (or AC Universal) electric machine (e.g., DC motor). Without speed control, Self-Commutation will naturally accelerate the rotating body of the excited electric machine to mechanical limit or destruction. BMSCC provides other important inventions and new art, called synergistic art, which were not known at the time of the original Klatt patents but required for practical reality and heightened performance of the REG for reliable control of electric apparatus. An electric apparatus complemented with BMSCC is an electric apparatus "system."

BMSCC provides new synergistic art to the REG for practical control of electrical power flowing between the rotor and stator winding sets of a Position Dependent Flux High Frequency Transformer (or PDF-HFT), which is surrounded by an arrangement of integral modulator-demodulators combinations or MODEMs on each side of the PDF-HFT. The flow control of electrical power is accomplished by gating the MODEMs with new modulation techniques that symmetrically share weighted portions of high frequency periodic packets of magnetic energy in the core of the PDF-HFT in synchronous rhythm to the oscillating magnetic field provided by the new art of a Magnetic Current Generator means (or MCG). As a result, the signal waveforms seen at one port of the BMSCC are re-fabricated to signal waveforms with additional waveform components associated with the dynamic control or with the movement of the PDF-HFT. The new synergistic art of BMSCC comprises: 1) a Position Dependent Flux High Frequency Transformer (or PDF-HFT) with an air-gap for potential movement or without an air-gap surrounded by an arrangement of synchronous Modems; 2) perhaps a Position Independent Flux High Frequency Transformer (or PIF-HFT) in combination with a PDF-HFT with an air-gap; 3) a Magnetic Current Generator means or MCG, which first establishes a oscillating magnetic field in the PDF-HFT for providing the basis of synchronous or compensated modulation; 4) Compensated modulations techniques, which comprise Compensated Time Offset Modulation (CTOM), Compensated Pulse Density Modulation (CPDM), or combination; 5) Environmental Stress Immunity Means because of the unique operating environment of BMSCC; 6) High frequency magnetic performance design because of the unique high frequency magnetic operating environment of BMSCC; 7) Sharing high frequency magnetic energy between windings only provided by a PDF-HFT with CTOM or CPDM; and 8) New Rotor Excitation Generator (REG) art or new Stationary Excitation Generator (SEG) art, depending on the category or type of electric apparatus being excited, such as singly-fed and doubly-fed electric machine systems. The resulting torque (or force) produced by the PDF-HFT is irrelevant to the electric apparatus system because torque is directly proportional to the mutual inductance of the PDF-HFT, which is inversely proportional to the high operating frequency of the PDF-HFT.

Figure 4:
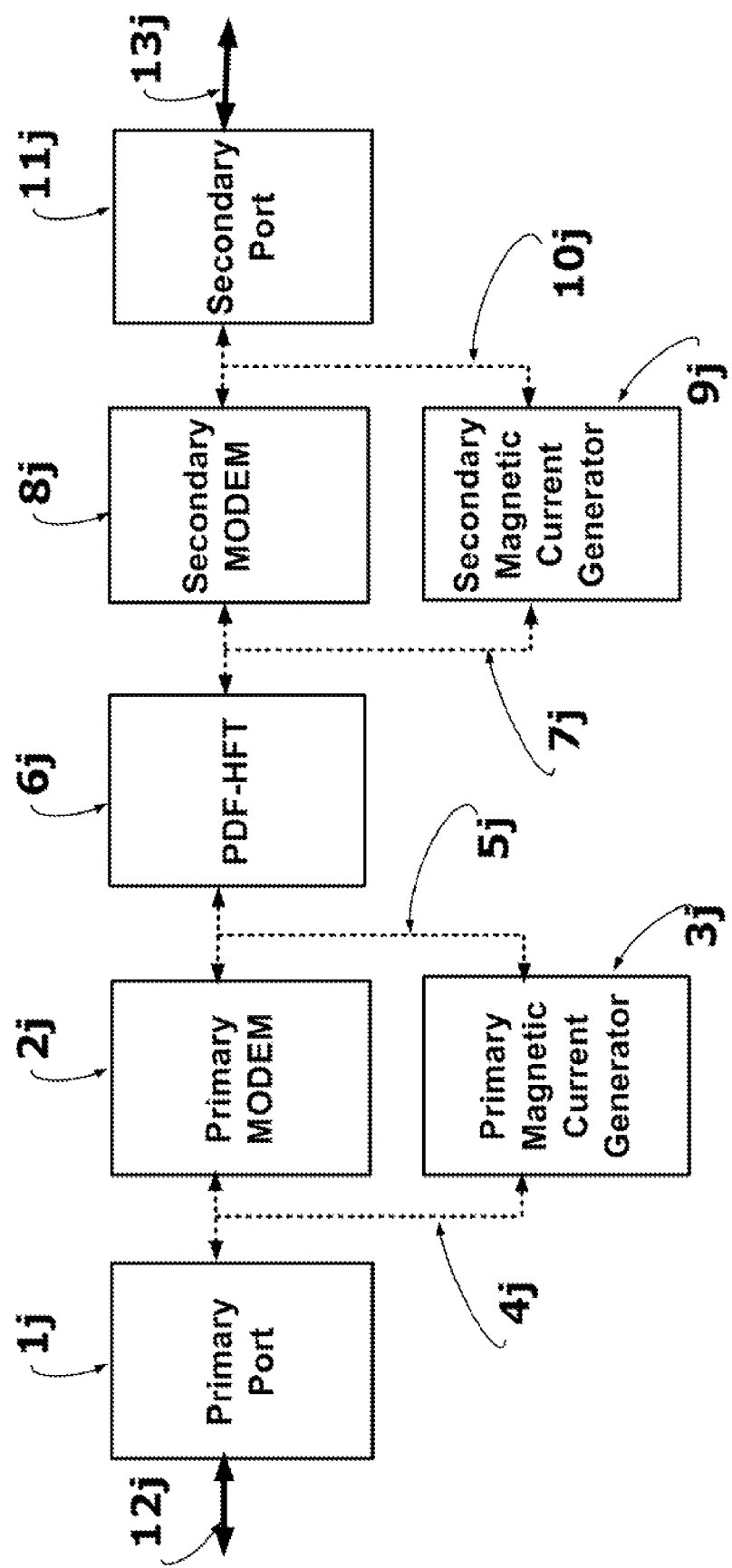
FIG. 4 shows a simple block diagram of the building blocks of a basic BMSCC.

FIG. 4 shows a simple building block diagram representation of one configuration of a Brushless Multiphase Self-Commutation Controller or BMSCC. A BMSCC always includes a PDF-HFT $6j$ and similar to any transformer, the PDF-HFT has a primary side and a secondary side of electrical phase winding sets. The high frequency winding sets on the primary side of the PDF-HFT are connected to the Primary MODEM $2j$ and to the Primary Magnetic Current Generator $3j$ by the primary side high frequency bi-directional electrical path $5j$, phase to phase, respectively. Similarly, the Primary Port $1j$, which may have as many electrical phase or primary signal terminals as the low frequency AC supply circuit $12j$, is connected to the low frequency side of the Primary MODEM $2j$ and the Primary Magnetic Current Generator $3j$ by the primary side low frequency bi-directional electrical path $4j$, phase to phase, respectively. In an analogous fashion, the high frequency winding sets on the secondary side of the PDF-HFT are connected to the Secondary MODEM $8j$ and the Secondary Magnetic Current Generator $9j$ by the secondary side high frequency bi-directional electrical path $7j$, phase to phase, respectively. The Secondary Port $11j$, which has as many electrical phase or secondary signal terminals as the electrical circuit to the electric apparatus being controlled, $13j$, is connected to the low frequency side of the Secondary MODEM $8j$ and the Secondary Magnetic Current Generator $9j$ by the secondary side low frequency bi-directional electrical path $10j$, phase to phase, respectively, which are similar to the waveforms seen at the first port $1j$ but re-fabricated or conditioned with controllable position and speed-synchronized waveforms of any number of electrical phases or secondary signals as necessary to excite an electrical apparatus seen at $13j$. The new art of the Primary and Secondary Magnetic Current Generators comprise circuitry with electronic switches (or gates) and gating control means to first establish and then manage the magnetizing current of the oscillating magnetic fields in the PDF-HFT, called compensated gating, for basis of the new modulation art, called compensated modulation. The new art of the Primary and Secondary MODEMs comprise the synchronous MODEM circuits with the dynamics of compensated modulation to provide gating control of the MODEMs, called compensated gating dynamics. It should be understood and obvious to experts that the Primary Magnetic Current Generator 3*j* and Primary MODEM 2*j* circuits and the Secondary Magnetic Current Generator 9*j* and Secondary MODEM 8*j* circuits comprise numerous designs, such push-pull and full bridge switching circuits, such as shown in off-the-shelf power electronic textbooks. Similarly, the Magnetic Current Generator and Synchronous MODEM blocks can be duplicated in parallel or integrated into a single circuit or block with integrated gating and control circuits. As a simple building block representation, FIG. 4 shows no supporting circuitry. Symmetry of BMSCC dictates the primary and secondary sides of FIG. 4 can be interchanged without affect.

To better understand the prior art of electromagnetic self-commutation, which is only found in the Klatt patents and in BMSCC, a description of the patents will be presented with the new art of BMSCC subtly included.

FIG. 1 shows a simple electrical schematic representation of a parallel connected circuit topology that is the only means available to potentially overcome the Achilles' heel of a Wound-Rotor Electric Machine System without relying on asynchronous principles and as a result, the potential realization of a true Brushless Wound-Rotor [Synchronous] Electric Machine System that is stable at any speed. As a simple electrical representation, the schematic makes no attempt to show the Brushless Wound-Rotor [Synchronous] Electric Machine System in physical or working detail. The schematic, which represents a three-phase system for example, is divided into four highlighted sections that overlap quadrants at the four corners of the figure. The very top section is the Power Generator Motor or PGM 1 and the very bottom section is the Rotor Excitation Generator or REG 2, both of which intersect the very left section, the Rotor Assembly 3, and the very right section, the Stator Assembly 4. To allow relative movement between the Rotor and Stator Assemblies, the Rotor Assembly 3 and Stator Assembly 4 are separated by an air-gap 17. The Power Generator Motor or PGM 1 includes the PGM stator active winding set portion 11 of the Stator Assembly 4 and the PGM rotor active winding set portion 10 of the Rotor Assembly 3. The PGM 1 is the actual wound-rotor doubly-fed electromechanical converter or torque producing electric machine entity and operates at the low line frequency (e.g., 60 Hz). The very bottom quadrant labeled the Rotor Excitation Generator or REG 2 includes the REG stator winding 12 and electronic portion 9 & 6 of the Stator Assembly 4, the REG rotor winding 13 and electronic portion 8 & 7 of the Rotor Assembly 3. The electronic components of the REG are the Switch Synchronizer 7, the Rotor Synchronous Modulator/Demodulator (i.e., MODEM) 8, the Stator Synchronous Modulator/Demodulator (i.e., MODEM) 9 and the Controller Processor 6. The Rotor Synchronous MODEMs 8 contains three switch groups, each of which grossly represents one bi-directional switching circuit topology per phase of the three phase circuit topology. The Stator Synchronous MODEMs 9 contains three switch groups, each of which grossly represents one bi-directional switching circuit topology per phase of the three phase circuit topology. The Brushless Wound-Rotor [Synchronous] Electric Machine System presented has two terminals or ports for electrical phase power connections, the PGM Electrical Port 18 and the REG Electrical Port 19. Either electrical port may comprise a neutral terminal 22, single-phase terminals 20 or multiphase terminals 21.

The REG is a unique means to propagate electrical excitation power to the PGM rotor winding set in accordance with synchronous operation and without electromechanical contact of any kind (i.e., brushless). Together, the REG stator winding set 12 and rotor winding set 13 make up the multiphase High Frequency Rotating (or Moving) Transformer (HFRT) 14. The far right side section labeled the Stator Assembly 4 includes the stator body portions of both the PGM and REG and associated components. The far left section labeled the Rotor Assembly 3 includes the rotor body portions of both the PGM and REG, which are physically attached and as a result, move with the same speed and position relative to the Stator Assembly 4. As shown in the schematic, the PGM is a Doubly-Fed Wound-Rotor Synchronous Electric Machine because it has an Active Winding Set 10 on its Rotor Assembly 3 and an Active Winding Set 11 on its Stator Assembly 4. An active winding set actively participates in the energy conversion process and could be considered an armature winding set. Following standard electric machine concepts, the stator winding set of the PGM 11 could be replaced with a DC Passive Winding Set or Permanent Magnet assembly. Further, the PGM with a compatible REG could be a linear electric machine with moving bodies rather than rotating bodies.

Figure 2:
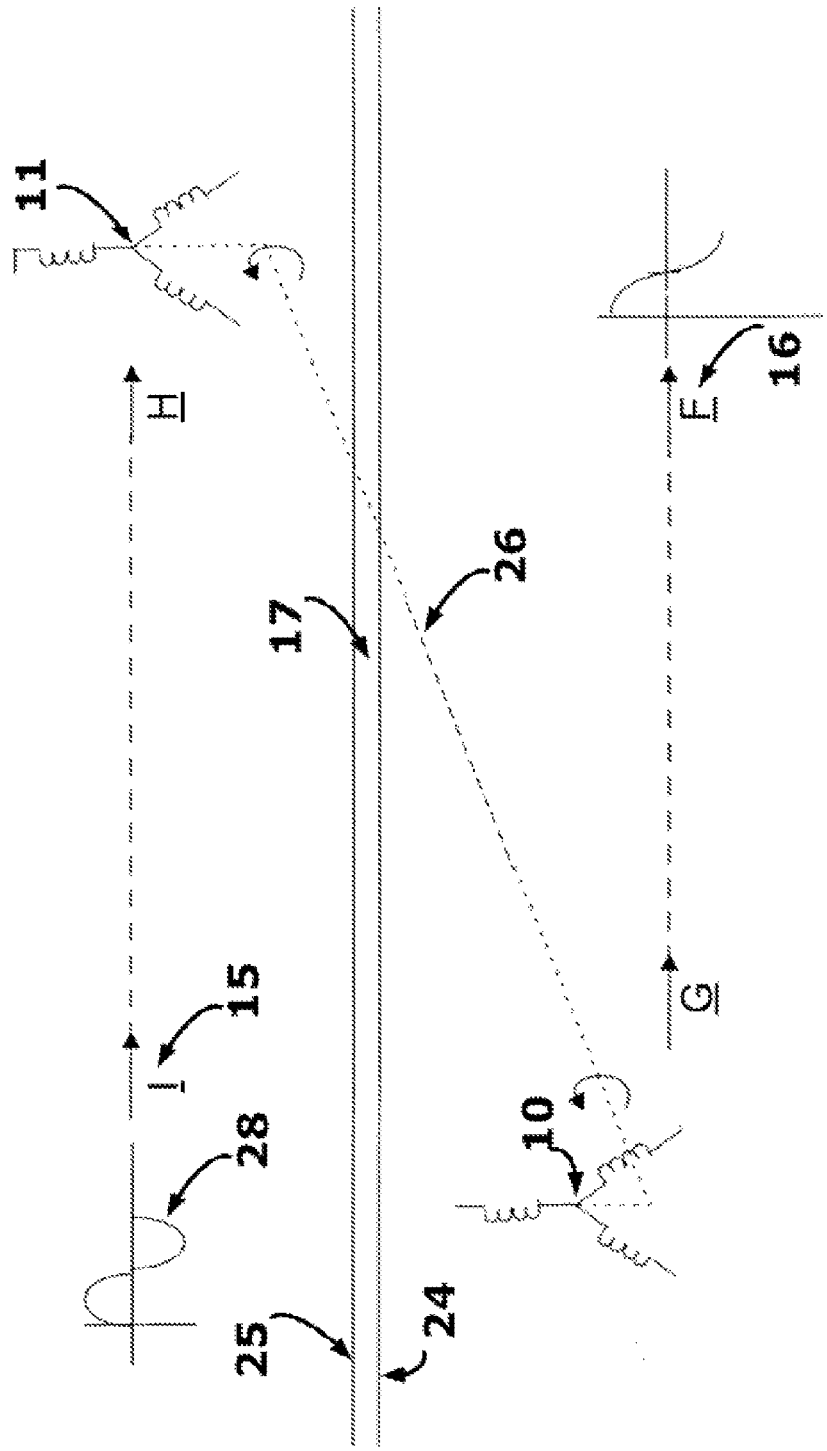
FIG. 2 demonstrates the signal flow through the PGM entity as referenced to FIG. 1.

FIG. 2 describes the electrical signal flow through the PGM for a single Alternating Current (AC) Phase. The electrical signal relationships as a result of electric machine analysis, theory, and empirical verification will accompany the descriptions that follow. The same analysis holds for each of any other AC Phase signals of the multiphase AC port in accordance with their relative phase relationship.

The electrical signal flow analysis through the PGM 1 (very top section 1 of FIG. 1) can be analyzed by cross referencing the underlined letters (I & F) at 15 and 16 in FIG. 1 with the arrows labeled with the same underlined letters at 15 & 16, shown in FIG. 2, starting with I at 15 and ending with F at 16. The stator AC phase signal I at 15, which is at frequency $W_S$, drives its respective phase winding H of the PGM Stator Winding Set 11. Although the stator side boundary 25 and rotor side boundary 24 are separated by an air-gap 17, the Stator and Rotor winding sets on the stator side and the rotor side, respectively, are in appropriate proximity for electromagnetic coupling. The rotor winding set 10 rotates relative to the stator winding set 11 along the common axis 26. It follows that the PGM functions as a rotating transformer as well as its primary function, which is an electromechanical energy converter, because of the high air gap Flux Density and mutual inductance do to its low frequency of operation. As a result, the electrical signal(s) I at 15 applied to the PGM stator winding set 11 at H are induced onto the PGM rotor winding set 10 at G with a change in electrical phase angle determined by the mechanical movement of the rotor winding set 10 relative to the stator winding set 11. The electrical frequency of the resulting signal F at 16 on the rotor winding set 10 has a mechanical phase and speed component associated with it. To appropriately excite the rotor winding set 10 of the PGM by the REG for synchronous operation, the moving body excitation signal F at 16 developed by the RE must follow the same dynamic signal waveform relationship as just discussed for the PGM.

For the example of FIG. 2, which is a three phase AC PGM, the relationships of three stator phase signals 28 applied to the respective PGM terminals I at 15 for each of the PGM phase windings H at 11 are:

$$\text{PHASE\_A}_S = A_S \cos(W_S T);$$

$$\text{PHASE\_B}_S = B_S \cos\left(W_S T + \frac{2\pi}{3}\right);$$

-continued $$\text{PHASE\_C}_S = C_S \text{COS}\left(W_S T + \frac{4\pi}{3}\right);$$

where $A_S$, $B_S$, and $C_S$ are the stator amplitudes, $W_S$ is the frequency, and T is the time. These signals are applied to their respective phase terminals of the PGM stator active winding set 11. For the case of a single phase excitation, only one of these signals is applied. The PGM stator phase winding 11 on the stator side 25 of the air-gap 17 has a common axis 26 with the PGM rotor phase winding 10 on the rotor side 24 of the air-gap. As the PGM rotor phase winding 10 moves relative to the common axis 26, the induced PGM rotor phase signals at G or 27 are:

$$\text{PHASE\_A}_R \propto \begin{cases} A_S(\pm W_S \pm W_M)\text{SIN}(\pm W_S T \pm W_M T + \alpha) + \\ B_S(\pm W_S \pm W_M)\text{SIN}\left(\pm W_S T \pm W_M T + \alpha + \frac{2\pi}{3}\right) + \\ C_S(\pm W_S \pm W_M)\text{SIN}\left(\pm W_S T \pm W_M T + \alpha + \frac{4\pi}{3}\right) \end{cases} \propto$$

$$\left(\frac{3}{2}\right) A_S \text{SIN}(\pm W_R T + \alpha);$$

$$\text{PHASE\_B}_R \propto \begin{cases} A_S(\pm W_S \pm W_M)\text{SIN}\left(\pm W_S T \pm W_M T + \alpha - \frac{2\pi}{3}\right) + \\ B_S(\pm W_S \pm W_M)\text{SIN}(\pm W_S T \pm W_M T + \alpha) + \\ C_S(\pm W_S \pm W_M)\text{SIN}\left(\pm W_S T \pm W_M T + \alpha - \frac{4\pi}{3}\right) \end{cases} \propto$$

$$\left(\frac{3}{2}\right) A_S \text{SIN}\left(\pm W_R T + \alpha + \frac{2\pi}{3}\right); \text{ and}$$

$$\text{PHASE\_C}_R \propto \begin{cases} A_S(\pm W_S \pm W_M)\text{SIN}\left(\pm W_S T \pm W_M T + \alpha - \frac{4\pi}{3}\right) + \\ B_S(\pm W_S \pm W_M)\text{SIN}\left(\pm W_S T \pm W_M T + \alpha - \frac{2\pi}{3}\right) + \\ C_S(\pm W_S \pm W_M)\text{SIN}(\pm W_S T \pm W_M T + \alpha) \end{cases} \propto$$

$$\left(\frac{3}{2}\right) A_S \text{SIN}\left(\pm W_R T + \alpha + \frac{4\pi}{3}\right);$$

where $W_M$ and $\alpha$ are the relative mechanical speed and position components, respectively, between the stator side 25 and rotor side 24 along the common axis 26 at an instant of time. With the expansion of relationships, the synchronous speed relation, $\pm W_S T \pm W_M T \pm W_R T = 0$ or $$fm = \frac{\pm fs \pm fr}{P} \quad \text{Synchronous Speed Relation}$$

must be satisfied for synchronous operation and the production of useful torque.

Figure 3:
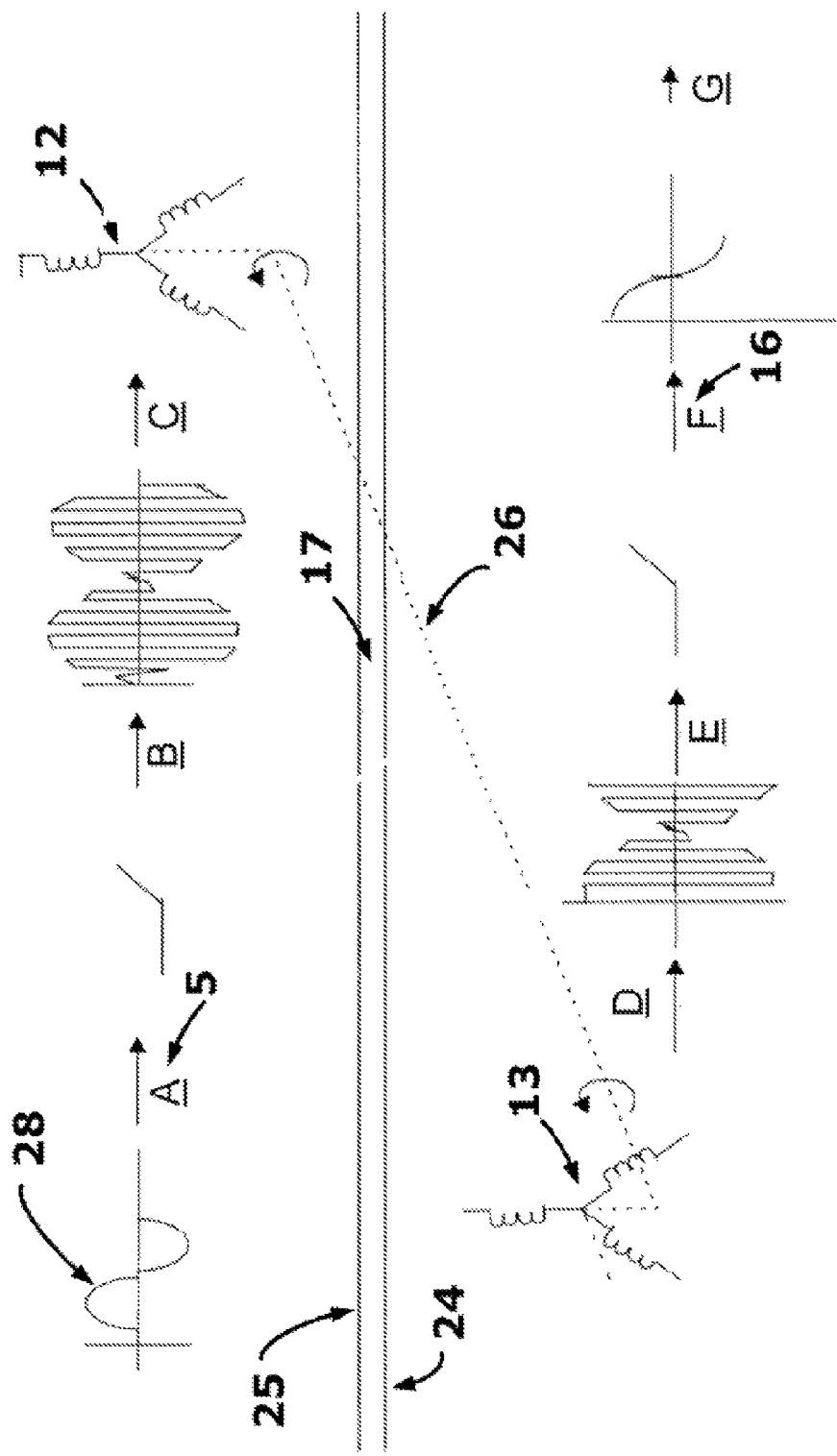
FIG. 3 demonstrates the signal flow through the REG entity as referenced to FIG. 1

FIG. 3 describes the electrical signal flow through the REG of a single Alternating Current (AC) Phase. The electrical signal relationships as a result of electric machine analysis, theory, and empirical verification will accompany the descriptions that follow. The same analysis holds for each of any other AC Phase signals of the multiphase AC port in accordance with their relative phase relationship.

The electrical signal flow analysis through the REG 2 (very bottom section 2 of FIG. 1) can be analyzed by associating the underlined letters (A & F) shown at 5 & 16 in FIG. 1 with the arrows labeled by the same underlined letters at 5 & 16 shown in FIG. 3, starting with A at 5 and ending with F at 16. Although the stator side boundary 25 and rotor side boundary 24 are separated by an air-gap 17, the Stator and Rotor winding sets of the HFRT are in appropriate proximity for electromagnetic coupling. Initially, the REG chops (or gates) each phase of the multiphase AC port signal A at 5 independently by an AC chopper circuit (i.e., Synchronous MODEM) with an operating frequency (or carrier frequency) that is at least an order magnitude higher than the AC or DC modulation envelop frequency (e.g., kHz versus tens of Hz). The chopped signal B is an unbiased modulated signal and as a result, each symmetrically bipolar transition through the crossing of the zero current or voltage level of the chopper (or carrier) frequency shows virtually no DC bias (i.e., unbiased modulation). As previously mentioned, each Synchronous MODEM on the stator (and rotor) is essentially an arrangement of bi-directional AC power switches that symmetrically oscillates the current flow (or power) through the HFRT by gating the circuit of electrical power switches at a rate that is synchronous to the carrier frequency of the modulation. This modulated carrier frequency signal B drives its respective phase winding C of the HFRT Stator Winding Set. The modulation envelope of the resulting induced phase signal on the rotor body D & E includes a speed and position component associated with the mechanical movement of the rotor winding set relative to the stator winding set. This modulated carrier frequency signal (D & E) passes through the rotor Synchronous MODEM E at 8. Since the Rotor and Stator Synchronous MODEMs gate synchronously with the carrier frequency, the signals are synchronously demodulated, resulting in only the modulation envelope F at 16 remaining. Since the rotor and associated multiphase winding set of the HFRT are attached to the rotor and associated winding set of the PGM, both move at the same speed or position and experience the same electromagnetic and mechanical dynamics. As a result, the demodulated envelop of the REG signals F at 16 shown in FIG. 3 has the same electrical frequency and wave relation as the PGM signals F at 16 shown in FIG. 2 regardless of speed. It follows the REG signals F at 16 shown in FIG. 3 can be directly applied as excitation to the respective phase winding of the PGM F at 16 shown in FIG. 1 for brushless speed-synchronized excitation. Each of the other phases will experience the same result in accordance with its appropriate phase shift. Still, the transfer of power must be controlled for practical operation.

For the example of FIG. 3, which is a three phase REG, the relationships of three stator phase signals 28 applied to the REG terminals at A 5 are:

$$\text{PHASE\_A}_S = A_S \text{COS}(W_S T);$$

$$\text{PHASE\_B}_S = B_S \text{COS}\left(W_S T + \frac{2\pi}{3}\right); \text{ and}$$

$$\text{PHASE\_C}_S = C_S \text{COS}\left(W_S T + \frac{4\pi}{3}\right);$$

where $A_S$, $B_S$, and $C_S$ are the stator amplitudes, $W_S$ is the frequency, and T is the time. These signals are the same signals applied to the stator windings of the PGM. After passing through the stator synchronous MODEM between A and B, the signals at B become high frequency carrier $W_C$ or chopping frequency signals with the modulation envelope of the applied signals, $W_S$. The signal relationships are:

$$\text{PHASE\_A}_{SC} = A_{SC} \times \cos(W_C T)\sin(W_S T);$$

$$\text{PHASE\_B}_{SC} = B_{SC} \times \cos(W_C T)\sin\left(W_S T + \frac{2\pi}{3}\right); \text{ and}$$

$$\text{PHASE\_C}_{SC} = C_{SC} \times \cos(W_C T)\sin\left(W_S T + \frac{4\pi}{3}\right).$$

The signals at C are applied to their respective phase terminals of the REG stator active winding set 12. For the case of a single phase excitation, only one of these signals is applied. The REG stator phase winding 12 on the stator side 25 of the air-gap 17 has a common axis 26 with the REG rotor phase winding 13 on the rotor side 24 of the air-gap. As the rotor phase winding moves relative to the common axis 26, the induced REG rotor phase signals at D are:

$$\text{PHASE\_A}_{RC} \propto \left(\frac{3}{2}\right) A_{SC} W_C \cos(W_C T)\sin(\pm W_S T \pm W_M T + \alpha);$$

$$\text{PHASE\_B}_{RC} \propto \left(\frac{3}{2}\right) B_{SC} W_C \cos(W_C T)\sin\left(\pm W_S T \pm W_M T + \alpha + \frac{2\pi}{3}\right); \text{ and}$$

$$\text{PHASE\_C}_{RC} \propto \left(\frac{3}{2}\right) C_{SC} W_C \cos(W_C T)\sin\left(\pm W_S T \pm W_M T + \alpha + \frac{4\pi}{3}\right);$$

which follow the same analysis as the PGM signals with the exception of the carrier frequency component, $W_C$. $W_A$ and $\alpha$ are the relative mechanical speed and position, respectively, between the stator side 25 and rotor side 24 along the common axis 26. The signals E pass through the rotor synchronous MODEM between E and F to remove or demodulate the carrier frequency component with the following signal results at F 16:

$$\text{PHASE\_A}_R \propto \left(\frac{3}{2}\right) A_{SC} W_C \sin(W_R T + \alpha);$$

$$\text{PHASE\_B}_R \propto \left(\frac{3}{2}\right) B_{SC} W_C \sin\left(W_R T + \pi + \frac{2\pi}{3}\right); \text{ and}$$

$$\text{PHASE\_C}_R \propto \left(\frac{3}{2}\right) C_{SC} W_C \sin\left(W_R T + \alpha + \frac{4\pi}{3}\right);$$

with the expansion of relationships and satisfying the synchronous speed relation, $$fm = \frac{\pm fs \pm fr}{P} \quad \text{Synchronous Speed Relation}$$

or $\pm W_S T \pm W_M T \pm W_R T = 0$. The relative angle $\alpha$ of the REG signals includes the relative phase angle between the PGM stator winding set and the REG stator winding set. The REG rotor phase signals at F 16 of FIG. 3 have the same frequency component as the PGM rotor phase signals at F 16 of FIG. 2.

As just described with the new art of BMSCC subtly included, the REG brings together a combination of preliminary requirements for stable and brushless Self-Commutation control of the Wound-Rotor Synchronous Doubly-Fed Electric Machine that has continued to elude electric machine experts as is constantly reminded by past, present, and ongoing doubly-fed electric machine research. The preliminary requirements are: 1) "Self-Commutation" or the inherent and instantaneous translation of multiphase AC signals with any excitation frequency to a speed-synchronized multiphase AC signal that is without any process disrupting steps associated with "non-Self-Commutation" or derivatives of Field Oriented Control (FOC), such as electronic coordinate transformations; 2) the propagation of multiphase electrical power across the air-gap without electromechanical contact (i.e., brushless); 3) the even distribution of currents and voltages over the entire excitation waveform; 4) the natural mitigation of undesired disturbances; 5) the isolation of high frequency signals from low frequency components, such as the power source or the PGM windings; and 6) the inherent potential of soft switching (i.e., resonant switching) or the turn-on or turn-off of switching at zero current or voltage.

The new "Synergistic Art" provided by BMSCC makes REG control practical and reliable. Each topic of synergistic art will be explained in detail, which are: 1) the new art Rotor Excitation Generator (or REG); 2) the Stationary or Static Excitation Generator (or SEG); 3) the Position Dependent Flux High Frequency Transformer (or PDF-HFT); 4) the Position Independent Flux High Frequency Transformer (or PIF-HFT) and the PDF-HFT+PIF-HFT Combination; 5) the Magnetizing Current Generator means (or MCG); 6) the Compensated Transition Offset Modulation (or CTOM); 7) the Compensated Pulse Density Modulation (or CPDM), 8) the CTOM-CPDM combination; 9) the high frequency magnetic energy sharing (or HFMES); 10) the Environmental Stress Immunity; 11) the high frequency magnetic design, and 13) the CTOM-CPDM Modulation Start-Up.

Before explaining each component of BMSCC synergistic art in detail, it should be understood that electronic and electrical circuit arrangements and configurations, electronic and electrical component arrangements and configurations, winding arrangements and configurations, mechanical arrangements and configurations, manufacturing and construction techniques, and up-to-date or new material and science for implementing all embodiments of BMSCC (or RTEC) are numerous in nature and are extensions of this invention when incorporated.

New Synergistic Art of the Rotor Excitation Generator (or REG): The REG provides a new embodiment of the Rotor Excitation Generator (REG) found in the Klatt patents. Referring to FIG. 4, the REG comprises the new art of Primary MODEMs 2j and Primary Magnetic Current Generators 3j and Secondary MODEMs 8j and Secondary Magnetic Current Generators 9j on each side of a Position Dependent Flux High Frequency Transformer (PDF-HFT) 6j, which incorporate new modulation means call compensated modulation and other new synergistic art, such as environmental stress immunity means, for practical Real Time Emulation Control (RTEC) or Brushless Multiphase Self-Commutation Control (BMSCC). Under this new embodiment, the REG may have at least one junction of movement, if an air gap junction is incorporated into the PDF-HFT between the primary or secondary side of the PDF-HFT, for directly inducing an angular velocity (speed) and phase waveform component. Modems and Magnetizing Current Generators can be placed at a practical distance from the PDF-HFT without changing the operating principles.

In another embodiment, an REG is not allowed to rotate or move with the movement of the electric apparatus and the PDF-HFT may be without an air gap junction. In this embodiment any additional waveform component is re-fabricated waveform components as a result of new BMSCC modulation control sharing the oscillating magnetic energy between phase windings of the PDF-HFT.

New Synergistic Art of the Stationary (Static) Excitation Generator (or SEG): The SEG provides a new second embodiment of the Rotor Excitation Generator (REG). Referring to FIG. 4, the Stationary (Static) Excitation Generator (SEG) comprises a Position Dependent Flux High Frequency Transformer (PDF-HFT) and a Position Independent Flux High Frequency Transformer (PIF-HFT) combination, which would replace the PDF-HFT 6j. The number of secondary phase windings of the PDF-HFT equals the number of secondary phase windings of the PIF-HFT. Each secondary phase winding of the PDF-HFT connects with one phase winding of the secondary windings of the PIF-HFT perhaps on a phase-to-phase basis and the entire combination is referred to as the PDF-HFT+PIF-HFT Combination. The Stationary (Static) Excitation Generator (SEG) further comprises the new art of MODEMs with Magnetic Current Generator means situated on the primary side (e.g., stationary side) 2j & 3j and secondary side (e.g., rotating (moving) side) 8j & 9j of the PDF-HFT+PIF-HFT Combination and incorporates the new modulation means call compensated modulation and other synergistic art, such as environmental stress immunity means, for Real Time Emulation Control (RTEC) or Brushless Multiphase Self-Commutation Control (BMSCC). Under this new embodiment, the SEG may have at least two junctions of movement, if an air-gap junction is incorporated in both the PDF-HFT and the PIF-HFT of the PDF-HFT+PIF-HFT Combination for free movement between the primary and secondary sides of the PDF-HFT+PIF-HFT Combination. With two air-gaps of articulation, both the secondary side and primary sides of the PDF-HFT+PIF-HFT Combination can be stationary regardless of the movement of the common moving bodies of the PDF-HFT+PIF-HFT Combination. If the SEG is allowed to rotate (or move) with the movement of the electric apparatus, an angular velocity (speed) and phase waveform component is inherently and instantaneously established on to the modulation envelop of the electrical phase signals at the secondary side terminals of the PDF-HFT+PIF-HFT Combination in accordance to the relative movement or position as viewed from the primary side terminals of the SEG including any fabricated waveform component established on the primary side signals as a result of BMSCC. As an example with this embodiment, the SEG brushlessly delivers speed and phase synchronized excitation signals of any number of phases directly from "Stationary-Side", which is the primary side of the PDF-HFT+PIF-HFT Combination, to the "Stationary-Side", which is the secondary side of the PDF-HFT+PIF-HFT Combination. As a result, the SEG is ideally suited for exciting stationary active winding sets with excitation waveforms that are synchronized to the speed of the SEG shaft, such as exciting the stationary active winding set of all types of electric machines, including Permanent Magnet synchronous electric machines, squirrel cage induction electric machines, Reluctance electric machines, so-called Induction Doubly-Fed Electric Machines, and all other Singly-Fed electric machines. For instance, if the SEG is exciting an induction machine, the input frequency to the PDF-HFT+PIF-HFRT Combination may be the desired slip frequency by the new art of sharing and if the SEG is exciting a DC machine, the input frequency to the PDF-HFT+PIF-HFRT Combination may be DC.

It should be understood that any new embodiment or art as a result of RTEC (or BMSCC) is adaptable to both the REG and SEG. Further, the REG and SEG can support DC electrical power sources, single phase AC electrical power sources, or multiphase AC electrical power sources. As used herein, REG and SEG are interchangeable terms, since the distinguishing difference between the REG and SEG is the PIF-HFT component of the PDF-HFT+PIF-HFT Combination, as described.

New Synergistic Art of the PDF-HFT: The Position "Dependent" Flux High Frequency Transformer (PDF-HFT) is designed to re-distribute the magnetic flux energy between all phase windings on opposite sides (i.e., the primary side and the secondary side) as a function of movement or by sharing magnetic energy between PDF-HFT windings. If non-obstructive movement (or positioning) is provided, the primary and secondary sides would be separated by at least one air gap. Also, an air gap may be incorporated to more evenly distribute the flux density throughout the core of the transformer. While re-distributing the high frequency magnetic flux energy in the core of the PDF-HFT as a result of movement (or positioning), the PDF-HFT automatically and instantaneously induces the angular velocity (speed) and phase (position) component of the movement onto any excitation signal waveform at its winding terminals while propagating electrical power across its air gap. Therefore, the winding sets of the PDF-HFT with any number of phase windings are physically arranged about the air gap area so any relative movement (or positioning) between the primary (or stationary) and secondary (or moving) sides will vary the state of the magnetic flux cutting the phase winding sets, such as varying the physical area (or length) of the magnetic path cutting the phase winding sets. One way to accomplish this is to evenly distribute (or balance) and overlap each of the AC phase windings according to phase angle along a plane that is perpendicular to the magnetic path. This is a similar action experienced by electric machines or the PGM and as a result, the PDF-HFT follows the same operating principles as described for the PGM during the discussion of FIG. 1, FIG. 2, and FIG. 3. Any signal seen on the rotation (or moving) side of the PDF-HFT will include a mechanical speed and phase component as referenced to any signal waveform on the stationary side (or vice-versa) with a step-up, step-down, or neutral magnitude multiplication as a result of the winding-turns ratio. The flux path of the PDF-HFT can be a radial magnetic field path (cylindrical form factor), transverse flux, or an axial magnetic field path (pancake or hockey puck form factor) as referenced to the axis of rotation (or movement) of the shaft. The PDF-HFT can be symmetrical with the same number of phase windings between the rotor and stator sides or asymmetrically with a different number of phase windings between the rotor and stator sides. The PDF-HFT can be designed for linear movement or rotational movement because the same electromagnetic theory applies.

Figure 10:
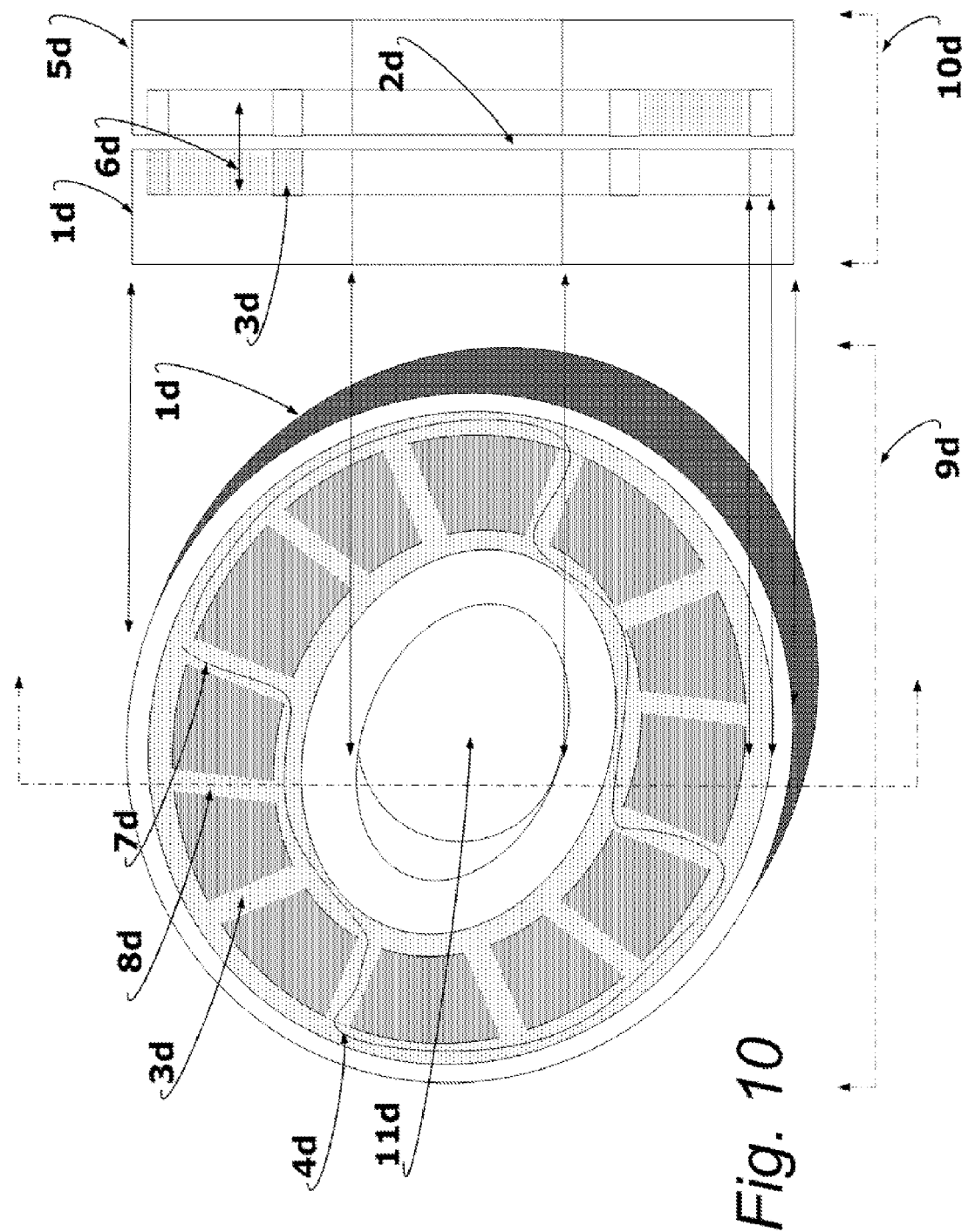
FIG. 10 is a perspective photographic view of either the rotating (or moving) or stationary section of the Position Dependent Flux High Frequency Transformer (PDF-HFT) including an assembled sectional view, which incorporates both stationary and rotating sections of the PDF-HFT, and accordingly, illustrates one embodiment of the PDF-HFT, which is an axial flux (or pancake) design with an air gap junction for non-obstructive movement.

FIG. 10 shows the air-gap face half of one embodiment of the PDF-HFT in 3-dimensions 9d with an isometric equivalency 10d showing two halves with faces adjacent at the air-gap. This embodiment of the PDF-HFT includes an air gap 2d for non-obstructive rotation (or movement) about its annulus 11d and for even distribution of the flux density. It is an axial flux design (or pancake form factor) because the flux direction 6d is perpendicular to the face (as shown) or parallel to the axis of rotation (or annulus 11d). Understand another embodiment of the PDF-HFT can be a radial flux design, where the flux direction is perpendicular to the axis of rotation, or transverse flux design. One half of the PDF-HFT core 1d has radial winding slots 7d, 3d, 8d on its face filled with a crude representation of almost one winding-turn 4d of one phase with two pole-pairs. In actuality, there may be more turns per pole or more pole-pairs. Additional phases may include separately excited windings that meet the phase criteria. For this specific example, each of the three windings of a 3-Phase PDF-HFT would be spaced 120 degrees apart or the phase winding 4d as shown rotated by one slot for each of the other phase windings, since there are only 12 slots in this three-phase example. Therefore, Phase-1 winding may start at slot 7d (as shown), Phase-2 winding may be a duplicate of Phase-1 winding but may start at slot 8d, and phase 3 winding may be a duplicate of Phase-1 winding but may start at slot 3d. Understand, the number of slots is any factor of the number of phases. The magnetic flux 6d flows through the air gap 2d in an axial direction or parallel to the axis of rotation (and perpendicular to the plane of the overlapped phase windings) and this embodiment would be considered a pancake or axial flux core design. Two like pancake winding cores 1d and 5d are placed face to face in proximity to each other separated by an air gap 2d as shown in the isometric drawing. It should be understood that any relative movement between 1d and 5d changes the flux path area through the magnetic poles of each of the phase windings, since the plane of the overlapping phase windings is perpendicular to the flux path. Magnetic pole-pairs of the windings are included in the air gap area dynamics of the PDF-HFT, because magnetic pole-pairs occur along the air gap area. In the case of the pancake design, the windings (and pole-pairs) are overlapped on a plane that is perpendicular to the magnetic flux path and as a result, the magnetic flux area changes with movement as would the flux coupling between windings; hence, the position dependent flux high frequency rotating transformer.

In general, the form factor, pole-pair count, and phase number of the winding sets on each side of the PDF-HFT should be similar to the respective form factor, pole-pair count, and phase number as on the excited electric machine (or PGM) in order to "emulate" the respective excitation waveforms supplied to the PGM by the BMSCC system, regardless of speed. More importantly, the only constraint on the winding arrangement and form factor and excitation of the PDF-HFT is to deliver signals at the moving body with modulated waveforms that duplicate the modulation envelops or "emulate" the form and frequency of the magnetic field or excitation signals expected by the PGM for synchronous operation of electric apparatus.

The PDF-HFT can have any ratio between the number of winding-turns on the secondary (rotor or moving body) and primary (stator body) according to design, such as any step-up, step-down ratio, including neutral ratio. Since the PDF-HFT is designed for much higher frequencies of operation, the number of winding turns and the air gap area of the PDF-HFT would meet the operational requirements of the high frequency carrier and as a result, mutual inductance, which is a function of air gap area and winding turns, would be different from the emulated PGM.

Since a linear (moving) electric machine follows the same electromagnetic principles as a rotating electric machine with a similar winding arrangement unrolled or laid out in a linear fashion, the PDF-HFT (or BMSCC system) can support both linear and rotating electric machines by designing to linear or rotating form-factors.

The PDF-HFT could be a balanced phase winding electrical device with the phase windings on the stationary or primary side arranged in accordance with the phase offset (or phase angle) of the AC multiphase signal (i.e., 120 degrees apart for 3-Phase AC) with the magnetic signature between phase windings equal (i.e., the same winding-turns, the same magnetic path, etc). Under this configuration, any imbalance between phase windings, which is a natural reality, may be overcome by individually adjusting the current through the windings by the BMSCC to compensate for the imbalance.

New Synergistic Art of the PIF-HFT: In contrast to the PDF-HFT, the Position "Independent" Flux High Frequency Transformer (PIF-HFT) does not change, re-distribute, or share any magnetic flux energy between unlike phase windings on the primary and secondary sides, even in accordance with position or movement, which is a dissimilar action experienced on the PGM (or PDF-HFT). The PIF-HFT will only couple magnetic flux energy between primary (stationary) and secondary (moving) windings of the same phase in accordance to winding turns-ratios. An air gap junction may be incorporated for free movement between the primary and secondary sides of the PIF-HFT or for even distribution of flux. For example, a 3-Phase PIF-HFT is essentially three independent transformers integrated into the same body and as a result, PIF-HFT does not induce any angular velocity (speed) and phase waveform component onto any excitation signal at its winding terminals while propagating electrical power across its air gap. Further, varying the current through any phase winding primary and secondary pair will not affect the current through the other phase windings. Therefore, the winding sets of the PIF-HFT with any number of phases are physically arranged about the air gap area so any relative movement between the stationary and moving bodies on each side of the air gap will not vary the magnetic flux path cutting the winding sets. One way to accomplish this is to position the phase windings so the phase winding from unlike phase windings are isolated from each other by not overlapping or occupying the same area along a plane that is perpendicular to the flux path. Consequently, the number of pole-pairs and other position or movement dependent behavior peculiar to the PDF-HFT (and PGM) are not associated with the PIF-HFT. Any signal seen on the stationary side of the PIF-HFT should be similar to any signal seen on the moving side (or vice-versa) regardless of mechanical movement but with a step-up, step-down, or neutral magnitude multiplication as a result of the winding-turns ratio. The flux path of the PIF-HFT can be radial magnetic field form factor (cylindrical), transverse flux, or axial magnetic field form factor (pancake). The PIF-HFT must have the same number of phases on the moving and stationary sides and cannot be asymmetrically, since there is no magnetic coupling between phase windings of unlike phases. To minimize or alleviate inductive cross-talk between PIF-HFT phase winding sets, there may be an air-gap (or high reluctance) means separating each phase winding pair of like phases on each side of the air-gap. The PIF-HFT can be linear (moving) or rotating because the same electromagnetic theory applies.

Figure 11:
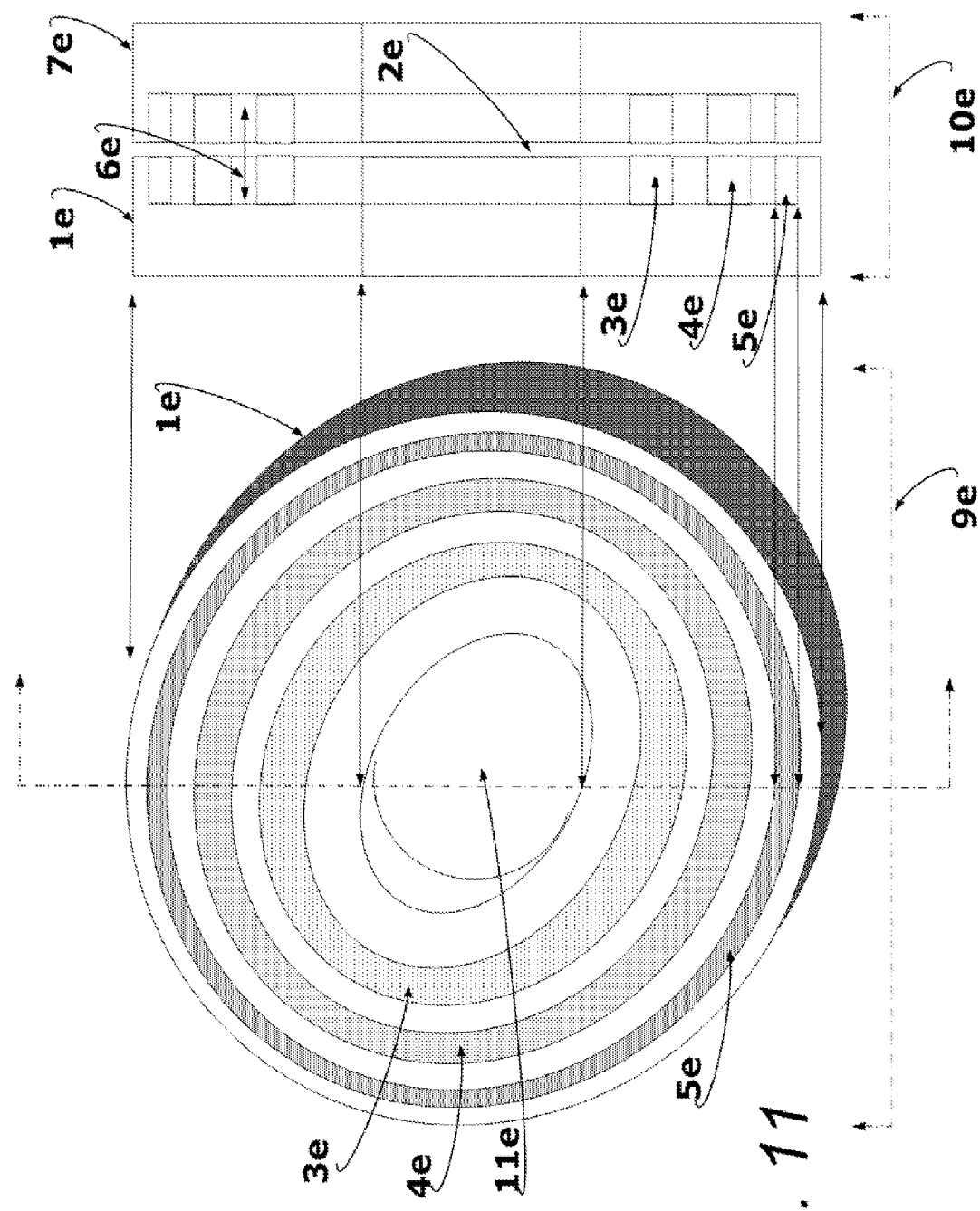
FIG. 11 is a perspective photographic view of either the rotating (or moving) or stationary section of the Position Independent Flux High Frequency Transformer (PIF-HFT) including an assembled sectional view, which incorporates both stationary and rotating sections of the PIF-HFT, and accordingly, illustrates one embodiment of the PIF-HFT, which is an axial flux (or pancake) design with an air gap junction for non-obstructive movement.

FIG. 11 shows the air-gap face half of one embodiment of the PIF-HFT in 3-dimensions 9e with an isometric equivalency 10e showing two halves with faces adjacent at the air-gap. Again the 3-dimensioned FIG. 11, which is one-half the PIF-HFT core, shows a pancake style of the PIF-HFT because the flux 6e flows through the air gap 2e in an axial direction or parallel to the axis of rotation (or annulus 11e). Phase Winding slots 3e, 4e, and 5e for the 3-Phase PIF-HFT are ring winding slots on the face of the one-half core and are symmetrically spaced around the axis of rotation. The two cores 1e and 7e are placed face to face as shown in the isometric view 10e, separated by the air gap 2e. The magnitude of the flux path between the two cores 1e and 7e does not change as a result of rotation (or movement). Further, the same flux path is maintained between the same primary and secondary phase winding pair, regardless of movement. Unlike the PDF–HFT, the PIF-HFT has no concept of winding magnetic poles because the air gap dimensions of the PIF-HFT do not change in accordance with movement. The number of winding-turns or the air gap area between phases may be designed differently to mitigate anomalies associated with the different diameters of the circular phase winding arrangements.

Unlike the PDF-HFT, the PIF-HFT is not a balanced phase winding device because each "coupled" phase winding set on the stationary or primary side is mutually exclusive from any other coupled phase winding set. Regardless, the magnetic signature between any "coupled" phase winding set should be equal (i.e., the same winding-turns, the same magnetic path, etc). Any imbalance between coupled phase winding sets, such as do to construction reality, may be overcome by individually adjusting the current through the windings by any combination of CTOM or CPDM.

New Synergistic Art of the PDF-HFT and PIF-HFT Combination (PDF-HFT+PIF-HFT Combination): The combination of the PDF-HFT and PIF-HFT, which is a functional ingredient of the SEG, requires both the PDF-HFT and PIF-HFT transformers to have the same number of phase winding sets on the secondary bodies, which are the rotating (or moving) bodies, because the electrical terminals of the secondary phase winding sets are directly connected in accordance with the phase designation (i.e., phase-to-phase). As a result, any mechanical speed, position, or phase waveform component induced on the PDF-HFT secondary winding sets by possible movement or positioning of the PDF-HFT is propagated to the primary side of the PIF-HFT without change (with the exception of any wind-turns ratio amplification). Since the PIF-HFT can only be phase symmetrical, the number of phases on either side of the PIF-HFT is equal to the number of phase windings on the secondary side of the PDF-HFT. However, the PDF-HFT+PIF-HFT Combination can be phase symmetrical or phase asymmetrical as a result of the PDF-HFT.

As used herein any reference to PDF-HFT equally applies to the PDF-HFT+PIF-HFT Combination, unless explicitly noted otherwise.

As used herein any reference to PDF-HFT, PIF-HFT, or electric machine, the secondary side refers to the potentially moving (or rotating) side and the primary side refers to the non-moving side.

As used herein any reference to PDF-HFT+PIF-HFT Combination, the primary side of the PDF-HFT+PIF-HFT Combination is the primary side of the PDF-HFT and the secondary side of the PDF-HFT+PIF-HFT Combination is the primary side of the PIF-HFT. However it should be understood that by symmetry, the primary side of the PDF-HFT+PIF-HFT Combination could be the primary side of the PIF-HFT and the secondary side of the PDF-HFT+PIF-HFT Combination could be the primary side of the PDF-HFT.

Winding Form-Factor Art: The Winding Form-Factor determines the winding slot arrangement, the placement of the windings, etc., and as a result, the Winding Form-Factor determines the current density and the effective core flux density of the magnetic core of the electric machine entity (i.e., the PGM), the PDF-HFT, or the PDF-HFT+PIF-HFT Combination. There are many variations of winding form-factors in the industry. Winding Form-Factors, which have been used in the past, have been reconsidered new inventions or art for specific types of electric machines. Because any RTEC or BMSCC controlled electric machine is unknown to electric machine experts or engineers, this invention will incorporate any improved Winding Form-Factors that are relevant to the design of the PDF-HFT, the PDF-HFT+PIF-HFT Combination, or the PGM controlled by BMSCC and will consider these means as BMSCC or RTEC synergistic art when incorporated.

Magnetic Techniques Art: Because any RTEC or BMSCC controlled electric machine is unknown to electric machine experts or engineers, this invention will incorporate any manufacturing, construction, or magnetic core material techniques that improve the performance of the PDF-HFT, the PDF-HFT+PIF-HFT Combination, or the PGM controlled by BMSCC and considers these techniques as BMSCC or RTEC synergistic art when incorporated.

Modulation Art: All conventional Electronic Controllers of electric machines modulate the gating of an array of power switches to synthesize the frequency of electrical excitation at the winding terminals (port) of the electric machine, which is a function of speed and position of the electric machine shaft (i.e., the synchronous speed relation), and to controlling the power quality and quantity of the electrical excitation at the electrical terminals of the electric machine. Conventional modulation techniques are inherently incompatible with the electrical power transfer requirements of Real Time Emulation Control (or Brushless Multiphase Self-Commutation Control), which is the only method that controls the transfer of power to the ports of an electric machine by at least controlling the power between the primary and secondary sides of at least a Position Dependent Flux High Frequency Transformer (i.e. the PDF-HFT). Signals with any level of DC bias, such as those synthesized by Pulse Width Modulation (PWM), Space Vector Modulation, Phase Modulation, or Frequency Modulation for electric machine control, are incompatible with conditioning or sharing power propagated through a position dependent flux high frequency transformer, such as the PDF-HFT.

It should be now understood that BMSCC (or RTEC) is the only controller technology of an electric machine or apparatus that integrates a balanced phase winding Position Dependent Flux High Frequency Transformer (PDF-HFT) or PDF-HFT+PIF-HFT Combination as an integral component of its modulation control means. The PDF-HFT or PDF-HFT-PIF-HFT transfers high power energy across the air gap with the potential of an automatic speed or position frequency component (i.e., self-commutation), although the PDF-HFT could be held at standstill with the new art of magnetic energy sharing performing the signal re-fabrication. In accordance with this unique architecture, BMSCC (or RTEC) incorporates two complementary components for modulation control of high frequency, high power transfer that differentiates BMSCC (or RTEC) from all other electric machine control. The first component is the "Initial Setup and Control of the Magnetizing Current", which first establishes and then manages the magnetizing current or oscillating magnetic flux of PDF-HFT or PDF-HFT-PIF-HFT Combination and resulting port voltage in accordance with Faraday's Law. The second component, which occurs after the first component, is the "Power Transfer Control" component, which controls the actual transfer of high power across the air gap of the PDF-HFT or PDF-HFT-PIF-HFT Combination to the electric machine or electric apparatus being controlled by using a magnetic energy (or power) packet transfer method with the new art of compensated modulation of BMSCC. Once steady-state is achieved in the PDF-HFT or PDF-HFT-PIF-HFT Combination by the first component (i.e., the Initial Setup and Control of the Magnetizing Current), the second component will replenish any power (or current) removed from one electrical port of the transformer by power (or current) entering the opposite port of the transformer (or vice-versa) to keep the oscillating magnetic field in the air gap of the transformer at its steady-state condition. Another distinguishing feature of BMSCC is the magnetizing current MMF vector first established by the MCG, which is imaginary power, is orthogonal to the load current MMF vector established by the Modems, which is actual control power transferred across the PDF-HFT (or PDF-HFT+PIF-HFT Combination) air-gap. No other electric machine uses this two component control technique because no other electric machine controller uses a PDF-HFT (or PDF-HFT+PIF-HFT Combination) as described. Unlike traditional modulation techniques for electric machine control, such as Pulse Width Modulation (PWM), Space Vector Modulation, Phase Modulation, or Frequency Modulation, the compensated modulation technology of BMSCC isolates the high frequency components within the PDF-HFT or PDF-HFT+PIF-HFT, which is designed for high frequency operation, and produces waveforms with virtually no harmonic content. Unlike traditional modulation techniques, BMSCC never subjects the windings of the electric apparatus under control or the electrical power grid to high frequency content, which is detrimental to bearing and winding insulation life and cause high core and electrical loss.

New Synergistic Art of the Magnetizing Current Generator (MCG) means: The "Initial Setup and Control of the Magnetizing Current Component" of the BMSCC is with the Magnetizing Current Generator (MCG) means. The MCG establishes the steady-state oscillating magnetic field in the PDF-HFT (or PDF-HFT+PIF-HFT Combination) to satisfy the baseline design constraints of the PDF-HFT in accordance with Faraday's Law, such as the base-line frequency and air gap flux density for the operational design range of the PDF-HFT or PDF-HFT-PIF-HFT, by supplying a Magneto-Motive-Force (MMF) or Magnetizing Current in the winding set of the PDF-HFT or PDF-HFT-PIF-HFT. According to Faraday's Law, the Magnetizing Current is always 90 degrees lagging from the port voltage and contributes only imaginary power (or no real power) if electrical loss is neglected. The frequency of oscillation is significantly faster than the time base of the electric apparatus being driven, such as the PGM (e.g., 10 kHz versus 60 Hz). Without the setup of magnetizing current initially applied by the MCG at a frequency that is appropriate for the PDF-HFT or PDF-HFT-PIF-HFT design, any power transfer control technique would fail or the PDF-HFT would be inoperable because of potential of core saturation or heavy magnetizing current flow. Since the MCG shows imaginary power (disregarding loss), the MCG could be realized by a separate low power modulation means for driving an auxiliary low power winding set(s) solely for the setup of the air gap flux, or it could be integrated into any synchronous modem circuits or any switching algorithms for the Power Transfer Control component. The MCG is the flux (or voltage) controller of BMSCC and has the ability to adjust the frequency of the oscillating magnetic field within the design constraints of the PDF-HFT or PDF-HFT+PIF-HFT Combination at any time for another level of control. An MCG can excite any phase winding in any combination and on any side of the PDF-HFT.

By first establishing the oscillating magnetic fielding in the core of a PDF-HFT combination, the MCG provides the basis, called compensated gating, for: 1) the new art of compensated modulation techniques and magnetic energy sharing, 2) position and speed reference measurement before and during compensated modulation from the envelopes of the carrier signals, 3) measurement of the ratio of winding turn amplification, and 4) establishment of the BMSCC primary side and secondary side port voltages.

New Synergistic Art of Power Transfer Control Means: The "Power Transfer Control" component, which consists of new modulation control techniques for transferring high power electromagnetic energy across the air gap of the PDF-HFT or PDF-HFT+PIF-HFT Combination, are Compensated Transition Offset Modulation (CTOM), Compensated Pulse Density Modulation (CPDM), or any combination of CTOM or CPDM. The modulation techniques are considered "Compensated" because the gate timing of the Synchronous Modems is in "synchronous" time relationship to the unbiased positive and negative transitions or the symmetrical bipolar transitions (i.e., no low frequency bias) of the steady-state high frequency oscillating magnetic fields pre-established in the air gap (or the Magnetizing Currents in the windings) of the PDF-HFT or PDF-HFT+PIF-HFT Combination by the magnetizing current generator means or MCG. For instance, if the gate timing of the synchronous modem (i.e., integral modulator-demodulator) on one side of the PDF-HFT adds power (energy) to the oscillating magnetic field, the gate timing of the synchronous modem on the other side of the PDF-HFT must "compensate" for the additional energy in the oscillating magnetic field by synchronously removing the same amount of power (energy) from the oscillating magnetic field to preserve the steady-state condition of the oscillating magnetic field pre-established by the MCG.

As used herein, "compensated gating" refers to the act of gating or switching of the electrical power in referenced synchronism to any measurable derivative of the high frequency oscillating magnetic field pre-established and then managed by the MCG, such as the voltage transitions or the cycles of the high frequency oscillating magnetic field.

As used herein, "compensated gating dynamics" refers to dynamically adjusting at any time to the "compensated gating" by any half-cycle or by any time offset relative to a cycle reference, such as a cycle edge transition.

New Synergistic Art of Compensated Transition Offset Timing Modulation (CTOM): CTOM is a modulation means for conditioning electrical power that is peculiar to RTEC or BMSCC, which is transferring conditioned or re-fabricated high frequency power between the primary and secondary side of a Position Dependent Flux High Frequency Transformer (PDF-HFT) or PDF-HFT+PIF-HFT Combination with a steady-state oscillating magnetic field that is pre-established by a MCG means and with synchronous modems on opposite sides for gating power packets in relation to the pre-established oscillating magnetic field. CTOM controls the relative time offset between the gating (i.e., negative-packet-on and positive-packet-on) of the synchronous modems on each side of the PDF-HFT or PDF-HFT+PIF-HFT Combination in synchronous relationship to the oscillating magnetic field as only established by the MCG. With proper high frequency filtering or strategic timing of the synchronous modem gating, virtually all the high frequency components, such as the carrier frequency, are confined to the PDF-HFT or PDF-HFT+PIF-HFT Combination, which is designed for high frequency operation, and as a result, leaving only the low frequency components at the terminals of the REG (or SEG).

As used herein, negative-packet-on and positive-packet-on define terms that may require a complicated process of turning-on and turning-off an array of power switches (i.e., power semiconductors) in order to produce a positive or negative transfer of power (or current) packets. For instance, there may be a delay between turning-off one set of power switches before turning-on another set of power switches to avoid any short circuit potential.

As used herein, the switching energy of any burst of high frequency electrical signals as a result of relative AC chopper gate timing control is stored in the oscillating magnetic field of the PDF-HFT (or PDF-HFT+PIF-HFT Combination) core and is shareable between any Phase Winding assembled on the core of the balance phase winding PDF-HFT (or PDF-HFT+PIF-HFT Combination).

As used herein, any discussion applying to the PDF-HFT equally applies to the PDF-HFT+PIF-HFT Combination (or vice-versa).

Figure 7:
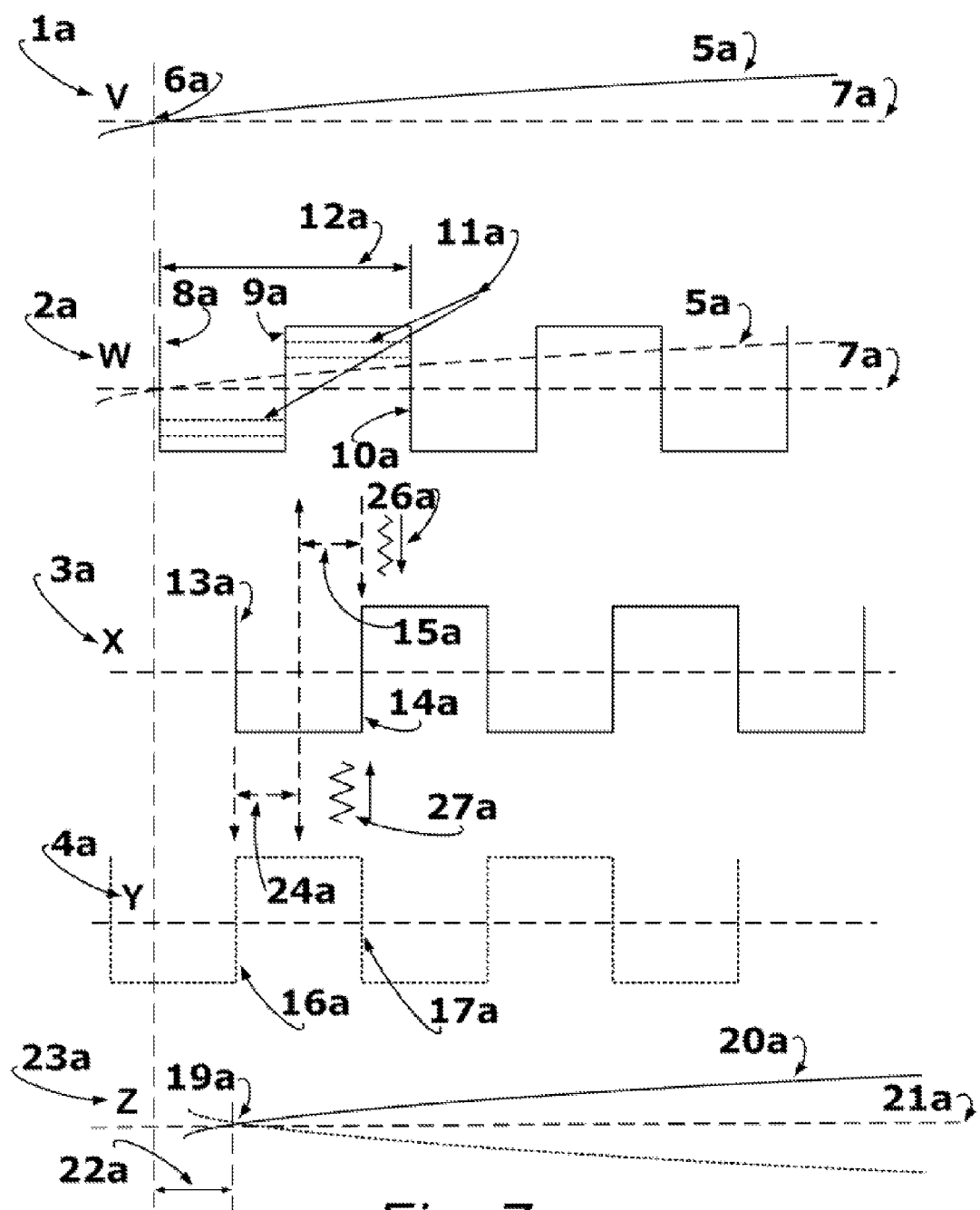
FIG. 7 portrays the new power waveform conditioning (or re-fabrication) technique in accordance with the present invention, referred to as Compensated Time Offset Modulation (CTOM), which synchronously gates the Synchronous Modulators-Demodulators (or MODEM) in time offset relationship to the symmetrical bipolar transitions of the high frequency waveforms that is pre-established by the Magnetizing Current Generator (or MCG) called compensated gating. Controlling the power flow by CTOM is a critical ingredient for BMSCC.

FIG. 7 shows the progression of signals through the REG (or SEG) on the primary (stator) and secondary side (rotor) of the PDF-HFT (or PDF-HFT+PIF-HFT Combination) as a result of CTOM. Any discussion applying to the PDF-HFT equally applies to the PDF-HFT+PIF-HFT Combination (or vice-versa). For this disclosure, AC Chopper, chopper, chop, etc. are synonymous with synchronous modem or synchronous modem operation. The signal V or "Input Signal before AC Chopper" 1a represents a single input signal 5a to the electrical terminals on one side of the REG (or SEG), which may have many input signals. This signal could be an AC or DC waveform. The signal shown is actually a portion of a sinusoidal AC waveform 5a with a zero crossing point 6a through the zero voltage or current frame 7a. In comparison, a DC waveform would be a constant level above or below the zero voltage or current frame 7a with no zero crossing point 6a. To simplify analysis, the signal W or "Primary Winding Signal after the Primary AC Chopper" 2a, which is the oscillating magnetic field resulting from gating the signal V or the "Input Signal before AC Chopper" 1a with the MCG, similarly represents the gate timing signals controlling the synchronous modem driving its respective phase winding on one side of the PDF-HFT (i.e., the primary side) in synchronous relation to the oscillating magnetic field. The signal W or the "Primary Winding Signal after the Primary AC Chopper" 2a also depicts the magnetically induced signal on the secondary side of the PDF-HFT but with different modulation amplitude envelop 11a, which is in accordance to the relative speed and position between opposing sides of the transformer and the transformer winding-turns ratio. In addition, the signal W or the "Primary Winding Signal After the Primary AC Chopper" 2a similarly represents the synchronism of the gate timing signals gating the primary synchronous modem in reference to the oscillating magnetic field pre-established by the MCG and for this case, the gating of the synchronous modems is congruent with the pre-established oscillating magnetic field, which could indicate that the MCG is built into the primary synchronous modem. In electrical reality, the straight edges seen in FIG. 7 may be rounder and slower. The signal W or the "Primary Winding Signal after the Primary AC Chopper" 2a has a negative going transition 8a and a positive going transition 9a per carrier cycle (or period) 12a that symmetrically pass through the zero voltage or current 7a at the chopping or carrier frequency. The chopping frequency is much higher than the frequency of the AC or DC waveform 5a. The negative going transition 8a and positive going transition 9a per cycle (or period) similarly represents the negative-packet-on transition 8a or positive-packet-on transition 9a, respectively, of the AC chopper circuit (i.e., synchronous modem) while neglecting any time delays or other anomalies associated with the circuit.

The amplitude levels 11a (dotted lines) represent the variation of the AC chopper signal waveform in accordance with the modulation amplitude envelope over time, which is the waveform 5a of signal V or the "Input Signal before AC Chopper" 1a. By induction, the signal on the Secondary (or rotating) Winding of the PDF-HFT would be a similar waveform as signal W 2a but with a different amplitude level 11a do to the winding-turns ratio of the PDF-HFT, do to the amplitude levels 11a on the primary side, or do to the degree of magnetic coupling as a result of the relative position between the stationary winding and the moving winding of the PDF-HFT. The degree of magnetic coupling, which is a function of relative speed (or mechanical frequency) and position between the stationary and moving windings of the PDF-HFT, would offset shift the waveform of signal Z or the "Output Signal After AC Chopper" 23a (after the secondary synchronous modem) according to the speed and position by changing the amplitude levels 11a.

The signal X or the "Gating Signal of the Secondary AC Chopper (X)" 3a represents the negative-packet-on transition 13a and positive-packet-on transition 14a for gating the AC chopper circuit (i.e., synchronous modem) on the secondary (or moving) side of the PDF-HFT while signal W 2a would represent the gating the primary side AC choppers. The signal X or the "Gating Signal (X) of the Secondary AC Chopper" 3a is synchronized to the potentially dynamic cycle period 12a of the signal W or the "Primary Winding Signal after the AC Primary Chopper" 2a for synchronous demodulation (or vice-versa). The gate signals, W, X, and Y, are always relative to the oscillating magnetic field provided by the MCG.

CTOM is a modulation technique where the relative time offset between any positive 9a (or 14a) or negative 8a (or 13a) "bipolar" transitions of the carrier frequency on the "same" side of the PDF-HFT is adjusted in any dynamic combination for gating the choppers. Likewise, CTOM is a modulation technique where the relative time offset between any positive (between 14a and 9a) or negative (between 13a or 8a) bipolar transitions of the carrier frequency between "opposite" sides of the PDF-HFT is adjusted in any dynamic combination for gating the choppers. CTOM would vary the relative gate timing between transitions 8a (or 13a) and 9a (or 14a) with respect to the period 12a including in combination with the changing oscillating magnetic field period of 12a as established and managed by the Magnetic Current Generator means (MCG). During any dynamic transition change, the cycle period 12a between the synchronous modems on each side of the PDF-HFT is synchronized regardless of timing dynamics of the transitions. Said differently, CTOM is time adjusting the gating in any dynamic combination between transitions on signal W or "Primary Winding Signal After Primary AC Chopper" 2a or in any dynamic combination between transitions on the "Gating Signal (X or Y) on The Secondary Chopper" 3a, 4a or in any dynamic combination between the "Primary Winding Signal After Primary AC Chopper" 2a transitions and the "Gating Signal (X or Y) of The Secondary Chopper" 3a, 4a transitions but always in synchronism with the period 12a managed by the MCG. Further, the combinational time offset adjustments could be fixed or dynamically changed during any cycle or during any other cycle, which is managed by the MCG. Controlling the combinational adjustments is the result of gating the "negative-packet-on transition" or "positive-packet-on transition" of the synchronous modems at virtually the same time the adjustments are desired. The offset shift between transitions could be referenced or controlled on the rotor (or moving) side, the stator side, or both sides as long as the cycle periods 12a between the two sides are synchronized, which means the cycle period 12a of gating the synchronous modems on either side of the PDF-HFT (or PDF-HFT+PIF-HFT Combination) must acclimate (i.e., phase lock) to the same period 12a managed by the MCG even with a dynamic change in cycle period by the MCG. The primary and secondary sides are timing symmetrical and either side can be the initiator or the controller of the timing dynamics. The timing dynamics could be referenced or controlled on the rotor (i.e., secondary) side, the stator (i.e., primary) side, or both sides as long as the two sides are synchronized.

As an example, the "Gating Signal (X) of the Secondary AC Chopper" 3a could include a positive shift 15a in gate timing as a result of CTOM or a negative shift 24a as shown in the "Gating Signal (Y) of the Secondary AC Chopper" 4a, which would average (i.e., control) the power weighting (or gating) between primary and secondary synchronous modems. For instance, the power transfer direction through the synchronous modem, which is represented by a current vector with direction passing through a resistor 26a and 27a, would occur several times over the period 12a of the carrier signal and as a result, would variably average the combined power levels depending on the degree of offset shift. Shifting the "Gating Signal (X) of The Secondary AC Chopper" 3a odd multiples of 180 degrees (or half cycles) relative to the signal W or the "Primary Winding Signal After Primary AC Chopper" signal 2a would result in an inverted (or negative) signal of the signal Z or the "Output Signal After AC Chopper" 23a. This is crudely represented by the dotted AC or DC output waveform 20a, which results from applying the dotted waveform of the "Gating Signal (Y) of The Secondary AC Chopper" signal 4a. Likewise, the solid AC or DC output waveform 20a of the signal Z or "Output Signal After AC Chopper" 23a corresponds to the solid waveform of the "Gating Signal (X) of The Secondary AC Chopper" signal 3a, which is shifted 180 degrees (or half cycle) from the negating "Gating Signal (Y) of The Secondary AC Chopper" signal 4a. Similarly, shifting the "Gating Signal (X) of The Secondary AC Chopper" 3a even multiples of 180 degrees (or zero degrees) or half cycles relative to the signal W or the "Primary Winding Signal After Primary AC Chopper" signal 2a would result in a non-inverted signal Z or "Output Signal After AC Chopper" 23a (i.e., solid waveform). Shifting the "Gating Signal (X) of The Secondary AC Chopper" 3a odd multiples of 90 degrees (or quarter cycles) relative to the signal X of the "Primary Winding Signal After Primary AC Chopper" signal 2a (as is shown) would result in no voltage or current because resulting oscillating power has no average power. It should now be understood that varying the offset shift other than 90 or 270 degrees would vary the voltage or current transfer amplitude and the polarity of the transfer. Overall, the result (with proper filtering) is the solid (or dotted) AC or DC output Waveform 20a as shown in the signal Z or the "Output Signal after AC Chopper" 23a. It should also be understood that the signal Z or the "Output Signal after the AC Chopper" 23a would also include any mechanical shift or frequency (speed) between the rotor and stator winding sets of the PDF-HFT.

In keeping with the spirit of the preceding example, the positive or negative gating shift per high frequency chopper period could vary in accordance to the desired waveform or the re-fabricated waveform that is related to the waveform of the signal V or the "Input Signal before AC Chopper" 1a. Under this situation, the magnetic core energy would be shared between phases in order to produce or re-fabricate the desired phase waveform envelop by CTOM, since the input of a particular phase waveform being control (i.e., "Input Signal Before AC Chopper" 1a) may have no amplitude while the desired output waveform (i.e., "Output Signal After AC Chopper" 23a) may require a finite amplitude. In addition, the time offset between transitions would vary in a timely fashion according to the amplitude of the desired waveform. Under this method of CTOM control, the torque angle (or the power factor) could potentially be adjusted by sharing the magnetic energy in the core of the PDF-HFT as a result of CTOM gating. Again, the mechanical speed would be an additional component in the resulting output waveform 23a. The shift 22a represents the offset shift of the output waveform 23a in relation to the input waveform 1a as a result of the mechanical speed/position between the stationary and moving winding sets of the PDF-HFT or as a result of modulating the gate timing shift (15a, 24a) by CTOM in accordance to the desired (or contrived) waveform.

Understanding that all modulation can be analyzed by beating of signals, a simple trigonometry analysis will show how power can be controlled by CTOM. Let Cos (Wt) represent the gate transition timing of the synchronous modem on one side of the PDF-HFT and Cos (Wt+φ) represent the gate transition timing of the synchronous modem on other side of the PDF-HFT. Both transition timings are out of phase by φ but operate at the same frequency, W, which is first setup and then managed by the MCG, and are therefore, synchronized. Further, the resulting high frequency carrier signal (i.e., power signal) has a low frequency modulation envelope, Cos $(W_{60}t)$ do to the AC phase signal (i.e., 60 Hz for this example). Using simple trigonometry, the following results from beating Cos (Wt) with Cos (Wt+φ) and again with Cos $(W_{60}t)$:

$$Cos(W_{60}t) \cdot \{Cos(Wt) \cdot Cos(Wt+\varphi)\} =$$
$$Cos(W_{60}t) \cdot \{Cos(Wt) \cdot [Cos(Wt) \cdot Cos(\varphi) - Sin(Wt) \cdot Sin(\varphi)]\} =$$
$$Cos(W_{60}t) \cdot \{[Cos(Wt) \cdot Cos(Wt) \cdot Cos(\varphi) - Cos(Wt) \cdot Sin(Wt) \cdot Sin(\varphi)]\} =$$
$$Cos(W_{60}t) \cdot \left\{\frac{1}{2} \cdot [Cos(\varphi) + Cos(2Wt) \cdot Cos(\varphi) - Sin(2Wt) \cdot Sin(\varphi)]\right\} =$$
$$Cos(W_{60}t) \cdot \left\{\frac{1}{2} \cdot [Cos(\varphi) - Cos(2Wt+\varphi)]\right\}$$

At 0 or 180 degrees for φ, the power signal is $$Cos(W_{60}t) \cdot \left\{\frac{1}{2} \cdot [1 - Cos(2Wt)]\right\}$$
or
$$-Cos(W_{60}t) \cdot \left\{\frac{1}{2} \cdot [1 - Cos(2Wt)]\right\},$$

respectively, which have average power levels.

At 90 or 270 degrees for φ, the power signal is $$Cos(W_{60}t) \cdot \left\{\frac{1}{2} \cdot Sin(2Wt)\right\}$$
or
$$-Cos(W_{60}t) \cdot \left\{\frac{1}{2} \cdot Sin(2Wt)\right\},$$

respectively, which are sinusoidal at the high frequency for simple filtering, and accordingly, have no average power or have zero power level.

By changing the offset timing of the gating between the synchronous modems on each side of the PDF-HFT, φ, the propagation of power can be varied. Since any fast transition periodic signal, such as a square wave, can be represented as a series (i.e., Fourier Series) of sinusoids with harmonics of the fundamental frequency, an AC chopped signal, such as the AC chopped signal resulting from gating the synchronous modems, would be represented by a Fourier series of Cos $(W_Nt)$ or Cos $(W_Nt+\phi)$, where N represents frequency harmonic terms, and the combinational results would be similar to the simple analysis just presented for Cos (Wt) with Cos (Wt+φ).

New Synergistic Art of Compensated Pulse Density Modulation (CPDM): CPDM is a modulation means for conditioning electrical power that is peculiar to RTEC or BMSCC, which is transferring conditioned or re-fabricated high frequency electromagnetic power between the primary and secondary side of a Position Dependent Flux High Frequency Transformer (PDF-HFT) or PDF-HFT+PIF-HFT Combination with a steady-state oscillating magnetic field that is pre-established and managed by a MCG means producing symmetrical bipolar carrier signals (i.e., no DC bias) and with synchronous modems (i.e., integral modulator-demodulator) on opposite sides for gating power packets in synchronous relation to the pre-established oscillating magnetic field as only established by the MCG. CPDM controls and synchronizes the number of contiguous gating transitions of the synchronous modems during a burst (or string) of high frequency cycles that occur at specific time intervals (or frames). Each frame occurs multiple times during the period of the low frequency waveform of the modulation envelope. The number of cycles per string is weighted according to the desired shape and magnitude of the modulation envelope waveform to be transferred between synchronized AC power switches of the synchronous modems on each side of the PDF-HFT. The weighting (or density of the string) and the frame time interval can be dynamically adjusted at anytime. With proper high frequency filtering or strategic timing of the synchronous modem gating, virtually all the high frequency components, such as the carrier frequency, are confined to the PDF-HFT, which is designed for high frequency operation, leaving only the low frequency components at the terminals of the PDF-HFT. To generate a string of cycles during a given interval, the synchronous modems on the primary side of the PDF-HFT would be continuously gated in synchronism to the carrier frequency to achieve the desire number of cycle density (or weight) for that string during a given frame. Likewise, the synchronous modem on the secondary side of the PDF-HFT, which is synchronized to the synchronous modem on the primary side, would be gated during the same frame; thereby, demodulating the high frequency carrier and showing only the desired electrical weight of the string, which is the combined weight or polarity (i.e. accumulation) of all the half-cycle energy directed into one polarity by the gating of synchronous demodulation. Shifting the gating of the synchronous modem on only one side of the PDF-HFT by one-half cycle (or 180 degrees) would effectively negate (or invert) the weighting. As a result, other affects could be achieved by half cycle shifting the gating between the synchronized AC choppers on each side of the PDF-HFT during any frame. For instance, half cycle shifting the gating on one side of the PDF-HFT by an incremental number during any frame interval of weight cycles would retrieve smaller portions of the power density of the string, since a portion of the string would not be gated or synchronously demodulated. This portion of energy could be absorbed by another AC Phase, if the AC choppers of that particular AC phase continue to gate (or synchronously demodulate) during the same frame interval. The weighting and cycle shifting could be referenced or controlled on the rotor side, the stator side, or both sides as long as the two sides are synchronized to the oscillating magnetic field pre-established by the MCG.

Figure 8:
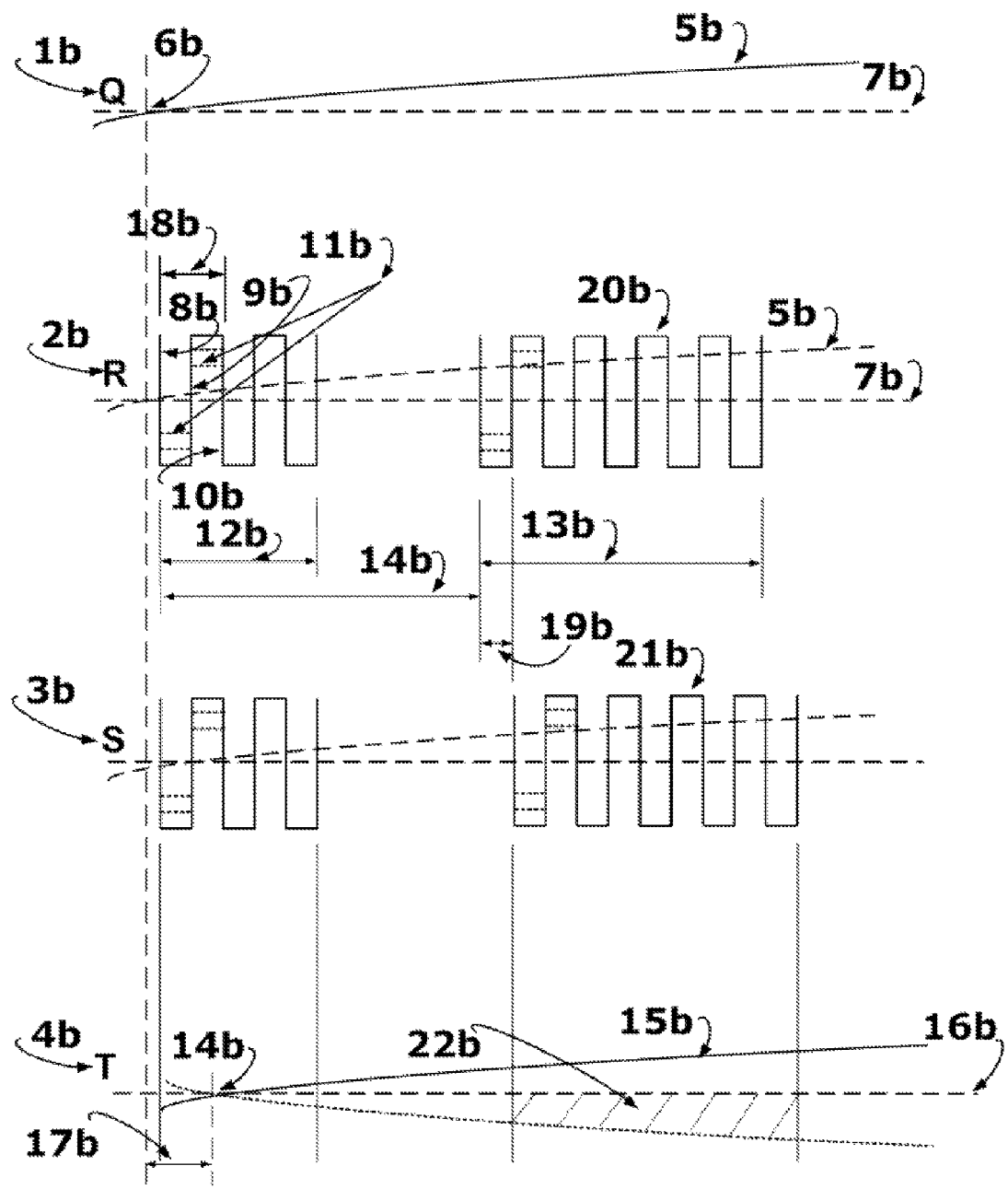
FIG. 8 portrays the new power waveform conditioning (or re-fabrication) technique in accordance with the present invention, referred to as Compensated Pulse Density Modulation (CPDM), which synchronously gates the Synchronous Modulators-Demodulators (or MODEM) in cycle burst density relationship at predefined intervals of the symmetrical bipolar transitions of the high frequency waveforms that is pre-established by the Magnetizing Current Generator (or MCG) called compensated gating. Controlling the power flow by CPDM is a critical ingredient for BMSCC.

FIG. 8 shows the progression of signals through the REG (or SEG) on the primary (stator) and secondary side (rotor) of the PDF-HFT (or PDF-HFT+PIF-HFT Combination) as a result of CPDM. Any discussion applying to the PDF-HFT equally applies to the PDF-HFT+PIF-HFT Combination (or vice-versa). For this disclosure, AC Chopper, Chopper, etc., similarly represent a synchronous modem or synchronous modem operation. The signal Q or the "Input Signal before AC Chopper" $1b$ is the input signal to the REG (or SEG). This signal could be an "AC or DC Supply Waveform" $5b$. The signal shown is actually a portion of a sinusoidal waveform with a voltage or current crossing point $6b$ through the zero voltage or current of AC or DC supply baseline $7b$. A DC waveform would be a constant level above or below the zero voltage or current baseline $7b$ with no zero crossing point $6b$. To simplify analysis, the signal R or the "Primary Winding Signal after the AC Chopper" $2b$, which is the oscillating magnetic field resulting from gating the Input Signal $1b$ with the MCG, similarly represents the gate timing signals controlling the synchronous modem driving its respective phase winding on the primary side of the PDF-HFT in synchronous relation to the oscillating magnetic field. The signal R or the "Primary Winding Signal after the AC Chopper" $2b$ also represents the magnetically induced secondary winding signal of the PDF-HFT. In electrical reality, the straight edges depicted are generally rounder and slower. Each string length $12b$ and $13b$ of cycles $18b$ of gated negative-packet-on-transitions led by the negative transition $8b$ and positive-packet-on-transitions led by the positive transition $9b$ is weighted with a different number of cycles $18b$ according to the voltage or current level desired for that particular frame $14b$ with a resolution of weighting down to half cycles. In this case, string $12b$ contains 2.5 cycles and string $13b$ contain 4.5 cycles. The beginning of each string of cycles would be separated by a frame $14b$ that could be a time interval based on an arbitrary or fixed number of cycles or a dynamically changing number of cycles. The interval of a frame consists of a weighted number of cycles that should be equal to or larger than the maximum anticipated weight of any string. The amplitude level $5b$ of the signal Q or the "Input Signal before AC Chopper" $1b$ is included on the amplitude of the signal R or the "Primary Winding Signal after the AC Chopper" $2b$, which is shown by the dotted amplitude levels $11b$. The overlapping timing of the signal S or the "Gating Signals of the Secondary AC Choppers" $3b$ synchronously demodulates the secondary winding signals to produce a signal T or "Output Signal after AC Chopper" $4b$. The signal T or the "AC or DC output waveform" $15b$ will have a zero crossing point $14b$ that may be phase shifted $17b$ according to the desired (i.e., re-fabricated) waveform as a result of the CPDM weighting sequences and the mechanical speed or position of the moving winding set of the PDF-HFT in relation to the stationary winding set of the PDF-HFT.

For one example, assume the following sequential weighting per string occurs in ten sequential frames is 1, 5, 7, 5, 1, −1, −5, −7, −5, and −1 with the frame interval occurring every fixed 50 cycles of timing and with no relative movement between the PDF-HFT windings. The weighting of each string would be referenced to the frame weight of 50 or 1/50, 5/50, 7/50, 5/50, 1/50, −1/50, −5/50, −7/50, −5/50, and −1/50. Further, assume the signal Q or the "Input Signal before AC Chopper" $1b$ is a DC waveform. The sequential frames represent the digitized weighting closely resembling a low amplitude sinusoidal waveform or analog waveform, which has a maximum amplitude weight of 5/50 or 1/10. The signal R or the "Primary Winding Signal after the AC Chopper" $2b$ represents the same weighting sequence of cycles and frames on both sides of the PDF-HFT (or PDF–HFT+PIF-HFT Combination) do to inductive coupling. Assuming the same gating occurs for signal S or the "Gating Signals of the Secondary AC Choppers" $3b$, the demodulated result would be similar to the signal T or the "Output Signal After AC Chopper" $4b$ that is a sinusoidal waveform with the combined discrete energy packets based on the weighting sequence just describe. With any means of filtering the combined discrete packets represented by the cross-hatched area 22b (while referencing only string 20b) would be smoothed out to a waveform represented by the dotted or solid AC or DC output waveform 15b as referenced to the zero voltage axes 16b. Any movement of the PDF-HFT or any waveform of the signal Q or the "Input Signal before AC Chopper" 1b, other than DC, would be included.

Swapping the positive-packet-on-transition timing 9b and the negative-packet-on-transition timing 8b (i.e., positive-packet-on-transition would be 8b and negative-packet-on-transition would be 9b) of the signal S or the "Gating Signals of the Secondary AC Choppers" 3b by a half-cycle or 180 degree offset shift in relation to the signal R or the "Primary Winding Signal After the AC Chopper" 2b, the polarity of the "AC or DC waveform" 5b in relation to the zero voltage or current" 6b would be inverted as shown by the dotted envelop 15b of the signal T or the "Output Signal After AC Chopper" 4b. FIG. 8 attempts to show an instance of shifting the secondary string signal 21b relative to the primary string signal 20b by a positive shift 19b of one-half cycle or 180 degrees with the hatched area 22b showing the result of the demodulation. Without the half-cycle offset shift of the carrier signal, the solid envelope 15b shown for the signal T or the "Output Signal after AC Chopper" 4b would result. The primary side 2b and secondary side 3b strings can be relatively shifted 19b by any number of positive or negative half cycles during any Frame. Odd half-cycle shifts result in a combined inverted (or negative) weight and even half cycle shifts result in a combined non-inverted (or positive) weight.

New Synergistic Art of the CTOM and CPDM Combination: Compensated Time Offset Modulation (CTOM) and Compensated Pulse Density Modulation (CPDM) operate by the timely gating of the synchronous modems in synchronous relation to the negative and positive transition of the oscillating magnetic field on the PDF-HFT or PDF-HFT+PIF-HFT Combination, which is pre-established by the MCG. Essentially, CTOM or CPDM open discrete but overlapping windows on a timely basis for sharing the magnetic energy between phase windings of the PDF-HFT or PDF-HFT+PIF-HFT Combination (i.e., High Frequency Magnetic Energy Sharing or HFMES). It should be obvious to experts that CTOM and CPDM can be supported in any combination.

CPDM, CTOM, or CPDM-CTOM Combination may require filtering components, such as capacitors, on both terminal sides (or low frequency sides) of the REG (or SEG) to bypass any high frequency components that are the results of CPDM and CTOM techniques, such as when the transition timing of the choppers on each side of the PDF-HFT do not exactly overlap. Because of the high frequency of the carrier signals, any filtering component would be of low impedance. In essence, the high frequency components are confined to the PDF-HFT or PDF-HFT+PIF-HFT Combination and isolated from the low frequency electric apparatus.

CPDM, CTOM, or CPDM-CTOM Combination may synchronize the high frequency carrier of each phase in accordance to a single phase AC system or to a multiphase AC system. For instance, the synchronous timing of the high frequency carrier signals for all AC-Phases may coincide or the synchronous timing of the high frequency carrier signals for each AC-Phase may be without coincidence, such as by a phase offset time in accordance with the desired high frequency multiphase system. In a 3 phase high frequency system example, each phase of the high frequency carrier would be offset by 120 degrees.

New Synergistic Art of High Frequency Magnetic Energy Sharing (HFMES): The high frequency carrier signals of magnetizing current from all the winding phases store the switching energy in the magnetic field of the PDF-HFT (or PDF-HFT+PIF-HFT Combination). This high frequency oscillating magnetic energy (i.e., power) can be shared between all phase windings only of a PDF-HFT in any proportion as the result of CTOM or CPDM individually controlling (modulating) the current (or power) through the balanced phase windings. CTOM controls power by transition edge timing and CPDM controls power by digitally weighting the number of half cycles per frame. As a result of CTOM or CPDM, only a portion of the energy in the high frequency magnetic field would be allocated to any one phase as previously discussed with the remaining portion of energy available for allocation (or sharing) between the other phases as desired. High Frequency Magnetic Energy Sharing (or HFMES) as was just discussed is different from inherently re-distributing or changing the high frequency magnetic flux by changing the magnetic path as a result of movement. It should be understood that HFMES is specific to the high frequency magnetic energy only in the PDF-HFT (or PDF-HFT+PIF-HFT Combination) and mutually exclusive from the low frequency magnetic energy of any electric apparatus being controlled.

Figure 9:
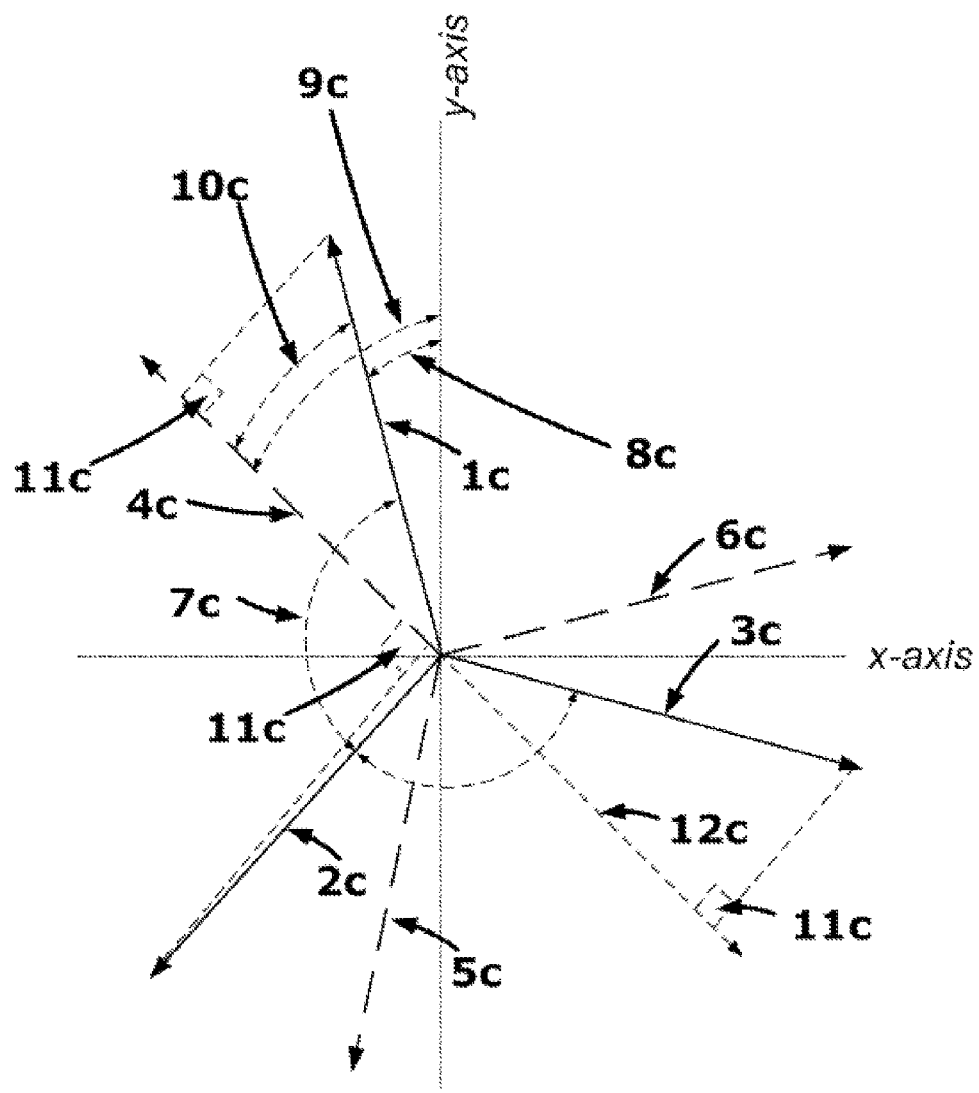
FIG. 9 illustrates a 3-Phase example of the high frequency flux or current vector sharing between phase windings of the Position Dependent Flux High Frequency Transformer (PDF-HFT) on an x-y coordinate system as a result of the new art of compensated modulation technique. Sharing the power flow by CPDM or CTOM is a critical ingredient for BMSCC.

The following analysis demonstrates how CPDM or CTOM share magnetic energy between phases, which is referred to as High Frequency Magnetic Flux Energy Sharing (or HFMES). FIG. 9 gives the vector representation of the "low frequency" modulation envelopes of the three phase (i.e., 3-Phase) signals on each side of the REG (or SEG) in an x-y coordinate reference system. PDF-HFT is interchangeable with PDF-HFT+PIF-HFT Combination in this analysis. More appropriately, these signals could also be the vector representation of a snap-shot of the low frequency modulation envelope amplitude by the high frequency carrier signals on any side of the PDF-HFT in the x-y coordinate reference. The signals could represent AC phase voltages, AC phase currents, or oscillating magnetic energy as a result of the multiphase excitation. The three phase legs of the Reference Signal are Leg_1 1c, Leg_2 2c and Leg_3 3c, respectively, and could be considered the stator winding excitation signals of the PDF-HFT by the stator synchronous modems. The three phase legs of the Resulting Signal are Leg_1' 4c, Leg_2' 5c and Leg_3' 6c, respectively, and could be considered the signals from rotor winding terminals of the PDF-HFT. Since it is a three phase representation, each leg of each AC phase is separated by 120 degrees or $2\pi/3$ radians 7c. Similarly, a six phase representation would have a 60 degree or $\pi/3$ radians of separation between phase legs. The signals for each 3-Phase system rotate together at an angular frequency determined by the given AC excitation frequency (i.e., $60 \cdot 2\pi$ Radians per second @ 60 Hz). Not included in this figure, the rotation could include a mechanical rotation, which is possible with the PDF-HFT. The low frequency and phase of the reference signals are $W_x t + \phi_x$ 8c. The desired frequency and phase of the resulting signals are $W_y t + \phi_y$ 9c. The difference between the reference and resulting signals is $[(W_x t + \phi_x) \pm (W_y t + \phi_y)]$ 10c. The energy stored in the magnetic field is the difference between the energy leaving the PDF-HFT (e.g., leaving on the Resulting Signals) and the energy entering the PDF-HFT (e.g., entering on the Reference Signals). Assuming the signals are balanced, the entire analysis will be a simple analysis of a single leg, Leg_1'. The sum of the components of each reference signal phase that has right angle 11c intersections to the phase leg of observation is the desired resulting signals. The dotted reference 12c is the negative extrapolation of Leg_1', which determines the resulting component attributed to Leg_3 of the reference signal vectors.

The reference signals represented by the set of 3-Phase vectors pass through a bi-directional modulator circuit, which are the synchronous modems of the REG. By modulating and then demodulating the signals by the modulation art specific to Real Time Emulation Control (or Brushless Multiphase Self-Commutation Control), which is CTOM or CPDM or combination, the synchronous modem circuit of the REG functions as a variable window into sharing the high frequency magnetic energy of any of the reference or resulting phase signals. Automatically included in each signal are amplitude components associated with the step-up, step-down, or neutral winding-turns ratio between the stator and rotor winding sets (transformer ratio) of the PDF-HFT and the amplitude components associated with the mechanical speed and phase component according to the relative movement between the rotor and stator winding sets of the PDF-HFT.

The following gives a simple analysis of changing the frequency, $W_x$, and phase, $\phi_x$, of the reference signals to a different frequency, $W_y$, or phase, $\phi_y$, which considers the PDF-HFT to be stationary (such as at a potential standstill condition) and as a result, does not include any mechanical speed and phase component of a moving PDF-HFT. The symmetry of the REG synchronous modem circuits allow electronic modulation or demodulation to occur on either side of the PDF-HFT of the REG.

By simple vector arithmetic and assuming the normalized amplitudes, each leg of the three phases of the reference signals will be:

$$\text{Leg\_1} = \text{Sin}(W_x t + \varphi_{x1});$$

$$\text{Leg\_2} = \text{Sin}\left(W_x t + \varphi_{x2} + \frac{2\pi}{3}\right);$$

$$\text{Leg\_3} = \text{Sin}\left(W_x t + \varphi_{x3} + \frac{4\pi}{3}\right);$$

Where:
 $W_x$ Electrical Frequency;
 $\phi_{x1}$, $\phi_{x2}$, $\phi_{x3}$ Angle of Electrical Frequency for each phase with the difference between phase 1, 2, & 3 depicting balanced or unbalanced phases.

The compensated modulation on each phase are:
Modulation for Leg_1:

$$A\text{Cos}((W_x \pm W_y)t + \phi_x \pm \phi_{y1});$$

Modulation for Leg_2:

$$A\text{Cos}\left((W_x \pm W_y)t + \varphi_x \pm \varphi_{y2} + \frac{2\pi}{3}\right);$$

Modulation for Leg_3:

$$A\text{Cos}\left((W_x \pm W_y)t + \varphi_x \pm \varphi_{y3} + \frac{4\pi}{3}\right);$$

Where:
 $W_y$ Electrical High Frequency of the desired waveform;
 $\phi_{y1}$, $\phi_{y2}$, $\phi_{y3}$ Angle of Electrical Frequency of the desired waveform for each phase with the difference between phase 1, 2, & 3 depicts balanced or unbalanced phases;
 A The adjustable (i.e., by modulation or magnetic amplification) normalized amplitude (or multiplier), which can be a multiplier value between 0 and A', where A' is the winding-turns ratio of the PDF-HFT;
 ± Direction of frequency (clockwise or counter-clockwise rotation on polar coordinates).

Let $\pm(W_y t + \phi_y)$ be the frequency and phase of the desired waveform with the (±) indicating the direction (clockwise or counter-clockwise).

As the transition (such as a square wave) become faster (straighter), the relation is a Fourier series of harmonic components, which is a duplication of the proceeding relations for each term in the Fourier series.

Then considering only balanced phases (i.e., $\phi_{x1}=\phi_{x2}=\phi_{x3}$) of the resulting signals for simplicity:

Leg_1':

$$\text{Leg\_1}' = A\text{Cos}((W_x \pm W_y)t + \varphi_x \pm \varphi_{y1}) \times \text{Sin}(W_x t + \varphi_x) +$$
$$A\text{Cos}\left((W_x \pm W_y)t + \varphi_x \pm \varphi_{y2} + \frac{2\pi}{3}\right) \times \text{Sin}\left(W_x t + \varphi_x + \frac{2\pi}{3}\right) +$$
$$A\text{Cos}\left((W_x \pm W_y)t + \varphi_x \pm \varphi_{y3} + \frac{4\pi}{3}\right) \times \text{Sin}\left(W_x t + \varphi_x + \frac{4\pi}{3}\right);$$

Leg_1' relation can be further expanded:

$$\text{Leg\_1}' = A\text{Cos}((W_x \pm W_y)t + \varphi_x \pm \varphi_{y1})\text{Sin}(W_x t + \varphi_x) +$$
$$A\left[\text{Cos}((W_x \pm W_y)t + \varphi_x \pm \varphi_{y2})\text{Cos}\left(\frac{2\pi}{3}\right) - \text{Sin}((W_x \pm W_y)t + \varphi_x \pm \varphi_{y2})\text{Sin}\left(\frac{2\pi}{3}\right)\right] \times$$
$$\left[\text{Sin}(W_x t + \varphi_x)\text{Cos}\left(\frac{2\pi}{3}\right) + \text{Cos}(W_x t + \varphi_x)\text{Sin}\left(\frac{2\pi}{3}\right)\right] +$$
$$A\left[\text{Cos}((W_x \pm W_y)t + \varphi_x \pm \varphi_{y3})\text{Cos}\left(\frac{4\pi}{3}\right) - \text{Sin}((W_x \pm W_y)t + \varphi_x \pm \varphi_{y3})\text{Sin}\left(\frac{4\pi}{3}\right)\right] \times$$
$$\left[\text{Sin}(W_x t + \varphi_x)\text{Cos}\left(\frac{4\pi}{3}\right) + \text{Cos}(W_x t + \varphi_x)\text{Sin}\left(\frac{4\pi}{3}\right)\right];$$

To simplify term expansion for a more obvious solution, consider a two phase system:

$$\text{Leg\_1}' = A\text{Cos}((W_x \pm W_y)t + \varphi_x \pm \varphi_{y1}) \times \text{Sin}(W_x t + \varphi_x) +$$
$$A\text{Cos}\left((W_x \pm W_y)t + \varphi_x \pm \varphi_{y2} + \frac{\pi}{2}\right) \times \text{Sin}\left(W_x t + \varphi_x + \frac{\pi}{2}\right);$$

Or:

$$\text{Leg\_1}' = A\text{Cos}((W_x \pm W_y)t + \varphi_x \pm \varphi_{y1}) \times \text{Sin}(W_x t + \varphi_x) +$$
$$A\left[\text{Cos}((W_x \pm W_y)t + \varphi_x \pm \varphi_{y2})\text{Cos}\left(\frac{\pi}{2}\right) - \text{Sin}((W_x \pm W_y)t + \varphi_x \pm \varphi_{y2})\text{Sin}\left(\frac{\pi}{2}\right)\right] \times$$
$$\left[\text{Sin}(W_x t + \varphi_x)\text{Cos}\left(\frac{\pi}{2}\right) + \text{Cos}(W_x t + \varphi_x)\text{Sin}\left(\frac{\pi}{2}\right)\right];$$

Or:

$$\text{Leg\_1}' = A\text{Cos}((W_x \pm W_y)t + \varphi_x \pm \varphi_{y1}) \times \text{Sin}(W_x t + \varphi_x) -$$
$$A\text{Sin}((W_x \pm W_y)t + \varphi_x \pm \varphi_{y2}) \times \text{Cos}(W_x t + \varphi_x);$$

-continued

By letting ($\phi_{y1}=-\phi_{y2}=\phi_y$) or driving with inverted choppers, one solution is:

Leg_1' = $A \cos((W_x \pm W_y)t + \phi_x \pm \phi_y - (W_x t + \phi_x))$;

And for simplicity, if ($\phi_y=0$) and ($\phi_x=0$), then Leg_1' becomes:

Leg_1' = $A \cos(\pm W_y t)$;

This fixed result for the resulting signals is purely a "real" component and shows the desire waveform has been achieved by sharing the magnetic energy from the primary phase windings with a frequency $W_x$ with an additional frequency component of ($W_x \pm W_y$) by compensated modulation dynamics.

By letting ($\phi_{y1}=\phi_{y2}=\phi_y$) or driving with non-inverted choppers, another solution is:

Leg_1' = $A \cos((W_x \pm W_y)t + \phi_x \pm \phi_y + (W_x t + \phi_x))$;

And for simplicity, if ($\phi_y=0$) and ($\phi_x=0$), then Leg_1' becomes:

Leg_1' = $A \cos((2W_x \pm W_y)t)$;

This oscillating result is purely an "imaginary" component.

The same solutions for the resulting signals hold for two or more phases.

Leg_2':

$$\text{Leg\_2}' = A\cos\left((W_x \pm W_y)t + \varphi_x \pm \varphi_{y1} - \frac{2\pi}{3}\right) \times \sin(W_x t + \varphi_x) +$$
$$A\cos((W_x \pm W_y)t + \varphi_x \pm \varphi_{y2}) \times \sin\left(W_x t + \varphi_x + \frac{2\pi}{3}\right) +$$
$$A\cos\left((W_x \pm W_y)t + \varphi_x \pm \varphi_{y3} + \frac{2\pi}{3}\right) \times \sin\left(W_x t + \varphi_x + \frac{4\pi}{3}\right)$$

By letting ($\phi_{y1}=-\phi_{y2}=\phi_y$) or driving with inverted choppers, one solution:

$$\text{Leg\_2}' = A\cos\left((W_x \pm W_y)t + \varphi_x \pm \varphi_y (W_x t + \varphi_x) + \frac{2\pi}{3}\right);$$

And for simplicity, if ($\phi_y=0$) and ($\phi_x=0$), then Leg_2' becomes:

$$\text{Leg\_2}' = A\cos\left(\pm W_y t + \frac{2\pi}{3}\right);$$

By letting ($\phi_{y1}=\phi_{y2}=\phi_y$) or driving with non-inverted choppers, another solution is:

$$\text{Leg\_2}' = A\cos\left((W_x \pm W_y)t + \varphi_x \pm \varphi_y + (W_x t + \varphi_x) + \frac{2\pi}{3}\right);$$

And for simplicity, if ($\phi_y=0$) and ($\phi_x=0$), then Leg_2' becomes:

$$\text{Leg\_2}' = A\cos\left((2W_x \pm W_y)t + \frac{2\pi}{3}\right);$$

Leg_3':

$$\text{Leg\_3}' = A\cos\left((W_x \pm W_y)t + \varphi_x \pm \varphi_{y1} + \frac{2\pi}{3}\right) \times \sin(W_x t + \varphi_x) +$$
$$A\cos\left((W_x \pm W_y)t + \varphi_x \pm \varphi_{y2} - \frac{2\pi}{3}\right) \times \sin\left(W_x t + \varphi_x + \frac{2\pi}{3}\right) +$$
$$A\cos((W_x \pm W_y)t + \varphi_x \pm \varphi_{y3}) \times \sin\left(W_x t + \varphi_x + \frac{4\pi}{3}\right)$$

By letting ($\phi_{y1}=-\phi_{y2}=\phi_y$) or driving with inverted choppers, one solution is:

$$\text{Leg\_3}' = A\cos\left((W_x \pm W_y)t + \varphi_x \pm \varphi_y - (W_x t + \varphi_x) + \frac{4\pi}{3}\right);$$

And for simplicity, if ($\phi_y=0$) and ($\phi_x=0$), then Leg_3' becomes:

$$\text{Leg\_3}' = A\cos\left(\pm W_y t + \frac{4\pi}{3}\right);$$

By letting ($\phi_{y1}=\phi_{y2}=\phi_y$) or driving with non-inverted choppers, another solution is:

$$\text{Leg\_3}' = A\cos\left((W_x \pm W_y)t + \varphi_x \pm \varphi_y + (W_x t + \varphi_x) + \frac{4\pi}{3}\right);$$

And for simplicity, if ($\phi_y=0$) and ($\phi_x=0$), then Leg_3' becomes:

$$\text{Leg\_3}' = A\cos\left((2W_x \pm W_y)t + \frac{4\pi}{3}\right);$$

These solutions do not include the mechanical phase and speed component, which is attributed to the relative mechanical relationship between the rotor and stator winding nor the amplification component do to the winding-turns ratio.

In conclusion, with the proper modulation parameters, the signal $\sin(W_x t+\phi_x)$ can be electronically re-fabricated to $A \sin(W_y t+\phi_y)$ by frequency, phase, or waveform shape, regardless of any movement or position of the PDF-HFT shaft. More importantly, the propagation of power through the REG (or SEG) can be re-fabricated from one waveform to another waveform by sharing the high frequency oscillating magnetic energy through any combination of the CTOM or CPDM techniques of BMSCC (or RTEC) while remaining in any time or speed variant reference frame. Further, once the parameters for the desired waveform are established, the Phase-Lock-Loop (PLL) mechanism or the electromagnetic self-commutation of the PDF-HFT holds these parameters regardless of speed (i.e., even zero speed) or until new waveform parameters are desired and entered.

It should be understood that one component of "Waveform Re-fabrication" is using the MCG and any CTOM-CPDM combination to directly share the "high frequency magnetic energy" existing between balanced phase windings in the core of the PDF-HFT or PDF-HFT+PIF-HFT Combination while transferring power to the electric apparatus under control. The modulation carrier gating (switching) is in synchronous relationship to the oscillating high frequency magnetic energy. The high frequency magnetic energy is energy in the core of the PDF-HFT that oscillates at the same frequency as the gating of the magnetizing magneto-motive-force provided by the MCG. In contrast, the traditional modulation means of "Frequency Synthesis" for electric machine control, such as FOC, shares the "low frequency electromagnetic energy" in the core of the actual electric machine entity under control and in the storage components of the modulator circuit (such as the DC Link Stage) by derivatives of Pulse Width Modulation, Phase Modulation, or Space Vector Modulation for transferring power to the electric machine under control. The electromagnetic energy is effectively constant energy in relation to the high frequency modulation switching (or gating).

As used herein, adjustment, re-fabrication, and conditioning of the signal waveforms are similar terms to describe the conversion operation on a waveform.

New Synergistic Art of Environmental Stress Immunity Means (ESIM): Since the shafts of the Brushless Multiphase Self-Commutation Controller (BMSCC) with a moving configuration and the electric apparatus under the control of BMSCC, such as the PGM, must be attached to the electric apparatus to convey operating speed and position, BMSCC and the controlled electric apparatus are closely coupled. As a result, BMSCC is the only electric machine control art that compels the environmentally sensitive control and power electronic components and the electrical components to be subjected to the same operating (or environmental) conditions as the electric apparatus under control, such as heat, mechanical stress, etc. In contrast, all other control technologies, such as FOC, impose no restriction on mounting the sensitive electronic and electrical equipment remotely from the operating conditions subjected on the electric machine under control. Electronic components are active components, such as integrated circuits, power semiconductors, etc. Electrical components are passive components, which include all other components, such as capacitors, inductors, printed circuit boards, the PDF-HFT, the PIF-HFT, moving and stationary body winding sets, etc. Years of proprietary research, development, and prototyping by Klatt, which cannot be obvious to electric machine experts or engineers because there is no prior BMSCC art, made it apparent that incorporating environmental immunity means against heat, humidity, altitude, mechanical stress, etc. is crucial to the practicality of BMSCC because of the integral proximity of BMSCC to the electric apparatus being controlled. It follows that any art that mitigates the environmental stress on the REG, the SEG, or the PGM is new and useful improvement for BMSCC and is considered new synergistic invention for BMSCC.

Heat is transferred (or dissipated) by convection (i.e., carried away from the heat source by a moving fluid, or gas, etc.), conduction (i.e., molecular agitation and energy absorption through a medium), vaporization (i.e., changing from one state to another), or radiation (i.e., electromagnetic waves or light). It follows that any of the heat transfer methods can be passive or active. A passive transfer of heat, such as using a copper bar to conduct the heat away from an electronic circuit, uses no separate power source to move the heat away from the heat source. An active transfer of heat, such as a motorized fan to blow cool air over an electronic circuit or an acoustic means to move heat by waves, uses a separate power source to move the heat away from the heat source. Active transfer means rely on acoustics, fans, pumps, thermocouples, etc., and a cooling medium, such as cooling fluids, cooling gases, cooling mists, etc.

Environmental stress immunity means specific to Brushless Multiphase Self-Commutation Control (or Real Time Emulation Control) comprise at least the following: 1) Incorporating any electronic and electrical components with the composition, design, construction, or manufacture that allows reliable operation above 49 degrees Celsius, which is the minimum operating temperature of the insulation of the windings of any electric apparatus complemented with BMSCC (or RTEC). This includes exotic electronic components, such as components based on silicon carbide, gallium arsenide, etc. 2) Incorporating any potting or mounting of the electronic and electrical components to protect the electronic and electrical components from mechanical stress, such as shaft acceleration, or to improve heat dissipation 3) Incorporating any passive or active form of heat immunity, such as (but not limited to) the use of ultrasound (such as that use in a humidifier) to mist a fluid, such as oil, water, antifreeze, etc., for a cooling medium or to propagate heat acoustically, etc., or an active means, such as a fan, pump, or vacuum, to move the cooling medium across the heat sensitive components, or thermocouples, or other heat conduction means, such as using the actual winding conductor material to dissipate heat, or heat pipes 1) Incorporating slots, channels, sections, or seams into the rotor or stator lamination stacks of the electric machine core for the flow of cooling medium. The slots, channels, sections, or seams could be integrated with vanes, propellers, or means to force the flow of cooling medium with the movement of the rotor.

New Synergistic Art of the CTOM-CPDM Modulation Start-Up Method: CTOM-CPDM Modulation Start-up Art is an integral component of CTOM-CPDM Modulation peculiar to BMSCC. The CTOM-CPDM Modulation Startup follows. First, establish the "Initial Setup and Control of the Magnetizing Current" in the PDF-HFT (or PDF-HFT+PIF-HFT Combination) by the MCG in accordance with the port voltages and the baseline design frequency of the PDF-HFT (or PDF-HFT+PIF-HFT Combination). If the MCG is integrated into the synchronous modems, it is conceivable that only synchronous modems (with an integrated MCG means) on one side of the PDF-HFT (or PDF-HFT+PIF-HFT Combination) will be started, since parametric information has yet to be established for satisfactory calculation of CTOM or CPDM modulation control. Further, this pre-established oscillating magnetic field may be the only means to supply power to any control logic on the other side of the PDF-HFT (or combination). Second, begin the Basic Three Step Process Control Method (BTPCM) of RTEC (or BMSCC) that includes the gating of the synchronous modems on both sides of the transformer after the parametric information has been captured and calculated, which effectively establishes the "Power Transfer Control" by CTOM, CPDM or combination.

BMSCC inspires its own complementary new art, which comprises: 1) Basic Three Step Process Control Method (BTPCM) art, 2) Simultaneous Mechanical Control Process (SMAC) art, 3) Capture, Control, Command, and Communication Processor (CCCC) art, 4) Speed Position Resolver (SPRM) art, 5) Synchronizing Means (SM) art, 6) Wireless Communication Means (WCM) art, and 7) Soft Switching Compensation (SSC) art.

New Complementary Art of the Basic Three Step Process Control Method (BTPCM): Real Time Emulation Control (RTEC) or Brushless Multiphase Self-Commutation Control (BMSCC) requires a simple three basic step control process, which is unlike the complex four basic step control process of derivatives of FOC that must include its extraneous but distinguishing process disruption steps of multiphase "speed-variant" to "speed-invariant" transformations and frequency synthesis with electronic processing, which is very different from the electromagnetic processing of BMSCC.

The Basic Three Step Process Control Method (BTPCM) follows. For Process Control Step One, measure the voltage, the current, the speed, the position, the torque, or a combination of any derivative thereof as seen at the electrical and mechanical terminals of the electric machine. For Process Control Step Two, with the data acquired determine a response to achieve the desired or expected electrical or mechanical parameters, such as power factor, torque, or speed. For Process Control Step Three, adjust or re-fabricate the shape of the waveform of the "modulation envelop" to achieve the desired results by the modulation techniques of CTOM or CPDM that are peculiar to RTEC (or BMSCC). Other parameters determined by either measurement or calculation for more complex control would still be a derivative of the basic three step process. Understand that BTPCM is for optimizing the performance of the electric machine being controlled (i.e., the PGM) and to control the distinguishing feature of RTEC (or BMSCC), which is inherent self commutation with any input frequency of excitation that will continually accelerate the PGM without the Basic Three Step Control measures.

It should be understood that the manual three step process does not include the manual time (or speed) variant to time (or speed) invariant transformation process associated or required with other means of control. Therefore, the Basic Three Step Process Control Method is basic and may comprise other sub-steps but not the processing intensive time variant to time invariant transformation process.

New Complementary Art of Simultaneous Mechanical Adjustment Control (SMAC): Another control method, which is peculiar to RTEC or BMSCC, is the ability to mechanically move the relative position (i.e., phase angle) between the stationary body of the REG (or SEG) and a stationary reference to the electric machine being controlled, such as the PGM stationary body, while simultaneously operating under RTEC or BMSCC. Simultaneous Mechanical Adjustment Control (or SMAC), while simultaneously operating under RTEC or BMSCC, allows adjustment of parameters, such as the Power Factor (PF), of any electric apparatus controlled by RTEC or BMSCC, while operating with a given torque or voltage level. This manual adjustment technique could be automatic by incorporating other means, such as an electromechanical servo system that mechanically adjusts the phase angle automatically or on command. Another art for SMAC is to pre-adjust the PF (such as unity PF) or Torque Angle at the origin of manufacture or onsite for a specific or default base torque, current, voltage, or power level of the electric machine.

New Complementary Art of Capture, Control, Command, and Communication Processor (CCCC): Although the PDF-HFT (or PDF-HFT+PIF-HFT Combination) naturally performs the intensive electromagnetic processing in real time by inherent means (i.e., Real Time Emulation Control or Brushless Multiphase Self-Commutation Control), less intensive processing operations, such as Capture, Control, Command, and Communication (or CCCC) processing, among other derivatives of CCCC processing, are still required for satisfactory operation of RTEC or BMSCC. Capture could be measuring the signal conditions, such as the synchronous timing between the synchronous modems, which is a unique requirement of RTEC or BMSCC, or the voltages and current levels. Control could be algorithms, calculations, or adjustments, such as "adjusting" the modulation (or gating) of the synchronous modems to meet a "calculated" parameter requirement determined from a captured measurement. Command could be user desired entry, such as "set speed to" from a keyboard. Communication could be relaying any information from the moving body to the stationary body or retrieving a command from a user friendly interface, such as a remote keyboard. As a result, any combination of Digital or Analog electronic processors may be placed on the secondary side, the primary side, or both sides for performing CCCC operations. The digital or analog electronic processing could be soft programmed, such as by an arrangement of stored electronic instructions, hard-programmed, such as any wired arrangement of amplifiers, digital switching gates, integrated circuits, etc., or soft-wired, such as with Field Programmable Devices. Obviously, the intensity of the desired CCCC operations dictates the processing power required and is a natural requirement for any electric machine controller but in direct contrast to any derivative of FOC, the CCCC operations of BMSCC (or RTEC) do not include any comparably intensive processing operations, such as speed variant to speed invariant transformations and frequency synthesis.

New Complementary Art Speed-Position Resolver Means (SPRM): The PDF-HFT changes the output waveform to a speed-synchronized waveform naturally and without delay in accordance to the relative speed and position between the rotor and stator winding sets because the PDF-HFT is basically a Multiphase Electromagnetic Self-Commutator or Multiphase Electromagnetic Computer. Therefore, the speed and absolute position of the shaft can be determined by incorporating any means to compare any primary to any secondary waveform (or visa versa) of the PDF-HFT or the output of the REG or SEG. As a result, the PDF-HFT, the REG system, or the SEG system is an inherent speed-position resolver means or transducer (SPRM), which is an important parameter for the Basic Three Step Process Control Method (BTPCM) of RTEC (or BMSCC).

New Complimentary Art of Synchronizing Means (SM): Brushless Multiphase Self-Commutation Control (BMSCC) or Real Time Emulation Control (RTEC) and in particular, the modulation techniques of CTOM, CPDM, or combination thereof stipulate the synchronous modems on each side of the air gap of the PDF-HFT (or PDF-HFT+PIF-HFT Combination) be synchronized to the carrier frequency, which is pre-established by the Magnetic Current Generator (MCG). RTEC (or BMSCC) Synchronizing Means (SM) use either a Wireless Communication Means (WCM), such as using an optical or Radio Frequency (RF) medium (with antenna), Circular Transformer means for a pure communication data medium (with or without an RF modulation), or a Phase Lock Loop (PLL) means to establish the synchronizing clock, which the power gating is referenced. For instance, a PLL (on either side of the rotor or stator side or on both sides) means containing circuitry or software control that would monitor the difference between transitions of the carrier power signal by means of a phase detector, produces a synchronized reference frequency that coincides with the PDF-HFT (or PDF-HFT+PIF-HFT Combination) oscillating magnetic field. In another example, the communication means broadcasts a synchronizing framing signal or information packet that allows the CCCC means to re-synchronize.

The synchronous means coincides with a measurable derivative of the high frequency oscillating magnetic field pre-established in the air gap of the PDF-HFT or PDF-HFT+PIF-HFT Combination by the MCG.

As used herein, a "measurable derivative" refers to any signal, which is a result of the oscillating magnetic field that gives a similar reference signal waveform and is measureable by means of a sensor. This includes voltages across the phase winding, currents in the phase windings, etc., which can also relate to signal transitions, signal half-cycles, and signal cycles.

New Complimentary Art of Wireless Communication Means (WCM): A Wireless Communication Means (WCM) could propagate parametric information, logic power, or synchronization means between both sides of the PDF-HFT or PDF-HFT+PIF-HFT Combination. It should be obvious that many circuit and software means can implement the WCM. For instance, the PDF-HFT, the PIF-HFT, or the combination may include another winding set on the primary and secondary side of the transformer with a mutual air gap area that are specifically for a wireless means of propagating logic power or a low level signal for communication.

New Complementary Art Soft Switching Compensation Means (SCC): CTOM, CPDM or combination thereof are established by the timely synchronous gating of the negative-packet-on-transition and positive-packet-on-transition of the bi-directional power switches (i.e., gates) of the synchronous modems. Gating would best occur at the zero level crossing of the current or voltage of the high frequency carrier signal. Gating the negative and position transitions at the zero level (or crossing) of the voltage or current is referred to as soft switching because it minimizes electrical stress on electrical and electronic components since the switching occurs at the lowest power level. Further, Soft Switching (i.e., Resonant Switching) improves the efficiency and switching speed of the circuit because it effectively utilizes the intrinsic impedance of the electrical circuit to its advantage.

The zero crossing of voltage or current "inherently" occurs in BMSCC (or RTEC) because the power signals must be unbiased (i.e., bipolar transitions without DC bias) for efficient electrical power propagation across the air gap of the PDF-HFT by high frequency induction. However, electronic switches (i.e., power semiconductors) of a power circuit together with the gate driving circuit show a finite delay time between the turn-on and turn-off command action and the actual turn-on or turn-off of the switch. Further, delay times change with temperature and circuit component anomalies and as a result, the actual turn-on and turn-off are not entirely deterministic at a given time or for a given circuit condition. Unfortunately, any deviation from the exact switch turn-on or turn-off at the zero crossing shows the negative effects of hard switching, which is the indiscriminate turn-on or turn-off switching while disregarding the potentially high level of current or voltage across the gate of the power switch at the time of the switching.

BMSCC (or RTEC) may use any means to soft switch as near to the exact zero crossings as possible by compensating for indeterminate delays. One circuit means averages out delay times over repeated measurement iterations of gate turn-on (and turn-off) actions. As used herein, this method will be referred to as Iterative Averaging. The circuit measures the "time period", $t_1$, between the start of the "gate transition command" time, which is the time the control circuit commands a turn-on or turn-off action to occur, and the power "switch transition sense" or when the resulting transition of the power semiconductor or power signal is actually sensed (by a sensing circuit) to have occurred. The sense circuit can detect a "before zero crossing" or an "after zero crossing" and may detect any parameter that gives the level of switching energy to determine the proximity to the zero crossing. If the actual power switch turn-on (or turn-off) transition occurs before (or after) the "inherent" zero crossing of the steady-state oscillation, a faster transition through the zero crossing than the expected steady state dv/dt of the inherent signal transition (or hard switch) will occur, which can be measured. The "level" of the switch transition sense determines the proximity of the actual switched transition to the inherent zero crossing and the "polarity" of the switch transition sense determines on which side of the zero crossing the transition occurred. Both level and polarity can be measured, which gives an indication of how far from the expected zero crossing and on what side of the expected zero crossing did the actual power switching occur. This "time period", $t_1$, will be adjusted (according to the level detected) and added or subtracted (according to the polarity detected) from the next gate transition command. The next iteration measures the "time period", $t_2$, between the start of the "gate transition command" and the "switch transition sense" and accordingly adds or subtracts the next "time period", $t_2$, from the previous transition gating time, $t_1$. Over time, intrinsic component time, $t_N$, any delays associated with sense circuit delays, temperature, and other circuit anomalies are average out and will be constantly readjusted as dynamic changes take place. It should be understood that "level" is a relative term, referring to power, voltage, current, etc.

Assume a 10 kHz oscillating excitation is occurring in the BMSCC. As a result, a positive-on-transition will occur every 100 microseconds and the power switching clock (synchronizing clock, $S_{clock}$) would tick every 100 microseconds (the negative-on-transition has been neglected for simplicity but compensation follows the same analogy). As an example, assume $t_1$ was measured to be 1 microsecond from the time the "on-gate transition command" was issued and the actual power switch turned-on is sensed, "switch transition sense". Further, the power switched (or turned-on) after the inherent signal zero crossing as indicated by the "polarity" of the switched transition sense. Therefore, the next "on-gate transition command" should occur 1 microsecond before the expected time to command an actual turn-on of the power switch at the zero crossing of the inherent oscillating signal, which is ($S_{clock}-t_1$). At the next gate turn-on command, $t_2$ was measured to be 0.1 microsecond and the polarity was measured to be before the inherent signal zero crossing. Therefore, the next on-gate command would occur 0.9 microseconds before the expected time to command an actual turn-on of the power switch, which is ($S_{clock}-t_1+t_2$). This process goes on infinitum or until the gating is terminated.

The sensing for the actual switch on and off transitions will occur well within a half-cycle period of the carrier signal or within the next transition time (100/2 microsecond for this example). If no finite voltage or current transition is sensed within this period, the "time period" will be zero (and could be discarded), since it is assume, the actual power semiconductor transition occurred very close, if not coincidentally, to the zero crossing of the expected carrier signal transition. It should be understood, that this prediction algorithm or Soft Switching Compensation (SSC) is peculiar to the new art of RTEC (or BMSCC) and the modulation techniques of BMSCC, which is MCG with any combination of CTOM or CPDM.

New Dependent Inventions that were discovered during the research, development, and prototyping of RTEC or BMSCC, which depend on RTEC or BMSCC, are any Singly-Fed or Doubly-Fed Electric Machine System that uses RTEC or BMSCC, Variable Speed Constant Frequency (or VSCF) Wind Turbine (or any Prime Mover such as Renewable Energy) that uses RTEC or BMSCC, any Electric Vehicle (EV) Power Train with RTEC or BMSCC, and Stationary or Rotary Phase or Frequency Converter, or Pole-Pair Emulator Converters based on BMSCC. Any Singly-Fed or Doubly- Fed Electric Machine that uses RTEC (or BMSCC) would include electric generators, electric motors, superconductor electric machines, rotary converters, Pole-Pair Emulator, etc., that use RTEC (or BMSCC) technology.

New Dependent Invention of Any Electric Machines: By employing either SEG or REG means, any doubly-fed or singly-fed electric machine can be controlled by BMSCC, including Asynchronous, Synchronous, or Reluctance electric machines. Further, any configuration can be supported such as linear form-factor, rotating form-factor, axial flux form-factor, radial flux form-factor, or transverse flux form-factor. The phase windings from one side of the BMSCC (i.e., the secondary side) would connect phase-to-phase to the phase windings of the electric machine being controlled, while the other side of the BMSCC (i.e., the primary side) would connect phase-to-phase to the phase legs of the electrical power grid. The BMSCC can be used to excite the multiphase wound-rotor active winding set (i.e., rotor active winding set) of a Wound-Rotor Doubly-Fed Electric Machine with the REG configuration. In the Wound-Rotor Doubly-Fed Electric Machine configuration, the BMSCC can be connected in parallel, which is the classical method, or in series with the phase windings of the PGM for an advanced brushless wound-rotor synchronous doubly-fed electric machine system. In addition, another BMSCC with the SEG configuration may simultaneously excite the stationary multiphase active winding set (i.e., stator active winding set) of a Wound-Rotor Doubly-Fed Electric Machine. With the SEG configuration, the BMSCC can be used to excite the stationary multiphase active winding set (i.e., stator active winding set) of any singly-fed electric machine, if the singly-fed electric machine places the passive winding set or the permanent magnet assembly on the rotor, such as the classical squirrel cage induction machine. With the REG configuration, the BMSCC can be used to excite the rotor multiphase active winding set, if the singly-fed electric machine places the passive winding set or the permanent magnet assembly on the stator. Similarly, using the most advanced techniques for the PGM entity, the most state-of-art electric machine that includes BMSCC is realized. For instance, an electric machine that uses BMSCC, where the moving windings are embedded in a cylindrical or disk of thin composite material for low inertia, would be another essence of this invention. The BMSCC controlled electric machine can be put in a modular pancake configuration (i.e., axial flux) and stacked for more and more power, while perhaps leaving a space between each module for cooling means. Because BMSCC means is unknown to electric machine experts or engineers, any electric machine that uses BMSCC means, which may include up-to-date or new science design, construction, winding form-factor or manufacture techniques, becomes new art or invention to any Singly-Fed or Doubly-Fed Electric Machine System with BMSCC or RTEC, which could include exotic bearings, such as magnetic bearings, air bearing, etc., or any combination of efficient or exotic materials, such as low loss magnetic materials from nanotechnology or amorphous metals, ribbons, powdered metals, laminations, etc., or exotic low loss conduction materials. Furthermore, the exceptional and symmetric control of BMSCC could more easily complement the rotor assembly with magnetic levitation or bearings.

New Dependent Invention of Superconductor Electric Machines Art: Superconductor Electric Machines are synchronous electric machines with a superconductor field-winding (or wound-field). The superconductor field-winding is a DC electromagnet (i.e., wound-field) that can achieve extremely high air gap Flux Density or extremely high magnetizing currents (or MMF) without resulting electrical loss. Superconductor Electric Machines have numerous daunting problems, which are easily solved with RTEC (or BMSCC). Presently, Superconductor Electric machines must incorporate conventional electronic control, such as FOC, for practical operation. Do to the modulation techniques placed on the active winding set by conventional electronic control, frequency harmonics are imposed on the superconductor field-winding that quench the magnetic field and greatly compromise the superconductor. Further, the superconductor field-winding must be placed on the rotor, which greatly complicates the logistics of the cryogenic fluid support of the superconductor field-winding. RTEC (or BMSCC) does not intentionally drive the active winding set with high frequency modulation, which greatly reduces harmonics and superconductor quenching, and only BMSCC "brushlessly" relocates the multiphase active winding set to the rotor side while simultaneously relocating the superconducting field-winding to the stator side for simplified logistical support of the field-winding cryogenics.

It should be understood, that a superconductor winding is basically a DC electromagnet or field winding and the superconductor electric machine is considered a field wound synchronous electric machine. Replacing the field winding of any field wound synchronous electric machine with a permanent magnet realizes a permanent magnet synchronous machine, which is a viable configuration for the BMSCC for reasons discussed.

New Dependent Invention of Magnetic Bearing Art: Because of the extraordinary and symmetrical control offered by BMSCC and its ability to adjust air gap magnetic fluxes of the PGM entity via a phase-lock-loop approach, magnetic bearings can be easily realized.

New Dependent Invention of Rotary or Stationary Phase or Frequency Converter Invention: Traditionally, a Rotary Phase Converter is an electric machine that converts an alternating current (AC) electrical signal from one phase to another phase (i.e., from single phase AC to three phase AC) as its principle purpose. Similarly, a Rotary Frequency Converter is an electric machine that converts an electrical signal from one frequency to another frequency (i.e., DC to 5 Hz) with rotation of the Rotary Converter precipitating the phase or frequency conversion. Electro-mechanical conversion may occur but is not a principle result of a Rotary Converter. Rotation could be forced by an external electric machine driving the shaft or could use the intrinsic torque of the Rotary Converter, itself. The traditional Rotary Converter consists of a conventional electric machine, such as an induction (or asynchronous) electric machine or a synchronous electric machine with complementary components.

The BMSCC (or RTEC) is a compact, lightweight, efficient Stationary or Rotary Frequency or Phase Converter because of its high frequency of operation. The Rotary or Stationary Frequency Converter follows the Synchronous Speed Relation:

$$fm = \frac{\pm fs \pm fr}{P}$$

Synchronous Speed Relation

The frequency of the waveform at the primary terminals of the BMSCC can be converted to another frequency at the secondary terminals by sharing the energy of the oscillating magnetic field, fr, in the core of the PDF-HFT by any combination of CPDM or CTOM or by rotating (or moving) the shaft, fm, in accordance with the Synchronous Speed Relation. While adjusting only, fin, the BMSCC is a Rotary Frequency Converter because the conversion is done with rotation. In addition, any contrived rotation could also be a means to drive a cooling fan to actively dissipate heat from the system. While adjusting only, fr, the BMSCC is a Stationary Frequency Converter because the conversion is done with frequency re-fabrication by sharing the magnetic energy between phase windings of the PDF-HFT by any combination of CPDM or CTOM with no need for rotation.

As a Stationary or Rotary Phase Converter, the BMSCC can convert a given number of phases on the primary side to another number of phases on the secondary side, while satisfying the Synchronous Speed Relation even at standstill by sharing the energy of the oscillating magnetic field in the core of the PDF-HFT by any combination of CPDM or CTOM, as was discussed.

For instance, supplying the Reference Phase windings 1c, 2c, 3c of FIG. 9 with the proper polarity and magnitude of DC, the signals of the Reference Phase windings would be stationary vectors in time space or fs=0 (see Synchronous Speed Relation). If the rotation speed, fm, was 5 Hz, the Resulting Phase Winding Signals 4c, 5c, 6c would be 3-Phase, 5 Hz AC. The combinational result is a Rotary Phase Converter, which converts a single phase waveform (i.e., DC in this case) to a 3-Phase 5 Hz AC waveform. Similarly, if the rotation speed fm=0 (or no rotation), and the frequency, fs, and phase exciting the Reference Phase windings 1c, 2c, 3c were electronically converted to a 3 Phase 5 Hz waveform by sharing the high frequency oscillating magnetic energy in the PDF-HFT by any combination of CTOM or CPDM, the Resulting Phase Winding Signals 4c, 5c, 6c would be 3-Phase, 5 Hz AC, as well. In both cases, the Resulting Phase Winding Signals would be additionally modified with the frequency or phase of any difference of movement of the shaft. With these two examples presented, applying any mechanical speed or phase to the shaft, fm, or supplying any electrical frequency or phase, fr or fs, by sharing the high frequency oscillating magnetic energy of the PDF-HFT between winding sets by any combination of CTOM or CPDM would fabricate the results to virtually any waveforms. Further, this example demonstrates each of three phase windings being fed with DC (or Single or multiple Phase AC) with the correct polarity and phase; however, other phase winding arrangements with the correct winding-turns ratio and combinational CTOM-CPDM conditioning as calculated by trigonometry may be a simpler alternative depending on the overall design circumstances. The example shows the DC input is electronically re-fabricated to 5 Hz by any combination of CTOM and CPDM, which is a reasonable slip frequency for Induction Electric Machine operation as an example. Of course, any slip frequency could have been produced. According to the Synchronous Speed Relation, 5 Hz slip frequency (and phase) is locked regardless of any change in speed of the shaft. While this describes an example of re-fabricating DC to 5 Hz AC, it should be understood that the frequency can be other than 5 Hz.

Incorporating a Stationary (or Static) Excitation Generator (or SEG), the Rotary BMSCC Phase or Frequency Converter transfers the conversion from stationary-side to stationary-side (or vice-versa) without brushes or slip-rings or to another speed that is different than the movement speed of the SEG shaft. Incorporating a Rotor Excitation Generator (or REG), the BMSCC Phase or Frequency Converter transfers the conversion from stationary-side to moving-side (or vice-versa). Incorporating either a REG or SEG while locking the shaft from movement, the BMSCC transfers the conversion from stationary-side to stationary-side (or vice-versa) with no speed or position component induced on the waveform; therefore, the frequency or phase waveform conversion would be strictly the result of sharing the energy in the high frequency oscillating magnetic field by any combination of CTOM or CPDM.

With a supplemental means of storage, such as a flywheel, a battery, a super-capacitor, another electric machine entity, or another electric machine with high inertia, etc., the stationary or rotary phase or frequency converter based on BMSCC is an Uninterruptible Power Supply (UPS).

With the previous examples, it should now be evident that the REG or SEG with the new art of BMSCC can control any type (i.e., Asynchronous, Synchronous, or Reluctance) or category (i.e., Singly-Fed or Doubly-Fed) of electric machine with controllable electromagnetic self-commutation and with power sources of any number of AC-Phases (including DC) or any frequency. The conversion example just discussed, which converts single phase DC to 5 Hz 3-Phase AC is an example of a BMSCC controller driving the stationary active winding set of an off-the-shelf Induction (or Asynchronous) Electric Machine, where the shafts of the BMSCC and the Induction Electric Machine are attached and move at the same speed to phase-locked the slip frequency to one example frequency of 5 Hz, regardless of the speed of the shafts. Essentially, this is an example of "True" Self-Commutated DC Electric Machine, although the actual electric machine entity is an induction electric machine.

New Dependent Invention of Pole-Pair Emulator: Because the REG (or SEG) with BMSCC (or RTEC) is a rotary frequency converter means, any electric machine mated with BMSCC can emulate an electric machine with a given number of pole-pairs. As shown by the synchronous speed relation, the speed of the shaft of the electric machine is dependent on the frequency of excitation and the number of magnetic pole pairs distributed about its air gap area. By rotating (or moving) the shaft of the REG (or SEG) proportionally to the rotating (or moving) shaft of the PGM (or the electric machine to be controlled), the fractional number of magnetic-poles emulated would be in accordance to the proportional speed ratio between the REG (or SEG) shaft and the PGM shaft. As an example, if a means was incorporated, such as a transmission of gears, chains, or belts or separately with another adjustable speed motor, Synchro-Pair (or Servo-Pairs), or changing ratio transmission combination for moving the speed of the PDF-HFT rotating (or moving) body at a contrived speed, which is twice the speed as the body of the PGM for this example, the speed range of the PGM would be reduced by one-half or would appear to operate like an electric machine with twice as many magnetic pole-pairs. The more common method would attach the PGM and REG bodies (or shafts) directly to rotate at the same speed, which would be a magnetic pole-pair emulation of one-to-one.

It should now be evident that Pole-Pair Emulation can be any fractional or integral ratios, including a variable ratio by rotating (or moving) the shaft at an adjustable speed by any means, such as an adjustable speed drive (or another electric machine driving the REG or SEG shaft) or Synchro-Pair. Since a Synchro-Pair is a rotary (or moving) electrical transformer that forces the same movement applied to any shaft of any Synchro of the pair onto the other Synchro of the pair, the REG or SEG as the Pole-Pair Emulator could be mounted remotely from the electric apparatus under BMSCC control with variable pole-pair emulation.

With pole-pair emulation, the synchronous speed relation with pole pair emulation becomes:

$$fm = \frac{\pm fs \pm fr}{P * \frac{V_{HFRT}}{V_{PGM}}}$$

Synchronous Speed Relation (With Pole-Pair Emulation);

Where:
fs Is the electrical frequency of the AC excitation on the stator (or primary) winding set (i.e., 60 Hz) and is related to the speed of the magnetic field in the air-gap;
fr Is the electrical frequency of the AC excitation on the rotor (or secondary) winding set, which is virtually zero for Singly-Fed or Permanent Magnet Electric Machines;
fm Is the mechanical speed (revolutions per second) of the rotor;
P Is the number of magnetic "pole-pairs";
$V_{PDF\text{-}HFT}$ Is the velocity of the PDF-HFT in relation to the velocity of the PGM ($V_{PGM}$);
$V_{PGM}$ Is the velocity of the PGM in relation to the velocity of the PDF-HFT ($V_{PDF\text{-}HFT}$);

New Independent Inventions discovered during the research, development, and prototyping of RTEC or BMSCC are any EV power train with High Frequency Power Distribution Means (HFPDM), which may or may not include BMSCC (or RTEC), Dual Electric Machines Power Assistive Steering (DEMPSA) for an EV, which may or may not include BMSCC, any VSCF Wind Turbine with the Enhanced Transmission Means (or E™), which may or may not include BMSCC, and a High Frequency Distribution Bus with BMSCC.

New Independent Invention of VSCF Wind and Renewable Energy: Although Electric Machines perform their choirs virtually unnoticed, Electric Machines are the backbone of the electricity infrastructure and are virtually everywhere. Electric Machines will generate electricity for distribution only when mechanically driven by a fixed or variable speed prime mover, which has always been defined as an energy source, such as wind, tidal, wave, steam, fuel, engine, motor, etc. Similarly, Electric Machines will produce mechanical power when excited with electricity. Without supplying electricity or mechanical power, electric machines have no applicable purpose.

As used herein, prime mover is used in the classic sense, which is an initial agent that puts a machine in motion. It is considered the energy source. A prime mover needs a mechanical converter, such as an electric motor, a propeller, an engine, etc., to put the prime mover, such as electricity, wind, hydraulics (i.e., tidal, wave, etc.) fossil fuels, etc., to work RTEC or BMSCC contributes new controller art to all applications requiring an electric machine driven by fixed or variable speed prime movers to generate electricity. Several applications are particularly receptive to BMSCC considering today's renewed sensitivity to energy. One such application is converting the energy from a variable speed windmill (or wind turbine) to the fixed frequency AC electrical utility by BMSCC, which does not incorporate any derivative of Field Oriented Control (FOC) or field-windings. This same application can be equally applied to any prime mover, such as wind energy, wave energy, tidal energy, etc.

Wind, Tidal, and Wave energy are prime movers that are variable in nature. These prime movers can power an electric generator that supplies electricity to a fixed frequency electric distribution system. This makes a Variable Speed Constant Frequency (VSCF) Electric Machine with Brushless Multiphase Self-Commutation Control (BMSCC) or Real Time Emulation Control (RTEC) an attractive alternative for generating electricity from renewable prime movers; in particular, from wind (using wind turbines).

All wind turbines (i.e., windmills) are composed of multiple components. The major components are the tower, the turbine or propeller blades, the propeller wind capture control and motor mechanism for pitch, yawl, braking, etc., the transmission to convert the low speed propeller shaft to a high speed most compatible with the electric machine generator, and the electric machine for converting the variable mechanical power from the prime mover to fixed frequency electricity. Variable Speed Constant Frequency (VSCF) wind conversion is the best means for converting wind energy to electrical energy, because it imposes the least stress on the mechanical components and it captures wind energy over a broader range of wind variation.

A VSCF Electric Machine with Brushless Multiphase Self-Commutation Control (BMSCC) or Real Time Emulation Control (RTEC) offers a leap in performance and benefits over present technology, such as derivatives of Flux Oriented Control (FOC) VSCF Electric Machines, for the following reasons: 1) Wound-Rotor Doubly-fed electric machine with BMSCC (or RTEC) makes the wound-rotor an active winding set and as a result, does not utilize a wound "field" or field winding; 2) BMSCC (or RTEC) performs natural AC-to-speed-synchronized-variable-AC conversion (i.e., self-commutation) without a DC (low frequency) link stage and without a speed-variant to speed-invariant translation and frequency synthesis process by electronic processing, which distinguish BMSCC from derivatives of FOC; 3) BMSCC (or RTEC) is brushless; 4) BMSCC (or RTEC) is ideal for controlling PF correction and torque control under variable speed conditions; and 5) BMSCC (or RTEC) is compatible with any type or category of electric machine, such as the Brushless Wound-Rotor [Synchronous] Doubly-Fed Electric Machine, which has additional attributes, such as low cost electronics and high efficiency.

Wind Turbines are finding ocean based installations more common for many reasons. Ocean based wind turbines require more durable generators, such as brushless generators incorporating BMSCC. Another advantage of BMSCC is a huge ionic source (the salt brine water of an ocean) for energy storage in the form a salt water chemical battery.

It should now become apparent that any VSCF Wind (or any Renewable Energy Prime Mover) Turbine with "Brushless Multiphase Self-Commutation Control" or BMSCC (or RTEC), such as the Brushless Wound-Rotor [Synchronous] Doubly-Fed Electric Machine, is virtually unknown to electric machine experts or engineers and is very different from all other electric machine technology, including the previous patented technology of this inventor. It should also be understood, that a wind turbine (or any renewable energy prime mover energy converter) requires other important considerations or basic components, such as brake, yawl and pitch control, a tower or other structure, etc., for practical operation and should be included in this invention.

New Independent Invention of Enhanced Transmission Means (ETM): Another important ingredient to wind generation is the transmission to increase the rotational speed of a slow turning windmill (i.e., <100 rpm) to a rotational speed that is more compatible with electric machines (i.e., >900 rpm), such as BMSCC (or RTEC) electric machines, and transferring the tremendous power to the electric machine generator. Reducing the weight and cost of the transmission, while increasing its reliability, are a constant goal. This invention considers an internal gear (or stages of internal gears) with a large ring gear driving smaller pinion gears, which in turn may drive additional stages of transmissions for additional torque ratio change, which in turn drive one or more BMSCC (or RTEC) Electric Machines, as an embodiment of ETM. In addition, this invention considers a flexible torque belt (i.e., timing belt, belts, cables, chain, etc.) or Flexible Transmission Means, which includes a large pulley driving smaller pulleys, which in turn may drive additional stages of transmissions for additional torque ratio change, which in turn drive one or more Electric Machines of any type, as an embodiment of ETM. Further, this invention considers a direct drive (i.e., without transmission) to a single BMSCC (or RTEC) Electric Machine with the possibility of Pole-Pair Emulation, large pole count, or transverse flux configuration as an embodiment of ETM. The Enhance Transmission Means driving electric machines, including BMSCC electric machines, should be useful for other energy converting devise as well.

As used herein, a pulley is a device in a flexible belt transmission system for transferring motion power. For instance, a timing belt pulley has striations on the race face and perpendicular to its race, which mates to the timing belt and provides a locking mechanism for the flexible belt, such as found between a chain and sprocket. As used herein, a timing belt pulley is tantamount to a pulley. In the classic sense, a pulley incorporates a channel for the race that provides friction to a belt.

Figure 12:
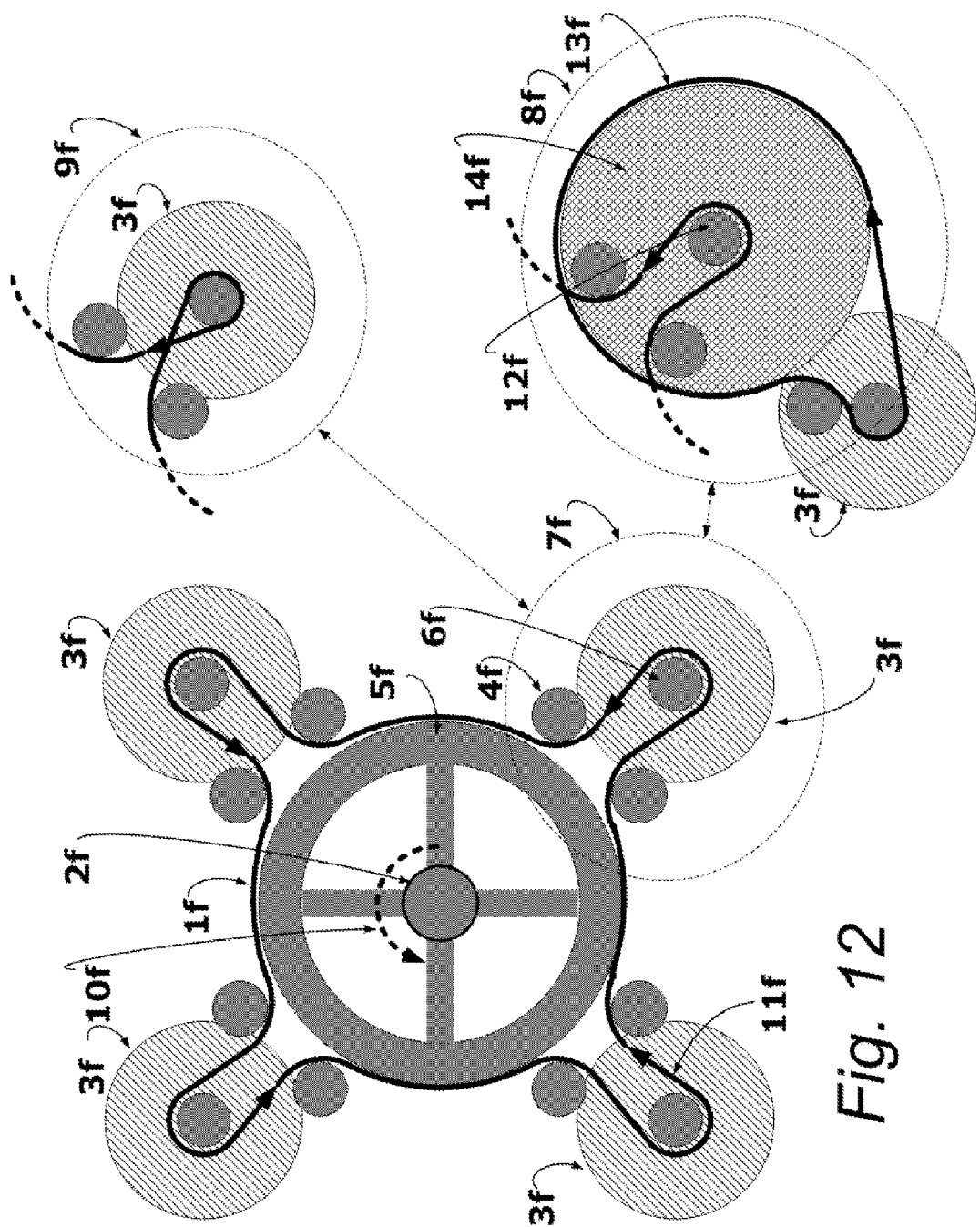
FIG. 12 illustrates an embodiment of the Enhanced Transmission Means (ETM), which is the Flexible Transmission System (FTS) art, for connecting multiple electric machine systems to the prime mover, such as the propeller shaft of a wind turbine transmission, while modifying the speed ratio at the shaft of the electric machine systems and distributing the power and torque between multiple electric machine systems.

FIG. 12 shows one embodiment of a transmission mated to at least one Electric Machine System, (preferably a BMSCC (or RTEC) Electric Machine System) employed in a VSCF Wind Turbine. This embodiment employs Friction Belts, Timing Belts, Chains, Cables, or similar Flexible Transmission Means (FTM) if for propagating rotational power from the shaft 2f of the Wind Turbine Propeller to one or more Electric Machines 3f (preferably BMSCC Electric Machines). Although FIG. 12 shows four Electric Machines, one or any number of Electric Machines could be incorporated to distribute the stress over multiple units. The combined rated power of each Electric Machine is the total power expected from the Wind Turbine shaft 2f. Transmission of power is through an arrangement of Pulleys. Since the principle is to increase the speed of the Wind Turbine shaft 2f to a compatible speed for the Electric Machine 3f shaft pulley, a Large Pulley 5f is attached to the wind turbine shaft and a Small Pulley 6f is attached to the Electric Machine(s). The Flexible Transmission Means follows the circumference speed of the Large Pulley 5f and propagates that speed to the circumference speed of the Small Pulleys 6f. The ratio between the circumference of the Large Pulley 5f, which is attached to the shaft of the Wind Turbine Propeller, and the Small Pulley 6f, which is attached to the shaft of the Electric Machine, determines the rotational speed increase. Since power is the product of torque and speed, the torque will equally decrease with an increase of speed (or vice-versa). The revolutions-per-minute (RPM) ratio increase is equal to the diameter of large pulley divided by diameter of small pulley. The torque ratio decreases and is the inverse of the speed ratio increase. The Idler Wheels 4f guide the flexible transmission means if about the Pulleys 5f & 6f by applying proper tension on the flexible transmission means or by providing a low loss mechanical channel to the Flexible Transmission Means. FIG. 12 shows one arrangement of Idler Wheels but the number and arrangement of Idler Wheels is dependent on the configuration requirements. The rotation direction of the Wind Mill shaft 10f would propagate the force 11f onto the Flexible Transmission Means (FTM).

Two other arrangements of flexible transmission, which would substitute the view 7f (or similar view) with view 9f or 8f. View 9f shows the Flexible Transmission Means to wrap around the shaft or pulley of the Electric Machine 3f (preferably a BMSCC (or RTEC) Electric Machine System). This View 9f is flexible transmission arrangement that reverses the direction of the Electric Machine shaft with regard to the Wind Mill shaft. View 8f shows another stage of speed increase. The shaft 12f, which operates at the speed from the first flexible transmission means, drives another large pulley 14f, which drives a second flexible transmission means 13f, which in turns, drives the shaft of Electric Machine 3f again with an additional multiplication of speed based on the ratio between the diameter of the pulley 14f divided by the diameter of the electric machine pulley.

With the many flexible transmission technology commercially available, the preferred flexible transmission means would be a Timing Belt (i.e., Gilmer Belt). Timing Belts are efficient, flexible for smooth torque transfer, quiet, require no lubrication, and are light weight and are striated for absolute tracking with a striated pulley counter-part. Otherwise, the common practice of multiple wraps of a cable about the pulley may be employed for additional tracking strength. Further, the large pulley (gear) 5f can be made of aluminum or composites for reduced cost or weight because mechanical tolerances are not as critical for flexible transmission belts. Further, the flexible transmission means absorbs stress impulses. The torque rating of the flexible belt is determined by many ingredients, such as belt construction, incorporated material, number of belts, belt dimensions, etc.

Ideally, the flexible transmission (i.e., the Timing Belt, etc.) would be designed and constructed for lifetime service but in practice, this may not be a reality. A monitoring mechanism could sense the condition of the belt or timeout on predicted life expectancy of the flexible belt, for automatic replacement, such as by a robotic means that would be evident to a mechanical expert, from a rack of new belts held in storage local to the Flexible Transmission Means for this very purpose. For instance, at a predefined time of life, which is also convenient for overhaul, the wind turbine could be stopped, the idler pulleys de-tensioned, the old belt automatically removed (perhaps by first cutting the belt), a new belt installed, the idler pulleys returned to proper tension, and finally, the wind turbine returned to operation. It is quite practical to perform this operation without stopping the wind turbine.

Figure 13:
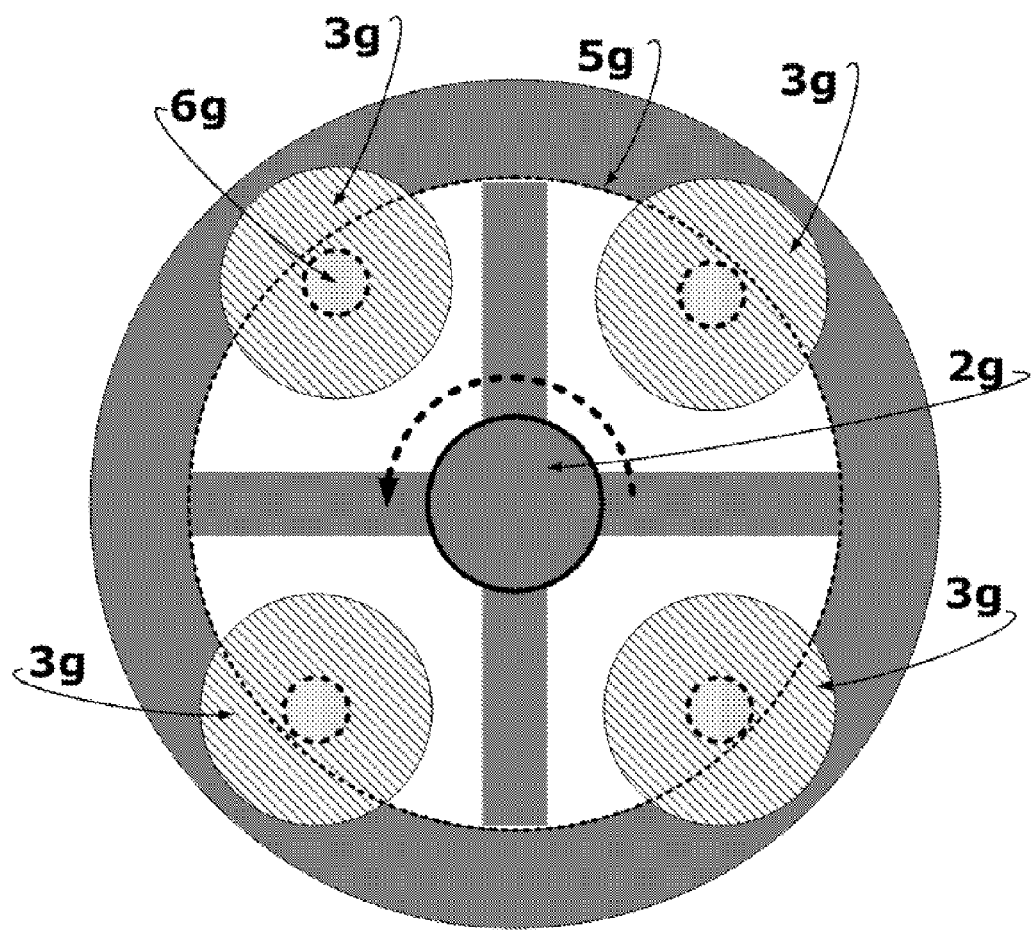
FIG. 13 illustrates an embodiment of the present invention of a Planetary Transmission System (PTS) for connecting multiple BMSCC electric machine systems to the prime mover, such as the propeller shaft of a wind turbine, while modifying the speed ratio at the shaft of the electric machine systems and distributing the power and torque between multiple electric machine systems.

FIG. 13 shows another embodiment of a transmission mated to at least one Electric Machine Systems and is specific to BMSCC electric machines for VSCF Wind Turbines. This embodiment employs an internal gear (or planetary gear) means for propagating rotational power from the shaft 2g of the Wind Turbine Propeller to at least one BMSCC (or RTEC) Electric Machines 3g. Although FIG. 13 shows four BMSCC (or RTEC) Electric Machines, one or any number of BMSCC (or RTEC) Electric Machines could be incorporated. The combined rated power of each BMSCC (or RTEC) Electric Machine is the total power expected from the propeller shaft of the wind turbine. The large ring gear 5g is attached to the shaft 2g of the wind mill. The pinion gears 6g, which are gear driven by said ring gear, is attached to the shaft of the BMSCC (or RTEC) Electric Machine 3g. The speed ratio and torque ratio of the transmission follows the same relation discussed for the Flexible Transmission Means (FTM).

The Flexible Transmission Means, FIG. 12, showed a transmission embodiment with additional speed increase stages 8f. The same principle applies to the Internal (or Planetary) Transmission Embodiment.

Regardless of the transmission means, such as flexible or internal, any auxiliary transmission stages for additional speed reduction or speed increase can be based on the flexible transmission means, the internal transmission means, or other transmission means. Further, the exception control resolution of BMSCC could be programmed to reduce stress on the ETM.

There is always the option of attaching a BMSCC electric machine of high pole-pair count directly to the shaft and avoid any ETM. Large pole count means large diameter electric machine frames, which introduce its own set of problems. Perhaps the tradeoff is a limited speed ratio ETM with larger diameter (i.e., large pole count) electric machine generators.

New Independent Invention of Electric Vehicle (EV): In general, the introduction of Electric Vehicles (EV) is sure way of saving global energy with efficiency standards. Since electric vehicles contain a means to produce high frequency AC for electric propulsion from a portable storage source, a fleet of electric vehicles become a convenient medium for distributed storage for improving the quality and efficiency of the utility power distribution system. The electric machine of the electric vehicle, which is for motoring during forced acceleration or generating during forced deceleration, and the energy storage source, which is for portable electrical power, are the two distinguishing components of any electric vehicle.

Figure 14:
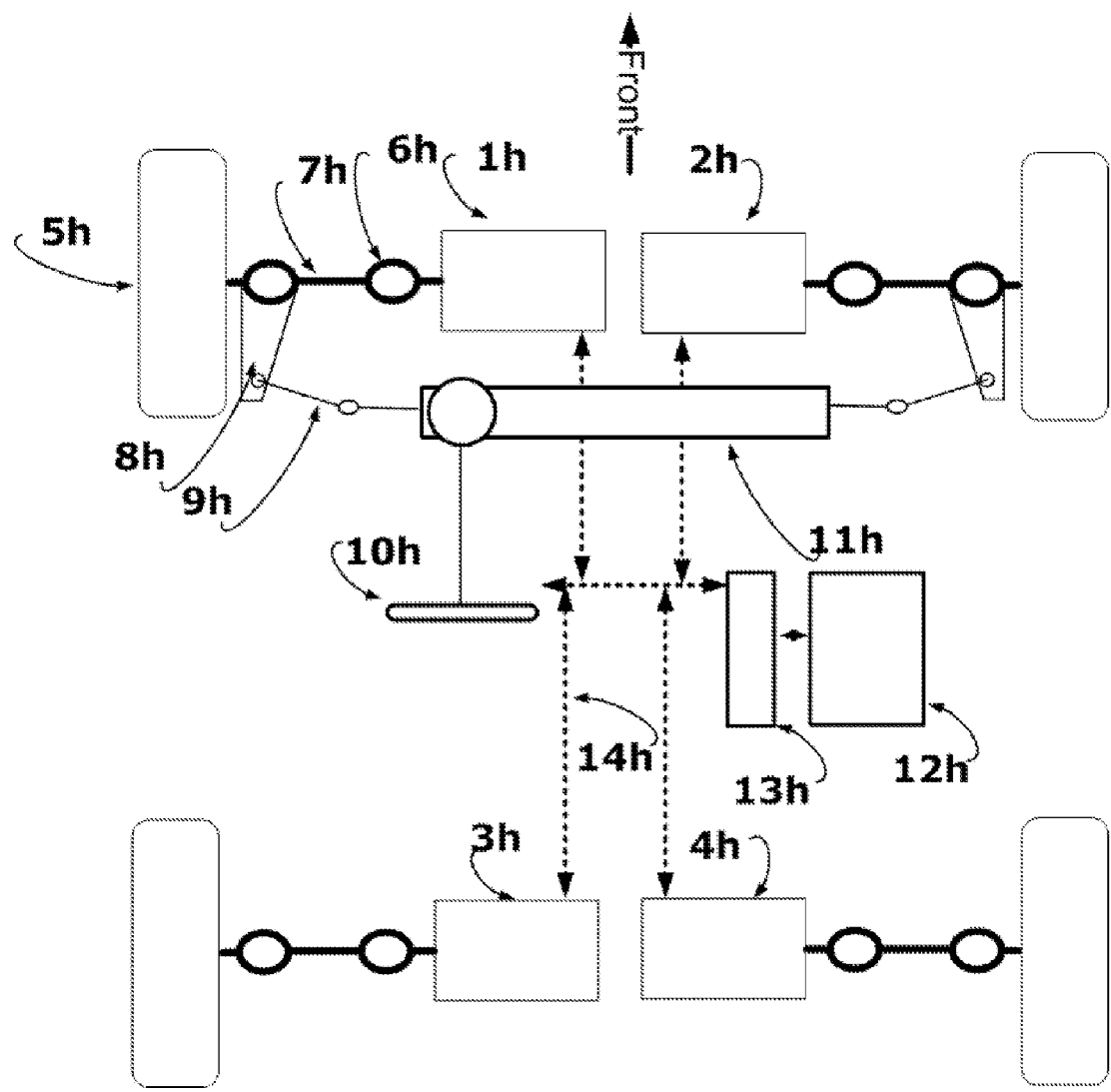
FIG. 14 illustrates an embodiment of the present invention of the Electric Vehicle (EV) power train with all invention related components: the electric machine system means (including BMSCC means), the power assisted steering means, and the High Frequency power distribution bus means.

FIG. 14 shows the major components for an electric vehicle power train. People with ordinary skill in the art would understand the components of an electric vehicle and power train. For simplicity, FIG. 14 does not show the undercarriage, suspension, etc. The front power train of the vehicle includes independent left 1h and right electric machines 2h, which are preferably BMSCC (or RTEC) electric machines, front articulated axles 7h with velocity joints 6h (or universal joints), wheel knuckles 8h connected to tie rods 9h and a rack and pinion steering mechanism with steering wheel and shaft 10h. The rack and pinion steering mechanism for this example may be any steering mechanism with or without power assist. The rear power train of the vehicle may include the same basic mechanism found in the front drive train, including the left side 3h and right side 4h electric machines connected to the wheels with articulated axles, which could be BMSCC (or RTEC) electric machines, and the steering mechanism for complete four-wheel steering.

New Independent Invention of Electric Vehicle (EV) Assistive Steering: Power assist for EV is achieved by individually adjusting the torque of the right and left independent electric machines for the desired steering response via the appropriate feedback control sensing means, which may even include microprocessors and accelerometers. The manual steering mechanism may be incorporated for failsafe operation and steering integrity during electrical power failure or interruption. Likewise, torque control, stability control, anti-lock braking system (ABS), etc. are easily incorporate through independent control of the two separate electric machines and a feedback control mechanism. The rear power train may include two electric machines, as shown in FIG. 14. When incorporating two electric machines certain benefits result, such as no differential requirement, stability control, ABS, etc., which are easily facilitated by independent control of the two separate electric machines and the appropriate feedback control mechanism. Further, the same power steering assistance described for the front power train may be incorporated in the rear power train for complete four-wheel steering with the appropriate feedback mechanism.

New Independent Invention of Electric Vehicle (EV) Power Distribution Bus System: The EV Power Distribution Bus, as shown in FIG. 14, would include any energy storage device, such as battery packs, fuel cells, etc., or any portable electric source, such as an electric generator driven by a prime mover (i.e., internal combustion engine, turbine, etc.) 12h. It also includes a high power electrical bus 14h, which distributes power to all electric machines and other electrical components of the electric vehicle. The Electrical Bus Control Unit 13h at the very least monitors the high power bus and maintains electrical integrity. More likely, the Electrical Bus Control Unit 13h converts the electrical power from the power sources 12h, which may be pure DC, to the Power Distribution Medium 14h, which may be pure DC, high frequency AC with a DC envelop, multiphase high frequency AC with DC envelops, or high frequency AC with multiphase AC envelops. The high power bus control unit 13h could be a BMSCC Stationary or Rotary Phase or Frequency Converter, which can easily convert any DC or AC source 12h to a multiple phase high frequency AC Power Distribution Bus simply by not incorporating the secondary side of synchronous modems of the BMSCC control unit. If the BMSCC control unit included the secondary side of the synchronous modems, a multiple phase Low Frequency AC Power Distribution Bus would be realized.

A high frequency, high power AC distribution system has added protection capability and advantages. For instance, the high power bus control unit 13h will monitor the current at the high frequency for any alarm condition, such as a short circuit condition, and the shut off or disconnecting of the source 12h within the expected half cycle period of the high frequency AC or at the next zero crossing of the AC power, which always occurs at the high frequency. Since power for a high frequency high power bus is applied on a half cycle basis, a short circuit alarm could stop the switching within a half cycle, which is well within the intense pulse current duration immunity tolerance of most power semiconductors. A high frequency distribution bus allows for simple, compact step-up or step-down voltage conversion at any point along the bus. A high frequency distribution bus allows for failsafe operation with continued operation with any remaining phases of integrity without failures. A high frequency multiphase distribution bus allows for distributing the total power over as many wires and connections as phases, which improves electrical efficiency. A high frequency multiphase distribution bus easily accommodates the installation of BMSCC wound-rotor doubly-fed electric machines without Modem means on one side for example. A multiple phase high frequency bus may require special accommodations for practical high frequency operation, such as Litz wire, etc.

New Independent Invention of EV with BMSCC or RTEC Electric Machines: BMSCC electric machines have many advantages in an electric vehicle application. If compared to the most commonly installed EV electric machine, as shown in FIG. 14, which is any category of singly-fed electric machine, a BMSCC Wound-Rotor Doubly-Fed Electric Machine shows certain benefits. A BMSCC Wound-Rotor Doubly-Fed (WRDF) Electric Machine operates at 7200 rpm @ 1 pole-pair with 60 Hz (from the high power distribution bus), which is twice the speed and power with effectively the same size of a comparably rated singly-fed electric machine. At full excitation frequency (or speed), the BMSCC-WRDF electric machine operates at half the voltage and with lower eddy current losses. As a fully symmetrical electric machine, a BMSCC-WRDF electric machine can motor or generator without additional electronic support. Any singly-fed or doubly-fed electric machine with BMSCC shows transfer of power to or from the storage power source 12h with evenly distributed waveforms of low harmonic content and without additional stages of electronic conditioning.

Connecting multiple BMSCC (or RTEC) electric machines would conveniently benefit with a high power electrical distribution bus 14h operating with high frequency AC with a DC envelop, multiphase high frequency AC with DC envelops, or high frequency AC with multiphase AC envelops. For instance, a high frequency, high power distribution system connects directly to the primary side of the PDF-HFT or PDF-HFT-PIF-HFT of the BMSCC (or RTEC) and thereby powering and controlling all electric machines 1h 2h 3h 4h. The BMSCCs are locally without the primary side synchronous modem means and magnetic current generator means, since the primary side synchronous modem and primary magnetic current generator means for all electric machines along the distribution bus is the remotely situated high power bus control unit 13h. The Bus Control Unit 13h becomes an integral part of any BMSCC art employed in the EV. In this configuration, it will be understood that together, the high frequency bus 14h, the high power bus control unit 13h, and the partial BMSCC electric machine that is without primary side modem and magnetic current generator means, as described, is a complete BMSCC electric machine with said components distributed over a greater distance. Because the high frequency distribution bus connects to the primary side of the PDF-HFT of each BMSCC, the high frequency distribution bus has as at least as many high frequency AC signals as the number electrical phase windings of the primary of the PDF-HFT. In accordance to FIG. 4, it is should be understood that the BMSCC shows symmetry between the secondary and primary sides and the Primary Modems, Primary MCGs, Primary Ports, and primary side can be interchanged respectively as a whole with the Secondary Modems, Secondary MCGs, Secondary Ports, and secondary side without changing the essence of the discussion.

Figure 5:
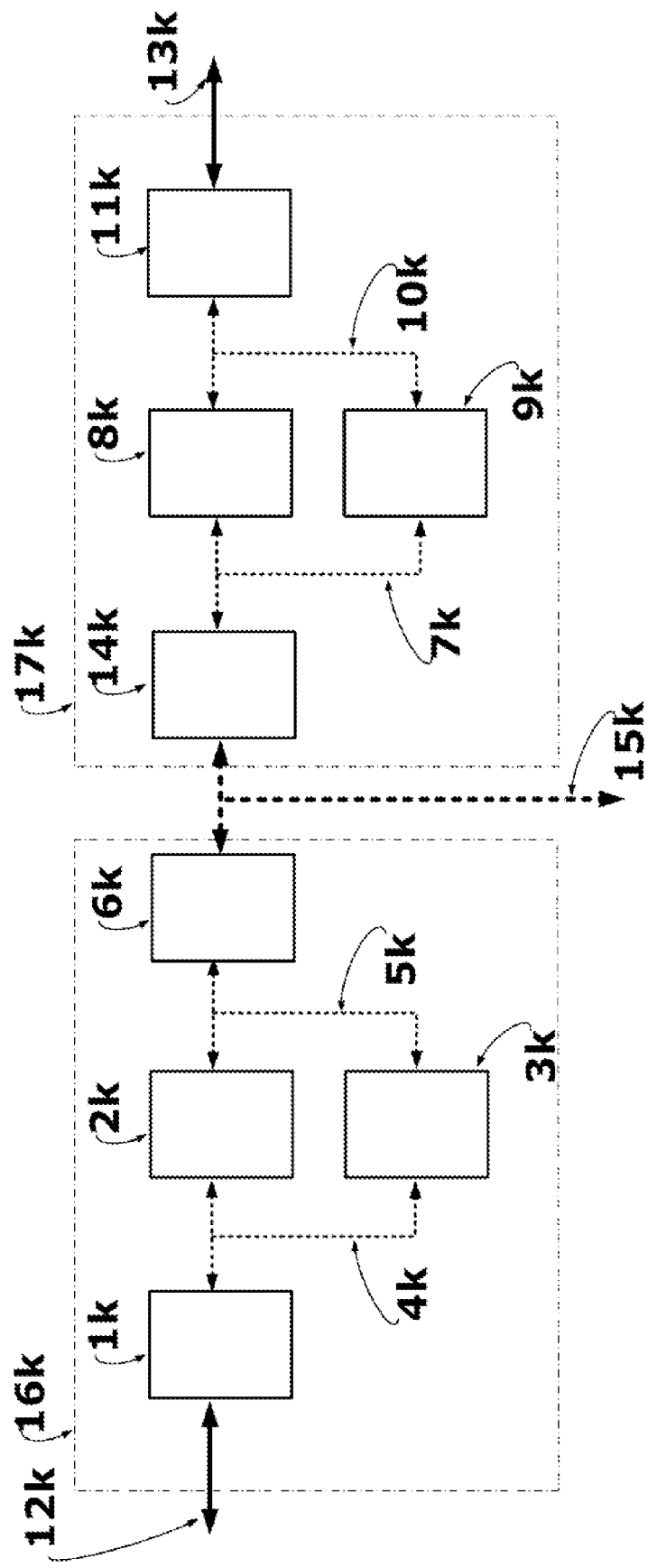
FIG. 5 shows a simple block diagram of two basic BMSCC building blocks connected to a High Frequency Power Distribution Bus. Although two basic BMSCC building blocks were shown, any number of BMSCC building blocks can be tapped into the High Frequency Power Distribution Bus anywhere along its length.

New Independent Invention of High Frequency Distribution Bus: FIG. 5 shows a simple building block diagram representation of two Brushless Multiphase Self-Commutation Controller building blocks 16k & 17k connected to a High Frequency Distribution Bus 15k configuration. The first BMSCC building block 16k includes a PDF-HFT or PDF-HFT+PIF-HFT Combination 6k, the Primary Side Synchronous MODEM 2k, the Primary Side Magnetic Current Generator 3k, the primary side high frequency bi-directional bus 5k, the primary side low frequency bus 4k, the primary electrical terminal block 1k, and the primary port signals 12k. Similarly, the second BMSCC building block 17k includes a PDF-HFT or PDF-HFT+PIF-HFT Combination 14k, the Primary side Synchronous MODEM 8k, the Primary Side Magnetic Current Generator 9k, the primary side high frequency bi-directional bus 7k, the primary side low frequency bus 10k, and the primary electrical terminal block 11k, and the primary port signals 13k. The secondary side of the PDF-HFT 6k is directly connected to its respective electrical phase windings of the High Frequency Distribution Bus 15k and is without secondary side Modem or magnetic current generator means. Similarly, the secondary side of the PDF-HFT 14k is directly connected to its respective electrical phase windings of the High Frequency Distribution Bus 15k and is without secondary side Modem means or magnetic current generator means. It should be understood and obvious to experts that any number of Brushless Multiphase Self-Commutation Controller building blocks, such as 16k & 17k, can tap anywhere along the High Frequency Distribution Bus 15k by directly connecting respective electrical phase windings of the secondary side of the PDF-HFT. The High Frequency Distribution Bus 15K can be comprised of a single high frequency AC signal or multiple high frequency AC signals and the waveform envelope for each high frequency AC signal can be a DC envelope or low frequency AC envelopes. AC signals can be fixed or variable frequency as provided by BMSCC. For example, the High Frequency Distribution Bus could be three separate wires each carrying a high frequency carrier with a signal envelope of one of the AC phases of a balanced three phase system. Furthermore, each of the high frequency carriers can have a relative phase shifted from each other.

Figure 6:
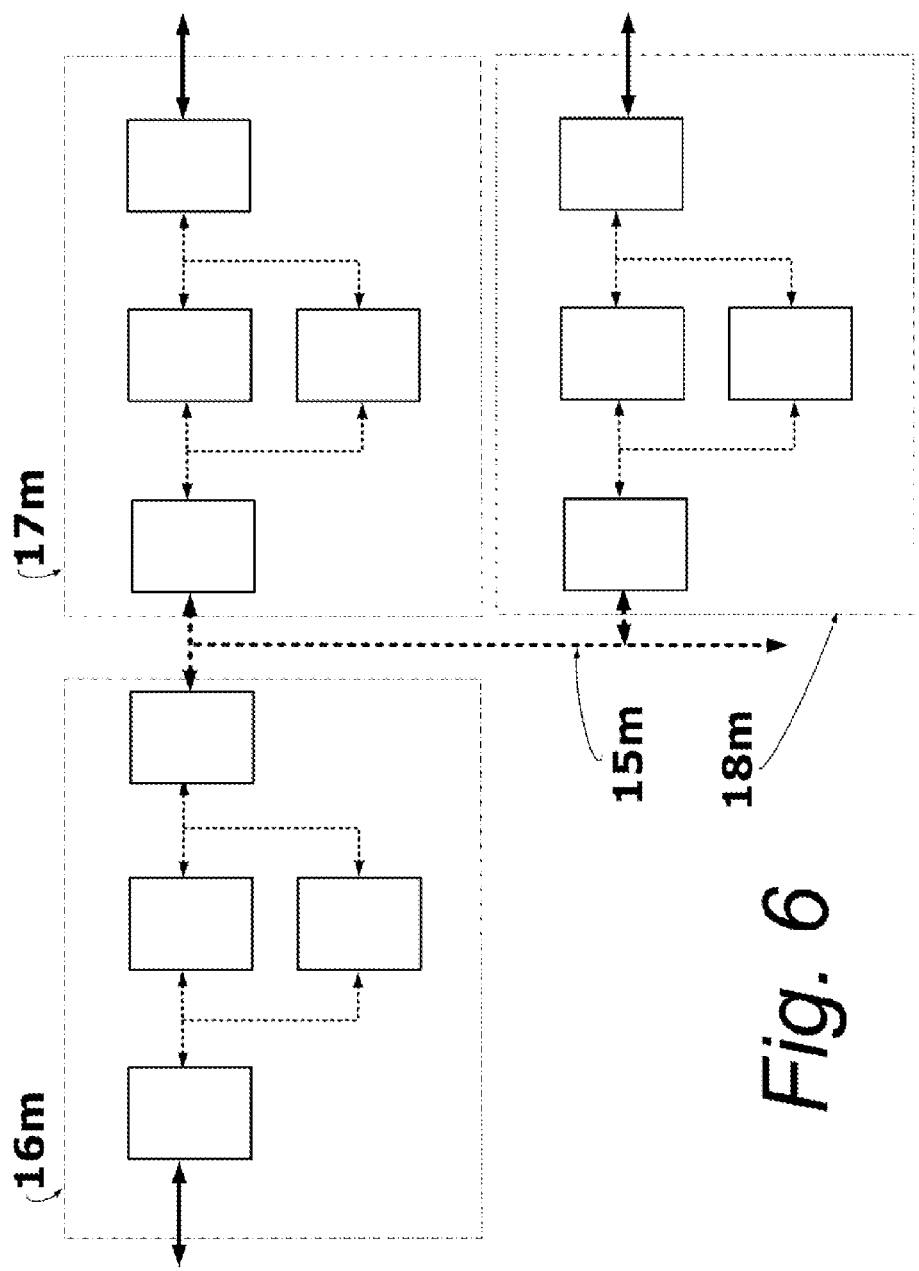
FIG. 6 shows a simple block diagram of three basic BMSCC building blocks connected to a High Frequency Power Distribution Bus to demonstrate that the High Frequency Power Distribution Bus can be tapped anywhere along its length with a third BMSCC.

For multiple tap clarification, FIG. 6 shows a simple building block diagram representation of three Brushless Multiphase Self-Commutation Controller building blocks 16m, 17m, & 18m that tap into High Frequency Distribution Bus 15m along its path. Although FIG. 6 shows three Brushless Multiphase Self-Commutation Controller building blocks, it should be understood that any number of Brushless Multiphase Self-Commutation Controller building blocks can tap anywhere along an appropriately power rated High Frequency Distribution Bus. In accordance to FIG. 4, FIG. 5, and FIG. 6, it is should be understood that the BMSCC shows symmetry between the secondary and primary sides and the Primary Modems, Primary MCGs, Primary Ports, and primary side can be interchanged respectively as a whole with the Secondary Modems, Secondary MCGs, Secondary Ports, and secondary side without changing the essence of the discussion. It is also important to understand that each BMSCC may have different functions. For instance, BMSCC 16m could be controlling a singly-fed or doubly-fed Electric Machine and BMSCC 17m could be connected to a three phase power utility supply with BMSCC 18m connected to a battery for recharging.

In summary, the Brushless Multiphase Self-Commutation Controller or BMSCC is an adjustable speed drive for reliable, contact-less and stable self-commutation control of electric apparatus, including electric motors and generators. BMSCC transforms multiphase electrical excitation from one frequency to variable frequency that is automatically synchronized to the movement of the electric apparatus without traditional estimation methods of commutation and frequency synthesis using derivatives of electronic, electro-mechanical, and field-oriented-control. Instead, BMSCC comprises an analog electromagnetic computer with the new art of compensated (i.e., synchronous) modulation techniques to first establish and then manage magnetic field between phase windings of a multiphase, position dependent flux, high frequency transformer with a magnetizing current generator mean providing compensated gating and then dynamically adjusting packets of magnetic energy between the phase windings with compensated gating dynamics for direct AC-to-AC conversion, which is without an intermediate DC conversion stage. To be practical, other inventions are necessary, which are unlike any other electronic controller of electric machines or adjustable speed drive requirements, such as: 1) environmental stress immunity, because of the unusual symbiotic or local relationship of BMSCC to the electric apparatus being controlled, 2) high frequency performance design, because of the unique power propagation requirements of a PDF-HFT, and 3) sharing magnetic energy between winding sets of a PDF-HFT provided by compensated gating dynamics with the balance multiphase windings of the PDF-HFT. Furthermore, the uniqueness of BMSCC inspires other dependent and independent inventions. For instance, BMSCC realizes the only practical brushless and stable wound-rotor synchronous doubly-fed electric machine system, if implemented as the integrated controller for U.S. Pat. Nos. 4,459,540, 4,634,950, 5,237,255 and 5,243,268 of Frederick W. Klatt, or realizes a universal high frequency distribution bus between at least two remotely placed BMSCC.

As used herein:

PDF-HFT and position dependent flux high frequency transformer are synonymous and similar to all magnetic transformers, the PDF-HFT has a primary side and a secondary side of windings.

BMSCC and brushless multiphase self-commutation controller are synonymous;

Compensated modulation comprises special modulation techniques for synchronous modulation;

Compensated gating is first applying and then managing the magnetizing magneto-motive-force in a PDF-HFT for establishing the oscillating magnetic fields and winding port voltages based on frequency of gating. Compensated gating is the basis for compensated modulation. Any measurable derivative of compensated gating, such as the winding port voltage or the magnetizing current, etc., provides a synchronous reference to the oscillating magnetic energy of the PDF-HFT, also called compensated gating, for compensated modulation;

Compensated gating dynamics is the adjustment of the modulation weighting in synchronism to the compensated gating to transfer and share magnetic energy of the PDF-HFT for contactless power transfer and control;

CTOM and compensated time offset modulation means are synonymous;

CPDM and compensated pulse density modulation means are synonymous.

TECHNICAL FIELD

Electric Motors and Generators, commonly referred to as electric machines, are familiar members of electric apparatus that must be electrically excited with frequency synchronized to movement for useful operation. For practical synchronization of frequency with speed, called commutation, electric motors and generators are routinely complemented with electronic control. To distinguish the Brushless Multiphase Self-Commutation Controller from today's state-of-the-art electronic controllers of electric apparatus, called adjustable speed drives, and to avoid confusion with industry's frivolous use of terminology or practice, a quick study will establish common guidelines for the operation and control of the electric machine, which is a subset of electric apparatus.

Electric machines are electromechanical converters that convert electric power to mechanical power or vice-versa. All electric machines have one mutually independent port for "mechanical" power, which experiences rotation or linear movement at a given speed and torque (or force), and at least one port for "electrical" power (i.e., Singly-Fed) or at most two mutually independent ports (i.e., Doubly-Fed) for "electrical" power. More than three mutually independent power ports is a duplication of the Singly-Fed or Doubly-Fed categories of electric machines. By pumping an average mechanical power into the mechanical port, the electrical port(s) will output an average electrical power (or generate). By pumping an average electrical power into the electrical port(s), the mechanical port will output an average mechanical power (or motor).

The basic electromagnetic core structure of any electric machine consists of the rotor (or moving) assembly and the stator (or stationary) assembly that are separated by a single air gap to allow relative movement. Electric machine operation requires two synchronized rotating (or moving) magnetic fields that are on the rotor (or moving body) assembly and the stator (or stationary body) assembly, respectively. Essentially one moving magnetic

I claim:

1. A Brushless Multiphase Self-Commutation Controller (BMSCC) comprising:
   a. a primary port for connecting at least one electrical signal called primary signals;
   b. a secondary port for connecting at least one electrical signal called secondary signals;
   c. at least one position dependent flux high frequency transformer means (PDF-HFT):
      i. wherein the primary side of said PDF-HFT consist of at least one electrical winding called primary phase winding;
      ii. wherein the secondary side of said PDF-HFT consist of at least one electrical winding call secondary phase winding;
      iii. wherein the operating frequency of said PDF-HFT is greater than the frequency of said electrical signals selected from a group consisting of said primary signals and said secondary signals;
      iv. wherein at least one of said primary phase windings is inductively coupled to at least one of said secondary phase windings by at least one mutual magnetic path;
      v. wherein said inductive coupling is further determined by the ratio between the number of winding-turns of said primary phase winding and said secondary phase winding called winding-turns ratio;
      vi. whereby said mutual magnetic paths change with relative variation between said primary side and said secondary side:
      vii. wherein said relative variation is selected from a group consisting of reluctance, placement, and movement further selected from a group consisting of angular position, angular velocity, phase angle, speed, position, and distance;
   d. at least one magnetizing current generator means for providing gating of electrical power to at least one of said electrical windings of said PDF-HFT:
      i. wherein said gating comprises power switching means selected from a group consisting of electric, electronic, and electromechanical circuits and components;
      ii. wherein said electrical power is selected from a group consisting of said primary signals and said secondary signals;
      iii. wherein said electrical windings are selected from a group consisting of said primary phase windings and said secondary phase windings of said PDF-HFT;
      iv. wherein the base frequency of said gating is said operating frequency of said PDF-HFT;
      v. whereby magnetizing magneto-motive-force is first applied to at least one of said electrical windings of said PDF-HFT to establish oscillating magnetic fields in said PDF-HFT:
      vi. wherein voltage is developed across at least one of said electrical windings of said PDF-HFT;
      vii. whereby the waveform of said voltage comprises a carrier waveform of said gating frequency with a waveform envelope selected from a group consisting of said primary signals and said secondary signals;
      viii. wherein at least one measurable derivative of said oscillating magnetic fields provides a synchronous reference to said oscillating magnetic field called compensated gating:

ix. wherein said measurable derivatives are selected from a group consisting of magnetic field, magnetic energy, electrical voltage, electrical current, and electrical power;
e. at least one modulator-demodulator means called MODEM means for gating electrical power to at least one of said electrical windings of said PDF-HFT:
  i. wherein said gating comprises power switching means selected from a group consisting of electric, electronic, and electromechanical circuits and components;
  ii. wherein said electrical power is selected from a group consisting of said primary signals and said secondary signals;
  iii. wherein said electrical windings is selected from a group consisting of said primary phase windings and said secondary phase windings of said PDF-HFT;
f. at least one modulation means for modulating said gating of said MODEM means:
  i. wherein said modulation means is in dynamic relationship to said compensated gating;
  ii. whereby said modulation means provides dynamic adjustment of said electrical power by said gating of said MODEM means called compensated gating dynamics;
g. a sensor means:
  i. wherein said sensor means is selected from a group consisting of mechanical connection means and measurement means;
  ii. wherein said mechanical connection means is further selected from a group consisting of connection to said secondary side and connection to said primary side of said PDF-HFT for physically applying said relative variation;
  iii. wherein said measurement means electrically apply said relative variation by said compensated gating dynamics;
  iv. whereby at least one waveform component of said secondary signals is selected from a group consisting of said sensor means, said compensated gating, said compensated gating dynamics, said winding-turns ratio, and at least one waveform component of said primary signals.

2. A combination defined in claim 1, further comprising means providing immunity from environmental stress selected from a group consisting of heat, acceleration, force, temperature, humidity, and altitude called environmental stress immunity means:
  whereby reliable operation is provided.

3. A combination defined in claim 2, wherein said environmental stress immunity means further comprises art selected from a group consisting of design, construction, manufacturing, modification, materials, and conditioning further selected from a group consisting of up-to-date science and new science.

4. A combination defined in claim 2, wherein said environmental stress immunity means further comprise heat removing means selected from a group consisting of passive and active means further selected from a group consisting of heat convection, heat conduction, vaporization, and heat radiation.

5. A combination defined in claim 2, wherein said environmental stress immunity means are selected from a group consisting of potting and mounting techniques.

6. A combination defined in claim 2, wherein said environmental stress immunity means provide said reliable operation at temperatures greater than forty-nine degrees Celsius.

7. A combination defined in claim 2, wherein said environmental stress immunity means provide said reliable operation at mechanical acceleration levels greater than or equal to one unit of gravity.

8. A combination defined in claim 1, wherein said PDF-HFT further comprises magnetic material selected from a group consisting of ribbon, tape, lamination, powder, amorphous material, nanotechnology material, powdered material, and low loss material.

9. A combination defined in claim 1, further comprising at least one air-gap between said primary side and said secondary side of said PDF-HFT for providing features selected from a group consisting of non-obstructive movement between said primary and secondary sides and improved flux density distribution.

10. A combination defined in claim 1, wherein said electrical windings on at least one side of said PDF-HFT are balanced multiple phase windings:
  wherein each electrical winding of said balanced multiple phase windings are evenly distributed along a plane that is perpendicular to said mutual magnetic path of said PDF-HFT;
  whereby said relative variation between primary and secondary sides of said PDF-HFT changes said mutual magnetic path coupling said electrical windings.

11. A combination defined in claim 1, wherein the number of said electrical windings on said primary side of said PDF-HFT corresponds to at least the number of said primary signals and the number of said electrical windings on said secondary side of said PDF-HFT corresponds to at least the number of said secondary signals.

12. A combination defined in claim 1, wherein said PDF-HFT comprises a form-factor selected from a group consisting of rotating form-factor, linear form-factor, axial flux form-factor, radial flux form-factor, transverse flux form-factor, and multiple air-gap form-factor.

13. A combination defined in claim 1, wherein said winding-turns ratio of said PDF-HFT is selected from a group consisting of step-up, step-down, and neutral ratios.

14. A combination defined in claim 1, wherein said primary signals are selected from a group consisting of direct current signals and alternating current signals further selected from a group consisting of single phase, multiphase, variable frequency, and constant frequency.

15. A combination defined in claim 1, wherein said PDF-HFT further comprises a transformer means for coupling signals selected from a group consisting of logic signals and logic power.

16. A combination defined in claim 1, wherein said compensated gating comprises a phase lock loop (PLL) means.

17. A combination defined in claim 1, wherein said compensated gating comprises a synchronizing reference means provided by a communication interface.

18. A combination defined in claim 1, wherein means selected from a group consisting of at least one of said MODEM means and at least one of said magnetizing current generator means are remotely placed at a distance from said electrical windings of said PDF-HFT:
  whereby a high frequency distribution bus of said distance exists between said remotely placed means and said electrical windings of said PDF-HFT.

19. A combination defined in claim 1, wherein said BMSCC comprises art selected from a group consisting winding arrangements, circuits, environmental stress reducing techniques, manufacturing techniques, construction techniques, electrical components, electronic components, nanotechnology, and materials further selected from a group consisting of up-to-date science and new science.

20. A combination defined in claim 1, wherein at least one of said magnetizing current generator means dynamically changes the waveform characteristics of said high frequency oscillating magnetic field at any time.

21. A combination defined in claim 1, wherein at least one of said magnetizing current generator means is functionally integrated into at least one of said MODEM means:
   whereby said magnetizing current generator means and said MODEM means are integral functions.

22. A combination defined in claim 1, wherein at least one of said MODEM means provides said compensated gating dynamics independently from other said MODEM means.

23. A combination defined in claim 1, wherein said compensated gating dynamics of at least one of said MODEM means provide sharing said oscillating magnetic field energy between said electrical windings of said PDF-HFT:
   wherein said sharing can be performed at any time.

24. A combination defined in claim 23, wherein said PDF-HFT of said BMSCC is without movement.

25. A combination defined in claim 1, wherein said compensated gating dynamics of at least one of said MODEM means change at any time.

26. A combination defined in claim 1, further comprising resonant switching of said gating selected from a group consisting of at least one of said MODEM means and at least one of said magnetizing current generator means.

27. A combination defined in claim 26, wherein said resonant switching further comprise iterative averaging:
   wherein compensation for circuit delays provides predictable zero crossing;
   whereby soft switching compensation is provide.

28. A combination defined in claim 1, wherein said compensated gating dynamics of at least one of said MODEM means comprises compensated transition offset modulation (CTOM):
   wherein said CTOM comprises dynamically adjusting the timing of said gating relative to said compensated gating;
   wherein said adjustment can be performed at any time.

29. A combination defined in claim 1, wherein said compensated gating dynamics of at least one of said MODEM means comprises compensated pulse density modulation (CPDM):
   wherein said CPDM continues gating for a burst of half-cycles of said compensated gating called string;
   wherein the number of said half-cycles contained in said string called string density determines the amount of electrical energy contained in said string;
   wherein said string density is selected from a group consisting of no half-cycles and at least one half-cycle;
   wherein said string density can change at any time;
   wherein each said string occurs on intervals of more than one half-cycle called frame;
   wherein the number of half-cycles per said frame is greater than said string density;
   wherein the number of half-cycles per said frame can change at any time;
   wherein said frame between said MODEM means on said primary side of said PDF-HFT called first MODEM means and said MODEM means on said secondary side of said PDF-HFT called second MODEM means is skewed a number of said half-cycles selected from a group consisting of no half-cycles and at least one half-cycle;
   wherein said string density may differ between said first MODEM means and said second MODEM means by a number of said half-cycles selected from a group consisting of no half-cycles and at least one half-cycle.

30. A combination defined in claim 1, wherein said compensated gating dynamics of at least one of said MODEM means are selected from a group consisting of Compensated Transition Offset Modulation and Compensated Pulse Density Modulation.

31. A combination defined in claim 9, wherein the stationary body of said PDF-HFT can be mechanically moved relative to any stationary reference of said PDF-HFT simultaneously with said compensated gating dynamics.

32. A combination defined in claim 31, wherein means for providing said relative mechanical movement are selected from a group consisting of manual systems, electric motor systems, electric servo systems, electric Synchro-Resolver systems, constant ratio transmission systems, and variable ratio transmissions systems.

33. A combination defined in claim 1, comprising a method of events:
   a first event to establish said compensated gating by providing magnetizing magneto-motive-force within said electrical windings of said PDF-HFT by said magnetizing current generator means;
   a second event to establish said compensated gating dynamics;
   wherein said second event occurs after said first event.

34. A combination defined in claim 33, wherein said method of events further comprises a basic three step process control method comprising the steps of:
   a) capture data selected from a group consisting of operating parameters and commands;
   b) determine adjustments for said compensated gating dynamics as selected from a group consisting of calculations and communications based on said captured data;
   c) control said compensated gating dynamics in accordance to said adjustments;
   d) repeat the method from (a).

35. A combination defined in claim 34, wherein said PDF-HFT further provides motion resolver means selected from a group consisting of speed and position.

36. A combination defined in claim 34, wherein said basic three step process control method comprises means selected from a group consisting of analog processors, digital processors, hardware and software.

37. A combination as defined in claim 1, comprising an arrangement of at least two BMSCC without means selected from a group consisting of at least one secondary MODEM means and at least one secondary magnetizing current generator means:
   wherein each of said BMSCC is remotely situated at a distance;
   wherein a high frequency distribution bus of said distance exists between the secondary side of the PDF-HFT of each of said BMSCC of said arrangement;
   wherein said high frequency distribution bus comprises at least one conductor for connecting at least one secondary side electrical winding between said PDF-HFT of said BMSCC of said arrangement;
   whereby said high frequency distribution bus can be further tapped for electrical power at least at one location along said distance.

\* \* \* \* \*